US007177859B2

(12) United States Patent
Pather et al.

(10) Patent No.: US 7,177,859 B2
(45) Date of Patent: *Feb. 13, 2007

(54) PROGRAMMING MODEL FOR SUBSCRIPTION SERVICES

(75) Inventors: Shyamalan Pather, Seattle, WA (US); Praveen Seshadri, Bellevue, WA (US); Phil Garrett, Woodinville, WA (US); Robert F. Blanch, Clyde Hill, WA (US); Holly Knight, Woodinville, WA (US); Dick Dievendorff, Bellevue, WA (US); Vince H. Curley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 490 days.

This patent is subject to a terminal disclaimer.

(21) Appl. No.: 10/180,662

(22) Filed: Jun. 26, 2002

(65) Prior Publication Data
US 2004/0002972 A1 Jan. 1, 2004

(51) Int. Cl.
*G06F 17/30* (2006.01)
*G06F 15/16* (2006.01)

(52) U.S. Cl. .................. 707/3; 707/4; 707/6; 709/206; 709/207

(58) Field of Classification Search .............. 707/1, 707/3, 200; 705/1, 10, 14; 709/206, 207, 709/217, 224; 713/201; 714/39; 719/318
See application file for complete search history.

(56) References Cited

U.S. PATENT DOCUMENTS

| 4,774,658 A | 9/1988 | Lewin |
| 5,367,633 A | 11/1994 | Matheny et al. |
| 5,416,725 A | 5/1995 | Pacheco et al. |
| 5,555,346 A | 9/1996 | Gross et al. |
| 5,813,007 A | 9/1998 | Nielsen |
| 5,852,812 A | 12/1998 | Reeder |

(Continued)

OTHER PUBLICATIONS

Taylor, http://www.sqlteam.com/item.asp?ItemID=1650, 2000, sqlteam.com.*

(Continued)

*Primary Examiner*—Jeffrey Gaffin
*Assistant Examiner*—Hassan Mahmoudi
(74) *Attorney, Agent, or Firm*—Amin & Turocy, LLP

(57) ABSTRACT

The present invention relates to a subscription modeling system and methodology. A query processor receives subscription query and subscriber information and transforms the query and subscriber information into data. An index component propagates at least one database with the transformed data; and a matching component that associates the transformed data with event data to generate a database of notification data that can be delivered to subscribers. The invention provides for abstracting subscription and subscriber information (as well as event information if desired) to high-level classes (e.g., data fields)—thus the invention provides for modeling such notification related information as data. Subscription applications can thus be developed at high levels wherein complex subscription queries and subscriber information can be defined as data fields for example. Databases in accordance with the data fields can be propagated with subscription/subscriber specific information. The present invention takes advantages of the processing power associated with database engines (e.g., SQL server) to generate notifications via performing a join operation on the databases (e.g., subscription database(s), subscriber database(s) and event database(s)). Accordingly, notifications are generated en masse as compared to per subscription per subscriber. Thus the present invention provides for a highly scalable and efficient notification system.

26 Claims, 44 Drawing Sheets

U.S. PATENT DOCUMENTS

| | | | |
|---|---|---|---|
| 5,893,091 | A | 4/1999 | Hunt et al. |
| 5,973,612 | A | 10/1999 | Deo et al. |
| 5,974,406 | A | 10/1999 | Bisdikian et al. |
| 5,999,978 | A | 12/1999 | Angal et al. |
| 6,021,403 | A | 2/2000 | Horvitz et al. |
| 6,055,505 | A | 4/2000 | Elston |
| 6,055,570 | A | 4/2000 | Nielsen |
| 6,122,633 | A | 9/2000 | Leymann et al. |
| 6,138,158 | A | 10/2000 | Boyle et al. |
| 6,151,643 | A | 11/2000 | Cheng et al. |
| 6,167,448 | A | 12/2000 | Hemphill et al. |
| 6,173,284 | B1 | 1/2001 | Brown |
| 6,185,613 | B1 | 2/2001 | Lawson et al. |
| 6,208,996 | B1 | 3/2001 | Ben-Shachar et al. |
| 6,209,011 | B1 | 3/2001 | Vong et al. |
| 6,219,782 | B1 | 4/2001 | Khan et al. |
| 6,256,664 | B1 | 7/2001 | Donoho et al. |
| 6,260,148 | B1 | 7/2001 | Aggarwal et al. |
| 6,275,957 | B1 | 8/2001 | Novik et al. |
| 6,292,825 | B1 | 9/2001 | Chang et al. |
| 6,314,533 | B1 | 11/2001 | Novik et al. |
| 6,353,926 | B1 | 3/2002 | Parthesarathy et al. |
| 6,400,810 | B1 | 6/2002 | Skladman et al. |
| 6,405,191 | B1 | 6/2002 | Bhatt et al. |
| 6,424,966 | B1 | 7/2002 | Meyerzon et al. |
| 6,438,618 | B1 | 8/2002 | Lortz et al. |
| 6,466,949 | B2 | 10/2002 | Yang et al. |
| 6,480,885 | B1* | 11/2002 | Olivier ............. 709/207 |
| 6,487,548 | B1 | 11/2002 | Leymann et al. |
| 6,510,429 | B1 | 1/2003 | Todd |
| 6,629,138 | B1* | 9/2003 | Lambert et al. ........... 709/224 |
| 6,643,682 | B1 | 11/2003 | Todd et al. |
| 6,662,195 | B1* | 12/2003 | Langseth et al. .......... 707/200 |
| 6,704,803 | B2 | 3/2004 | Wilson et al. |
| 6,751,657 | B1 | 6/2004 | Zothner |
| 6,826,560 | B1 | 11/2004 | Leymann et al. |
| 6,829,639 | B1 | 12/2004 | Lawson et al. |
| 6,829,770 | B1 | 12/2004 | Hinson et al. |
| 6,839,730 | B1 | 1/2005 | Ramabhadran |
| 6,910,033 | B2 | 6/2005 | Rosenblum |
| 6,910,070 | B1 | 6/2005 | Mishra et al. |
| 6,938,240 | B2 | 8/2005 | Charisius et al. |
| 6,981,250 | B1 | 12/2005 | Wiltamuth et al. |
| 6,988,262 | B1 | 1/2006 | Mallory et al. |
| 2001/0009016 | A1 | 7/2001 | Hoffman et al. |
| 2002/0010804 | A1 | 1/2002 | Sanghvi et al. |
| 2002/0032597 | A1* | 3/2002 | Chanos ............. 705/10 |
| 2002/0032602 | A1* | 3/2002 | Lanzillo et al. ............. 705/14 |
| 2002/0032771 | A1* | 3/2002 | Gledje ............. 709/224 |
| 2002/0035482 | A1* | 3/2002 | Coble et al. ............. 705/1 |
| 2002/0069244 | A1 | 6/2002 | Blair et al. |
| 2002/0075293 | A1 | 6/2002 | Charisius et al. |
| 2002/0077842 | A1 | 6/2002 | Charisius et al. |
| 2002/0080938 | A1 | 6/2002 | Alexander et al. |
| 2002/0082919 | A1* | 6/2002 | Landau et al. ............. 705/14 |
| 2002/0087740 | A1* | 7/2002 | Castanho et al. ............. 709/318 |
| 2002/0095399 | A1* | 7/2002 | Devine et al. ............. 707/1 |
| 2002/0120711 | A1* | 8/2002 | Bantz et al. ............. 709/217 |
| 2002/0136173 | A1* | 9/2002 | Monroe et al. ............. 370/328 |
| 2002/0154010 | A1 | 10/2002 | Tu et al. |
| 2002/0165729 | A1 | 11/2002 | Kuebert et al. |
| 2002/0194305 | A1* | 12/2002 | Sadeghi et al. ............. 709/218 |
| 2003/0046539 | A1* | 3/2003 | Negawa ............. 713/163 |
| 2003/0050046 | A1* | 3/2003 | Conneely et al. ............. 455/412 |
| 2003/0083952 | A1 | 5/2003 | Simpson et al. |
| 2003/0101322 | A1 | 5/2003 | Gardner |
| 2003/0131143 | A1 | 7/2003 | Myers |
| 2003/0154193 | A1 | 8/2003 | Rosenblum |
| 2003/0177402 | A1 | 9/2003 | Piazza |
| 2004/0002988 | A1* | 1/2004 | Seshadri et al. ............. 707/102 |
| 2004/0128359 | A1 | 7/2004 | Horvitz et al. |

OTHER PUBLICATIONS

Bowman et al. "The Practical SQL Handbook: Using SQL Variants", 2001, pearson technology group, 4th Edition.*

Microsoft Corporation, "Microsoft SQL Server Notification technical Overview", Apr. 2002, White Paper, pp. 1-23.*

Antonio Carzaniga, Design of a Scalable Event Notification Service: Interface and Architecture, Aug. of 1998, U. of Colorado.

Sasu Tarkoma, "Scalable Internet Event Notification Architecture (Siena)", Spring 2002, Helsinki.

Ellen Muraskin, "Notification Engines and Apps", Oct. 5, 2001, www.convergence.com.

"Event Broker/Monitor (Bea Tuxedo System)", 1999, http://edocs.bea.com/wle/wle42/admin/events.htp.

"Configurable Interface for Processing Notifications," Aug. 19, 1999, www.sba.widener.edu/saphelp.

Vassili Bykov, "TOPlink for SmallTalk 5.0: What's new, what's old?", Smalltalk Chronicles, vol. 1, No. 2, Sep. 1999, printed Mar. 19, 2003, 9 pages.

"Interactive Notification Server", www.brience.com, Copyright 2000-2000, printed Mar. 10, 2003, 5 pages.

Rosenblum, et al., "A Design Framework for Internet-Scale Event Observation and Notification", 1998, 17 pages.

Michael Kantor and David Redmiles, Creating and Infrastructure for Ubiquitous Awareness, Information and Computer Science, University of California, Irvine 92697, 2001.

Berndtsson, et al., "Cooperative Problem Solving: A New Direction for Active Databases", 1996, 4 pages, 2 pages of citation.

Bea Systems, "Event Subscription and Notifications", 2000, 4 pages, printed Jul. 25, 2005 from http://e-docs.bea.com/tuxedo/tux71/html/dvlibra7.htm.

Hanson, et al., "A Flexible and Recoverable Client/Server Database Event Notification System", VLDB Journal, 1998, vol. 7, pp. 12-24.

IEEE, "The Authoritative Dictionary of IEEE Standards Terms", 2000, 7th Edition, p. 701.

Microsoft Corporation, "Global XML Web Services Architecture", White Paper, Oct. 2001, 11 pages.

Microsoft Corporation, "An Introduction to Microsoft Transaction Server", Jan. 8, 1998, printed Oct. 21, 2005 from http://msdn.microsoft.com/archive/en-s/dnarmts/html/msdn_mtsintro.asp, 5 pages.

Eric Schmidt, "Reliable XML Web Services", Dec. 11, 2001, Microsoft MSDN, 10 pages, last printed on Apr. 7, 2006.

Steve Trythall, "JMS and COBRA Notification Interworking", Dec. 12, 2001, www.oreilly.com, printed Mar. 25, 2003, 9 pages.

U.S. Appl. No. 10/180,159, filed Jun. 26, 2002, Seshadri, et al.

U.S. Appl. No. 10/180,360, filed Jun. 26, 2002, Seshadri, et al.

U.S. Appl. No. 10/376,197, filed Feb. 26, 2003, Seshadri, et al.

* cited by examiner

| TIME IN | STOCK SYMBOL | EVENT DATA STOCK PRICE ($USD) |
|---|---|---|
| 09:00 GMT | AWKS | 69.98 |
| 09:20 GMT | AWKS | 70.35 |
| 09:40 GMT | AWKS | 70.87 |
| 10:00 GMT | AWKS | 71.55 |
| 10:20 GMT | AWKS | 72.00 |

FIG. 4

TIME 0

| TIME IN | NEWS HEADLINE |
|---|---|
| | |
| | |
| | |

700

TIME 1

09:00 GMT
Political Gridlock in Olympia →

| TIME IN | NEWS HEADLINE |
|---|---|
| 09:00 GMT | Political Gridlock in Olympia |
| | |
| | |

700

TIME 2

09:15 GMT
Political Gridlock in Olympia   ✕

| TIME IN | NEWS HEADLINE |
|---|---|
| 09:00 GMT | Political Gridlock in Olympia |
| | |
| | |

700

TIME 3

09:30 GMT
Wildfire in the Cascades →

| TIME IN | NEWS HEADLINE |
|---|---|
| 09:00 GMT | Political Gridlock in Olympia |
| 09:30 GMT | Wildfire in the Cascades |
| | |

PROGRAMMING MODEL FOR SUBSCRIPTION SERVICES

CROSS-REFERENCE TO RELATED APPLICATIONS

This application is related to co-pending U.S. patent application Ser. No. 10/180,159, which was filed on Jun. 26, 2002, and entitled SYSTEM AND METHOD FOR CUSTOMIZED SUBSCRIPTION SERVICES AND DATABASE DRIVEN SCALABLE NOTIFICATION ARCHITECTURE, and U.S. patent application Ser. No. 10/180,360, which was filed on Jun. 26, 2002, and entitled SYSTEM AND METHOD FOR PROVIDING NOTIFICATION(S), the entireties of which are incorporated herein by reference.

TECHNICAL FIELD

The present invention relates generally to computer systems, and more particularly to a system and method for implementing subscription applications.

BACKGROUND OF THE INVENTION

Empowering people to make well-informed decisions has become increasingly important in today's fast-paced environment. Providing individuals with relevant and timely information is an essential element in facilitating such well-informed decisions. However, certain information that is noise to some may be very valuable to others. Additionally, some information can also be temporally critical and as such there may be significant value associated with timely delivery of such information. Moreover, some individuals prefer to stay apprised of information, even though not critical. A challenge is to provide information in a desired manner notwithstanding vast differences in individuals' information and delivery preferences.

Many conventional methods of gathering information require proactively requesting and searching for the information, often mandating sifting through dozens of messages, hundreds of articles, or referencing numbers or trends in reports. Furthermore, existing technologies assume that a person desiring such information is at a computer and has time and ability to retrieve the information. Moreover, people are increasingly mobile and cannot always be within close proximity of a computer. As a result, Internet-enabled mobile devices are becoming increasingly popular and have generated demand for services that deliver timely, personalized information regardless of location, on whatever suitable device is available and accessible.

Some have attempted to accommodate such demand by building systems that allow individuals to subscribe to an application that automatically delivers information of interest. However, most of such information delivery systems have been poorly built employing ad-hoc techniques. Additionally, conventional systems have difficulty with respect to scaling because of the complexity associated with processing meaningful queries in connection with a large number of disparate events or publications, and delivering results to subscribers given the varying types of individual delivery preferences as well as recipient device types. Consequently, conventional notification systems are inefficient, difficult to maintain and administer, unreliable, and are inadequate for hosting large scale applications.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to a system and methodology for providing a notification system. The subject invention provides for facilitating notification services via a notification architecture that is highly scalable and can handle a large volume of queries with respect to a plurality of disparate subscription service providers and subscribers. One aspect of the subject invention provides for a notification platform that facilitates building and maintaining reliable, high performance, and scalable applications. More particularly, the platform of the subject invention provides for a manner in which to express event schema, subscription schema, notification schema, and match rules in a rich manner (e.g., XML) as well as allowing a subscription service provider to express content formatting and protocols that will be implemented in connection with distributing notifications. The invention includes an execution engine that integrates information propagated in accordance with the aforementioned schema, formatting and protocols to provide highly scalable notification services.

The invention provides for abstracting subscription and subscriber information (as well as event information if desired) to high-level classes (e.g., data fields)—thus the invention provides for modeling such notification related information as data. Subscription applications can thus be developed at high levels wherein complex subscription queries and subscriber information can be defined as data fields for example. Databases in accordance with the data fields can be propagated with subscription/subscriber specific information. The present invention takes advantages of the processing power associated with database engines (e.g., SQL server) to generate notifications via performing a join operation on the databases (e.g., subscription database(s), subscriber database(s) and event database(s)). Accordingly, notifications are generated en masse, as compared to per subscription per subscriber which can consume significant computing resources. By modeling the notification related information (e.g., subscription queries, subscriber information, event information . . . ) as data and leveraging the power of relational database systems to perform set-oriented manipulations on this data efficiently, the present invention provides for a highly scalable and efficient notification system.

The notification system architecture in accordance with one particular embodiment of the invention is composed of various modular components (e.g., event provider, a notification generation engine, and a notification distributor) that can be decoupled and replicated as necessary and run in different configurations to increase system scalability. The event providers collect events and submit the event information to the notification generation engine—an application can employ standard event providers or create custom event providers. Furthermore, the event provider is scalable, since many instances can be run on many machines so as to accommodate handling of large volumes of events.

The notification generation engine, as defined by application developers, processes subscriptions and creates notifications based on the various sets of events. Additionally, the engine supports immediate subscriptions (e.g., triggered when new events arrive) or scheduled subscriptions (e.g. triggered on a subscriber defined schedule). Further, the notification engine provides for historical or state-based services.

The notification distributor formats notifications and provides the formatted notifications to subscriber(s) via a delivery service. Application developers via employment of the subject invention can define transformation(s) from raw data to a formatted notification. Accordingly, the notification distributor can be configured to accept customized delivery routers, although several default routers or protocols can be supported (e.g. email, HTTP Post, Notify.NET, SMTP, MSAlerts, FTP, and Microsoft MIS). Furthermore, since multiple distributors can be executed for each service, the notification distributor is also scalable.

Another aspect of the present invention provides for modeling subscriptions as data as discussed briefly above. A significant task associated with a subscription application is to match incoming event data with a set of user subscriptions to determine what notifications should be sent. One challenge in the notification space is matching expeditiously a large number of complex queries (e.g. subscriptions) with a large number of events (e.g. publications) on a particular system. The present invention provides for modeling subscriptions as data as opposed to conventional modeling of subscriptions as queries. The application developer defines a few standard queries that are parameterized; individual subscriptions provide values for the parameters. The notification system of the subject invention can treat individual subscriptions as parameter data—evaluation of large numbers of subscriptions modeled as data becomes a set-oriented data processing problem, for which database engines are well suited. As a result, such implementation in accordance with the subject invention provides for highly scalable notification applications.

Another aspect of the invention relates to a programming model for subscription applications. The present invention provides an improved programming model for subscription applications whereby an application developer only has to generate a diminimus amount of code to build a fully functional and rich subscription application. This programming model reduces development time, facilitates application maintenance and increases application efficiency by leveraging the power of a server engine (e.g., SQL Server) to perform subscription and event matching. Additionally, the system achieves scalability by abstracting similarities between applications so that respective notification application(s) need to simply focus on respective implementation logic. Moreover, once semantics of an application are defined, reasoning about application behavior and valid implementation technique(s) becomes significantly easier for an application developer as compared to conventional schemes.

According to one particular programming model of the subject invention, subscription applications have various components (e.g., subscriber/subscription interface, event provider, match logic, notification formatter and delivery protocol) that facilitate effecting the advantages of the subject model. The subscriber/subscription interface provides a means by which information about subscribers and their subscriptions enter the system. An event provider component submits new events to the system. Match logic relates to rules for matching events with subscriptions, while the notification formatter component transforms raw notification data into a form presentable to a recipient. Additionally, a delivery protocol is defined as an implementation of the network protocol required to deliver the formatted notification to it intended recipient.

The programming model provides for the aforementioned components to be implemented via simply specifying customizing information regarding subscription schema, event schema, event source, match rules, formatting transforms, and protocol headers. The subscription schema is the structure and form of the data that is maintained for the respective subscriptions (e.g. for a stock alerting application the system would store the name of the stock symbol). Event schema is the structure and form of the events that enter the system (e.g. in the stock alert application each event would contain a stock symbol and its current price). Additionally, there can also be a notification scheme which can describe size and shape of outgoing notifications. The event source is simply the location from which events should be read, while the match rules are a set of rules for matching events with subscriptions. Formatting transforms are a set of transforms for formatting raw notification data. Finally, protocol headers are a set of configuration parameters for the set of delivery protocols that the notification system supports.

In accordance with another aspect of the present invention, a priority for a file such as text can be generated based on a classifier, such as by determining the likelihood that the text is of high or some other priority, for example. The classifier may be a Bayesian classifier, a support vector machine, and/or other type of classifier. The classifier can consider data features such as the structural relationship between the user and the sender of the text, as well as the time of events referenced in the text. Other considerations such as an expected loss of non-review of the text at a current time can be determined based on the priority, as well as an expected cost of outputting the text at the current time. The user can also be alerted on a mobile device, for example, in response to determining that the expected loss is greater than the expected cost, in accordance with a profile (e.g., information store of user preferences).

A current profile can be selected from a number of profiles, which can be editable by the user to reflect a different context (e.g., at home, at work, leisure time, busy, vacation, traveling). The profiles are schedulable on a per-day and by-time basis, and can be locked to remain active unless subsequently unlocked. The profile can have a priority threshold settable by the user thus controlling the amount and/or types of messages received, for example. A chunk setting associated with the profile can control delivery of the text. For example, text or other data may be delivered to a mobile or other communications device in conjunction with one or more other related texts or data. Alternatively, the text may be delivered to the communications device when a specified period has expired. Furthermore, the text may be delivered or diverted to a subsequent or alternative device, for example, if a primary device of the user, such as a desktop computer, is determined to be idle for a specified period of time.

The text or other data may be formatted prior to delivery to a receiving modality such as mobile device, for example. Formatting can include compression and fragmentation. In the case of the former, the text can be compressed according to a specified compression setting that is settable by the user. In the case of the latter, there is also a user-settable fragmentation setting. If the text or other data is an e-mail, the sender of the text may be sent an indication that the text has been delivered to the receiving device of the user. Furthermore, the sender may be sent an indication that the user is away from his or her primary device. Alerting the user may also consider the user's calendar and time of day. Events on the calendar can have an associated tag that specifies the degree to which the user is amenable to being interrupted during the event.

Thus, the subject invention provides for a platform that affords for subscription providers to design customized subscription services in an easy manner, and the invention provides for a powerful notification architecture that is highly scalable and powerful in that the data modeling in accordance with the present invention leverages the power of database engines to process highly complex subscriptions for large numbers of subscribers in an efficient and rich manner.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIG. 4 is an illustration of an exemplary event table.

FIG. 7 is an illustration of an exemplary use a chronicle table.

DETAILED DESCRIPTION OF THE INVENTION

Figure 1:
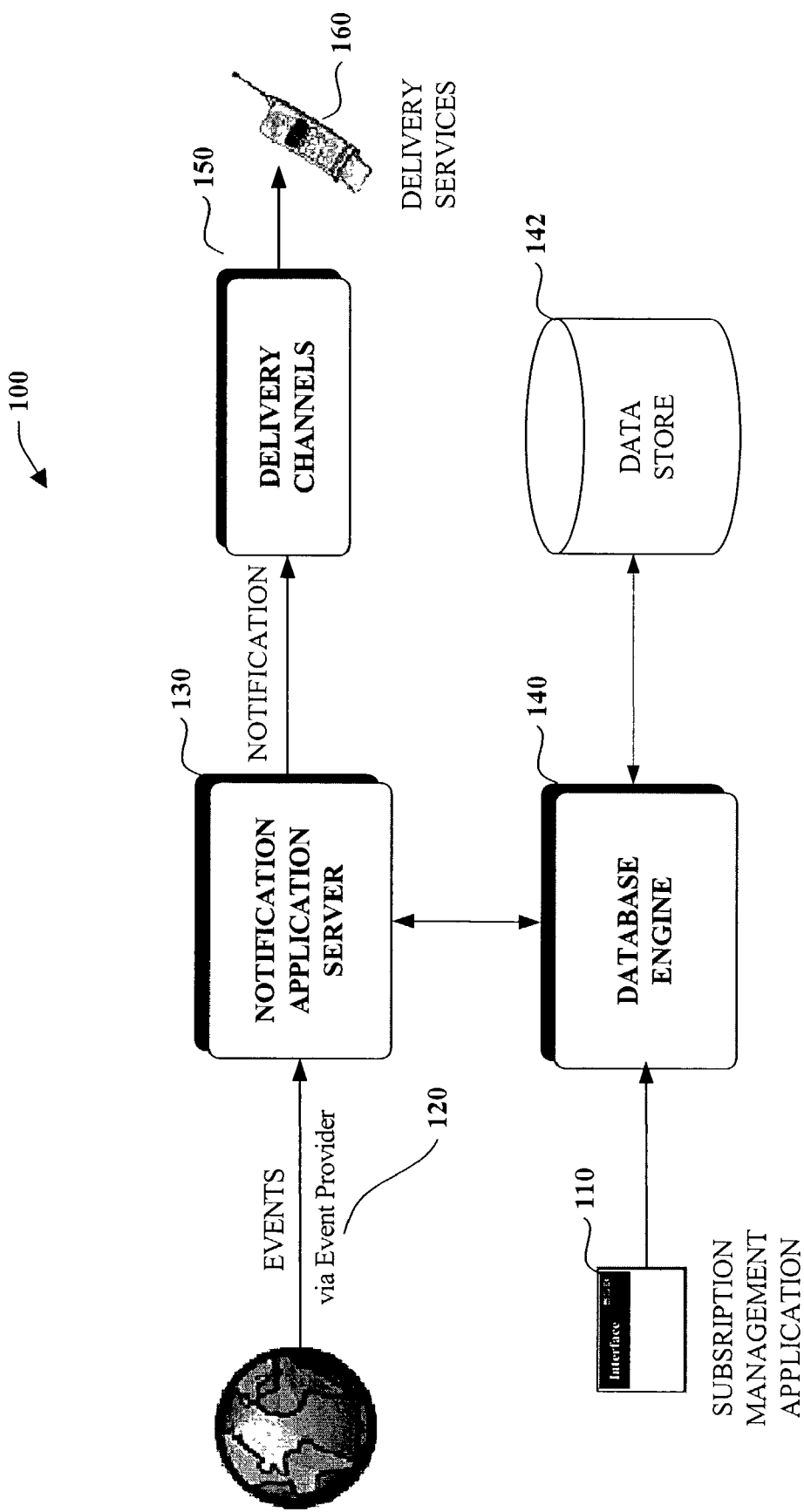
FIG. 1 is schematic block diagram of a notification application architecture in accordance with one aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to FIG. 1, a system 100 illustrates a notification application architecture in accordance with one aspect of the present invention. The notification system 100 facilitates delivery of information to entities that have subscribed to an application. The system 100 provides for high-scalability and affords for disseminating information to subscribers in a desired manner according to specific subscriber preferences. A subscriber is an entity (e.g., a person or application) that has subscribed to the notification system 100. A subscription in accordance with the present invention can be an expressed interest in certain information (e.g., stock price or results of a sporting event), and the specification of a delivery mode (e.g., e-mail, voice mail, delivery via PDA, desktop computer, cellular telephone, television . . . ). Moreover, the present invention also provides for taking into consideration an individual's present state and associated delivery preferences according to present state. Thus, the notification system provides for dynamically modifying deliver modes given the type of information to be delivered, the criticality associated with the information, the subscriber's present state, and the deliver preferences given the aforementioned other parameters. One aspect of the invention that facilitates the system 100 providing such highly scalable notification services is the employment of modeling subscriptions as data. Such subscription modeling mitigates the need to run queries individually per event per subscriber. Accordingly, numerous events can be concurrently processed with respect to a plurality of subscribers and relevant notifications provided to the respective subscribers in a meaningful manner in accordance with individual subscriber preferences.

Information that subscribers are interested in is collected as events. For example, a stock price at a specific time can be an event, as is a sports score, or a product delivery message—almost any suitable real world "happening" can be expressed as one or more events in accordance with the subject invention. A notification is a message delivered to a subscriber-specific device that contains information related to a subscription. A notification might contain a message about a new high value for a specific stock or the final score for a sporting event for example. The server notification services provide interfaces for gathering subscriptions and events, and then produces notifications based on this data.

Instead of treating individual subscriptions as queries, the notification system 100 treats individual subscriptions as parameter data (e.g., an application developer can define a set of parameterized queries, each of which can be a subscription class)—evaluation of large numbers of subscriptions becomes a set-oriented data processing problem, for which database engines (e.g., SQL server) are well suited. This is a foundation of the notification system-programming framework of the present invention. In this model, event-triggered subscriptions are evaluated by simply executing a database join between events and a potentially large set of subscriptions. In general, the notion of modeling subscriptions as data is based on an assumption that if the notification system 100 defines various domains, then many queries will have a common structure. For instance, many subscribers are interested in stock values, but at a finer granularity respective subscribers desire information about different stocks at different values. Thus, an interest in a particular stock can be expressed as "STOCKSYMBOL" and "TRIGGERPRICE" so as to provide a common framework or parameter(s) for such information. The semantics of how these parameter values are interpreted in relation to the event data can be are defined by the application. Thus, the application fixes the logic of how subscription parameters are interpreted (e.g., one app may want to alert when current price> trigger price and another may want to alert when current prce<trigger price)—such semantics can be resolved in advance by the application developer, and designed such that a subscriber cannot introduce new semantics.

As discussed in greater detail below, the subject invention also encompasses a programming model for building subscription applications. In subscription applications a user establishes subscriptions or declarations of interest in certain kinds of targeted information. Thereafter, when the information becomes available, the subscription application sends a notification to the subscriber. A function of a subscription application is to match incoming data with the set of user subscriptions to determine what notifications need to be delivered. The subject programming model allows an application developer to write a small amount of application specific code (e.g. a mix of XML, SQL, C#, C++, VB and other languages suitable for support by the .NET framework) to build a fully-functional, rich subscription application. To enable such functionality, an execution engine can be built on top of SQL Server and the .NET frameworks, for example, that implements fundamental data constructs and execution semantics common to subscription applications. Thus, the subject programming model reduces development time, facilitates application maintenance and increases application efficiency by leveraging the power of a server, for instance SQL Server, to do subscription and event matching.

The subject invention includes a declarative programming model for building subscription applications. The programming model provides a base framework for the structure of applications; and a developer can adapt the base framework to build a specific application.

With respect to the high-level schematic illustration of the system 100, five components of notification services cooperate to provide the functionality described above. A subscription management application 110 provides an interface for subscribers to submit subscriptions as input to the system 100. In particular, the subscription management application 110 provides numerous application programmer interfaces (APIs) that facilitate entities to provide subscription services via the system 100—the APIs are discussed in greater detail infra. Event data can also gathered from external sources via an event provider 120. For example, an event provider in accordance with the present invention can gather or be pushed relevant events from a plurality of resources (e.g., newspapers, magazines, websites, libraries, individuals, employers, government(s), etc.). A database engine 140 stores events and/or subscriptions in a data store 142, and also runs statements, like Transact-SQL statements, and stored procedures. It is to be appreciated that the database engine 140 can also process events versus subscriptions in real-time without persistently storing information. A notification application server 130 processes subscriptions based on a set of events and ultimately generates notifications that are delivered to subscribers, and which can be stored in the database 142 if desired. Finally, delivery channels 150 route the generated notifications to delivery services 160, which can include, but are not limited to, Exchange servers, SMS servers, and .NET Alert Web services. The deliver channels 150 and delivery services 160 are discussed in greater detail below.

Figure 2:
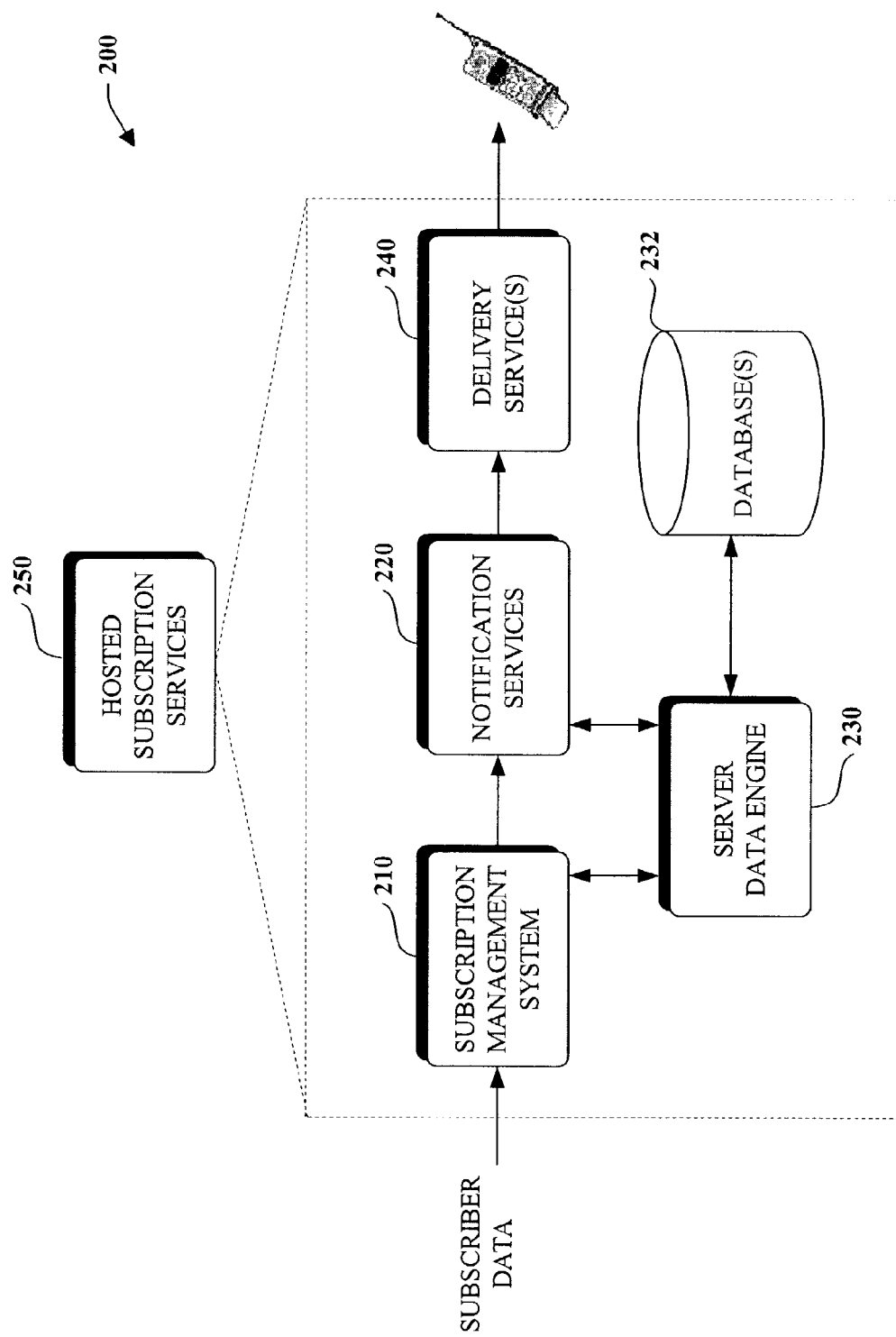
FIG. 2 is a schematic block diagram of a notification creation and distribution system in accordance with an aspect of the present invention.

FIG. 2 illustrates a notification creation and distribution system 200 in accordance with an aspect of the present invention. The system 200 includes a subscription management system (one or more subscription management applications) 210, notification services 220, a data engine 230, database(s) 232, delivery services 240, and one or more subscription services 250 hosted by the notification system 200. The server database engine 230 provides for processing and storing instance and application data. In particular, the server database engine 230 stores and retrieves instance and application information from database(s) 232. The data engine 230 also provides other services employed by the notification services 220. For example, the notification services 220 can employ Transact-SQL language to join event and subscription data via the data engine 230. Such integration provides scalable performance gains, because the data engine 230 is likely to be highly optimized for joins as a result of the information processing capabilities afforded by SQL services. The subscription management system 210, provides a hosting environment for user interfaces that collect subscriber and subscription data as well as accommodate a variety of unique subscription services 250. The subscription management system can employ a Windows® application for submitting subscriber and subscription data, or can use an automated process for loading subscriber and subscription data from another system. The delivery services 240 (e.g., .NET Alerts and Microsoft Exchange Server) receive notifications from the notification services 220 and send the notifications to appropriate subscribers.

Functionally, events are submitted to the server data engine 230 through a hosted event provider in notification services 220, or through a non-hosted event provider outside of notification services. If employing a non-hosted event provider, another system may be used that supports the event provider, such as a Web server. In addition, it is appreciated that the notification services 220 can be deployed on a single server or scaled across multiple servers.

Figure 3:
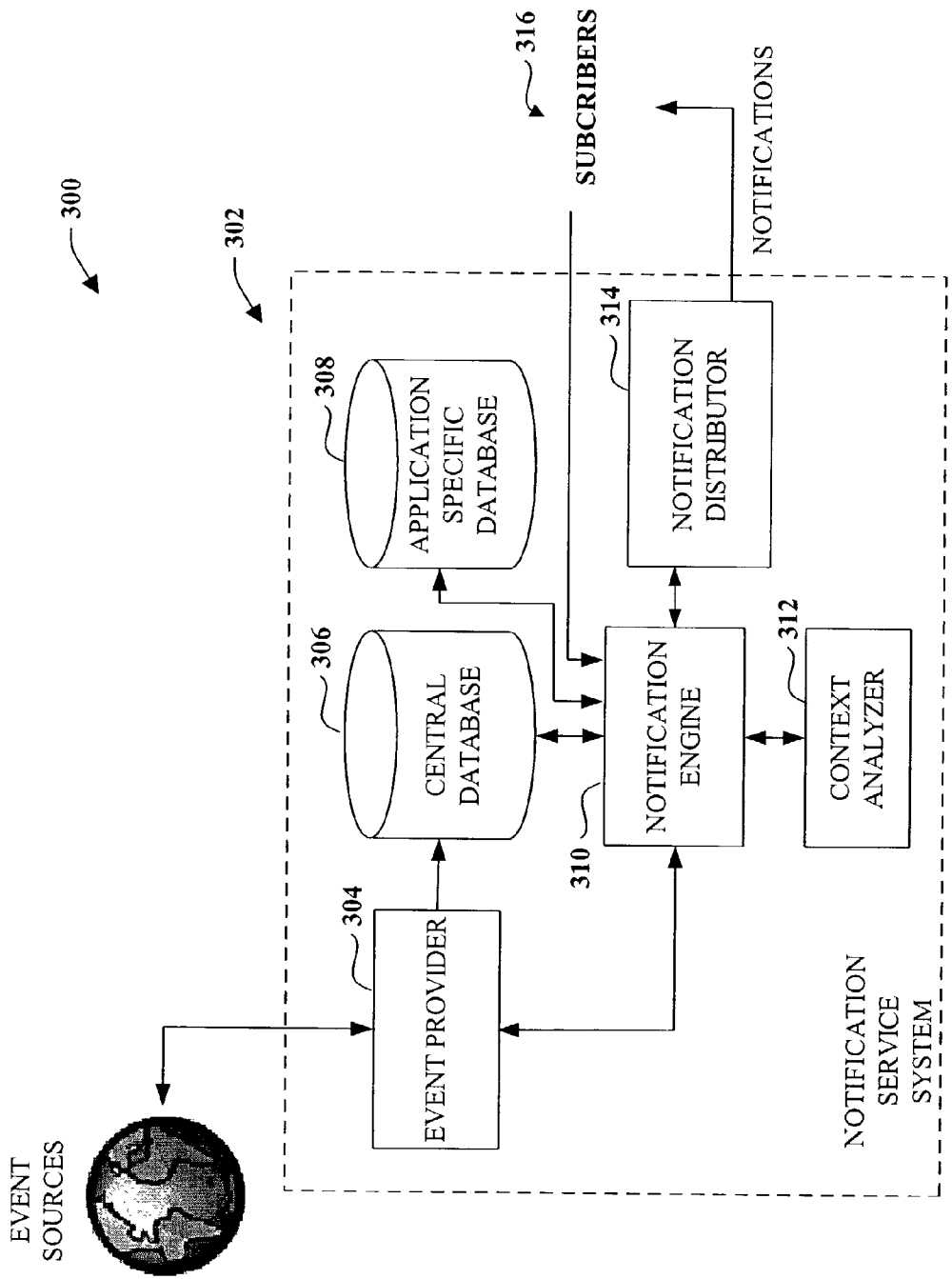
FIG. 3 is a schematic block diagram illustrating a notification service architecture in accordance with an aspect of the present invention.

Referring next to FIG. 3, a notification service architecture 300 is illustrated in accordance with an aspect of the present invention. The architecture 300 includes a notification services system 302, which includes an event provider 304, a central database 306, an application-specific database 308, notification engine 310, context analyzer 312, notification distributor 314, and subscribers 316. The notification services system 302 receives input in the form of events and subscriber data, and supplies output or notification to subscribers 316.

The event provider 304 acquires events from event sources for the notification services system 302. Events represent data changes in the external world. For example, a stock price at a specific time is an event, as is a sports score, or a product delivery message. Stated differently, events are items that are potentially interesting to some set of users, and such set of users define the particular input data via subscriptions. The event provider 304 is employed to collect selected events from event sources for the notification services 302. Moreover, the event provider 304 can collect event data from a plurality of different sources including but not limited to communications, such as Internet and network-based communications, and telephony communications, as well as software services, XML files, applications, and databases.

Event sources are defined generally herein as that which generates events, which can also be referred to as notifications or alerts, intended to alert a user, or a proxy for the user, about information, services, and/or a system or world event. An event source can also be referred to as a notification source. Furthermore, the event provider 304 can monitor and gather data through various methods. Exemplary methods of gathering data include but are not limited to, monitoring directories for file additions, checking system and application log files for certain types of entries, trapping alerts from applications, monitoring web pages, tracking changes in database tables, and reviewing data provided by web services. In most cases, an event provider can gather data from any suitable resource, provided that an application is prepared that retrieves events from the resource. In general, there are a variety of different models that can be employed by the event provider 304 to collect data. These models can influence how often and under what circumstances the event provider 304 will collect events from event sources.

In addition, the event provider 304 can be notified or provided with data in at least one of two manners. The event provider 304 may wait for information to be "pushed" or sent to it, or it can "pull" information from a source by polling the source and gathering any new or updated data. For example, if a user desires to be notified each time a headline story on a favorite news page changes, the event provider 304 can be implemented so that it monitors that page and searches for changes to the headline text, for example. When the text changes, the event provider 304 can extract the new headline data for the notification services system 302. In the above example, the event provider 304 is responsible for gathering needed data, because the data is not provided to the event provider from the event source as would be the case with employment of a push methodology.

Furthermore, the event provider 304 can obtain new data for the notification system 302 based on either a schedule or on the occurrence of an event that meets pre-defined criteria. A scheduled event provider can run periodically, based on settings implemented by an application developer. The scheduled event provider will start running, retrieve and submit new event data and then hibernate until a next scheduled trigger time. An event-driven event provider can monitor an event source by running continuously. Thereafter, when data that meets a particular criteria for collection is made available the event provider will collect and submit the event. Alternatively, an event-driven event provider may only run in response to a callback function or some other external stimulus. This external function would then determine whether there is valid event data to collect, and use the event provider as the means of collecting such data. Once the event provider 304 collects data from an external event source, it writes the data to an event table in batches and saves the event table to database 308.

Data is preferably handled in batches for the sake of efficiency—event data and notification data are both batched. A batch, as generally defined herein, can be a set of data processed as a group. For example, an event batch can be a set of events that are submitted to notification services 302 at one time. Events can be written to the system either individually or as a group. When a single event is written to the system and there is not an event batch open, one can be created automatically. The new event and subsequent events are then associated with this automatically created batch. The event provider that is providing these events is programmed to close the current event batch periodically, which submits this batch of events for use in notification generation. A new event batch is then created with the first new event submission, and the cycle starts again. Furthermore, when events are written to the system as a group, each group is automatically assigned an event batch. When the writing process is completed, the event batch is closed so that these events are available for notification generation processes. In one particular embodiment of the invention, the batches are atomic (e.g., either the entire batch or none of it is submitted).

Referring briefly to FIG. 4, an exemplary event table 400 is illustrated. As shown each row in the event table 400 contains TIME IN, STOCK SYMBOL, and STOCK PRICE. After events are collected in the event table, subscriptions can be processed by evaluating subscriptions against collected events, current time, and subscription schedule, which is a task for the notification engine 310 (FIG. 3).

Turning back to FIG. 3, subscribers 316 are shown. Subscribers are entities like persons or applications, that have subscribed to an application. By subscribing to an application, a subscription is created which is an expressed interest in specific information, such as a stock price or sports team, and the specification of a delivery device as well as a delivery schedule for example. The data about subscribers and their delivery preferences is called subscriber data. The data about the individual events the subscriber is interested in is deemed subscription data. Notification services 302 stores subscriber data and in a central database 306, and it stores individual subscriptions, or subscription data in an application-specific database 308. This allows applications to share the global subscriber data while separately storing subscriptions for each application. Subscription management is handled by a custom subscription management application described in greater detail below.

Figure 5:
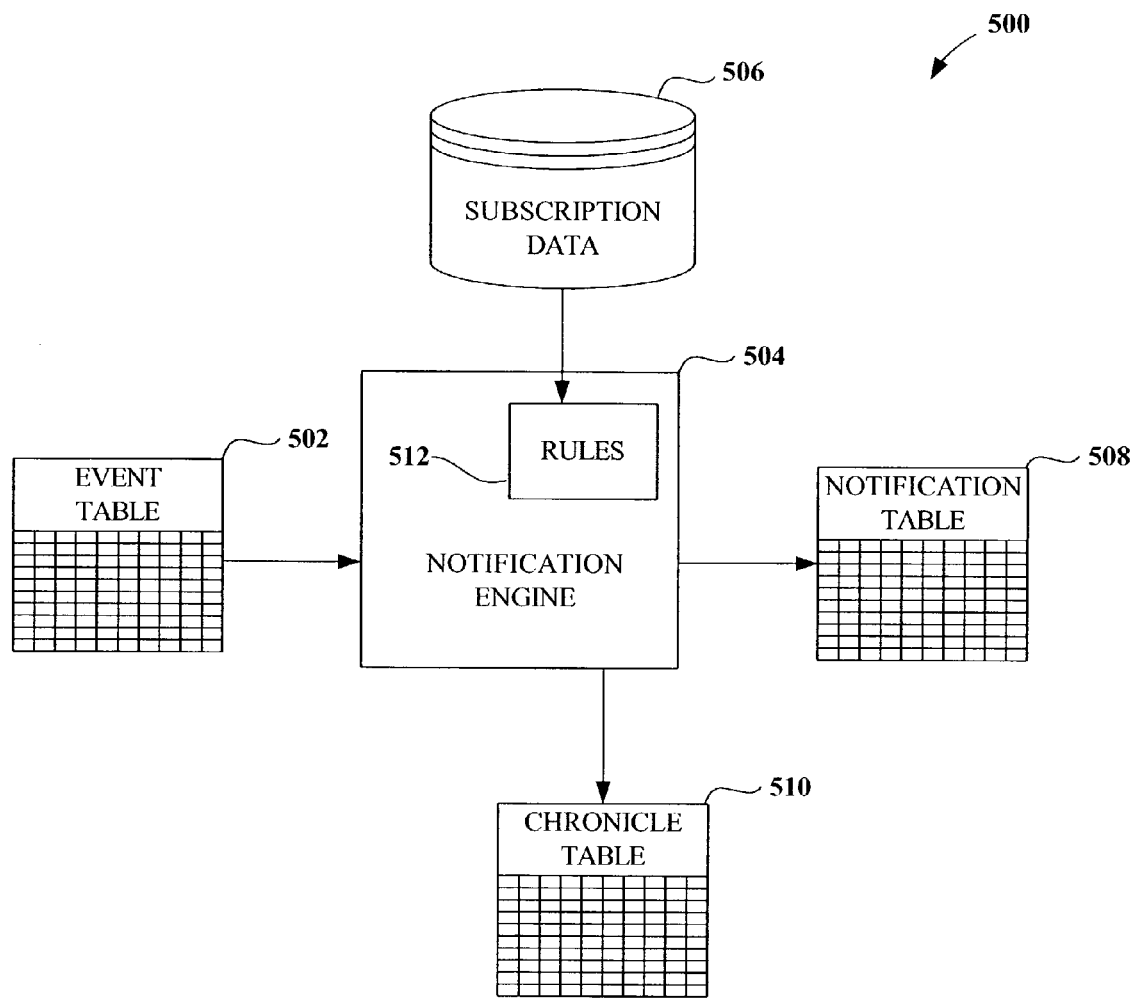
FIG. 5 is a schematic block diagram of system for generating notifications according to an aspect of the present invention.
Figure 6:
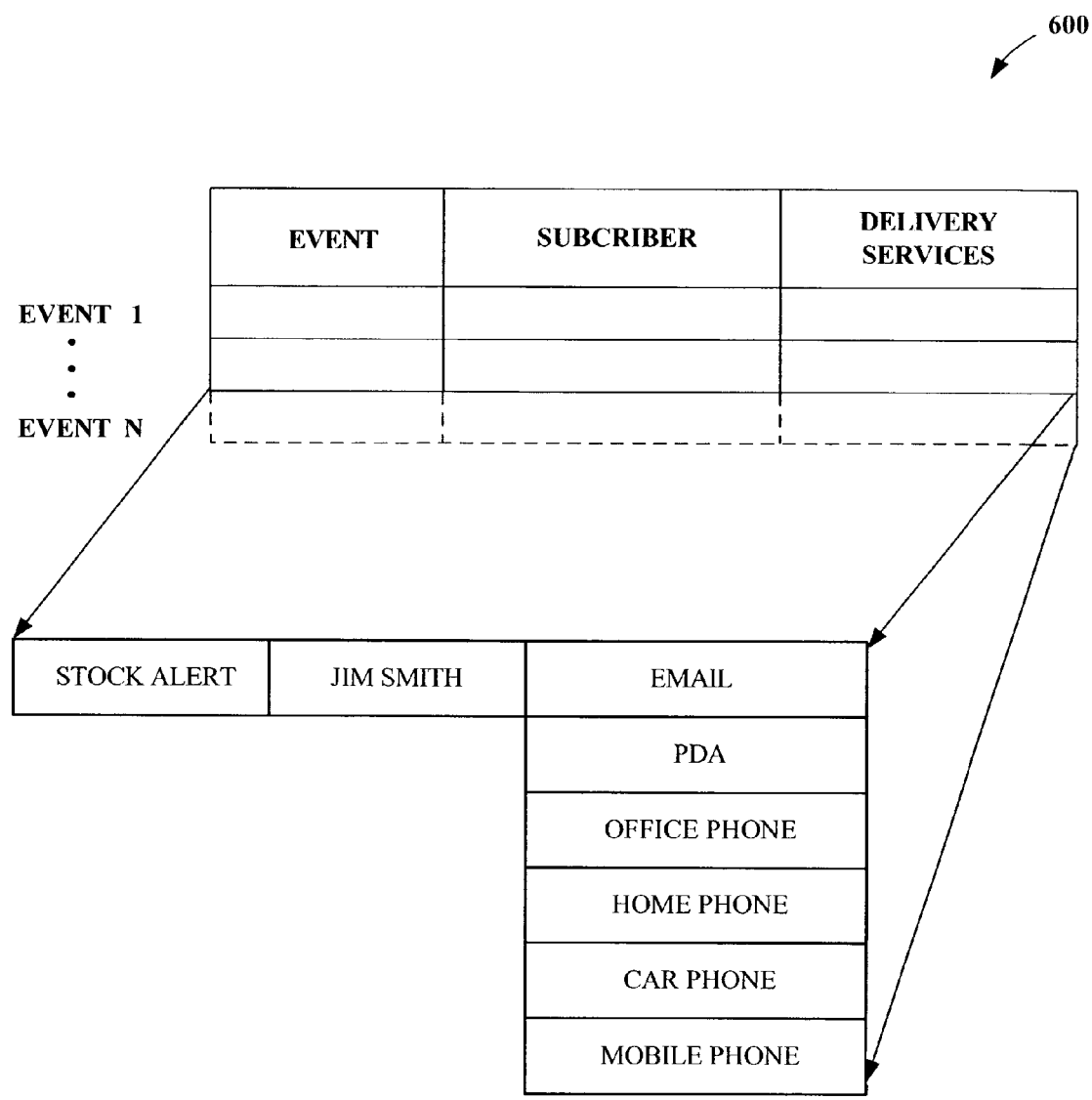
FIG. 6 is an illustration of an exemplary notification table.

Turning now to FIGS. 5 and 6, a system 500 for generating a notification and an exemplary notification table 600 are illustrated. As noted above, the notification services system 220 (FIG. 2) generates notifications based on the subscriptions and events that are entered into the system. It does so by employing a notification generation rule, which matches subscription information to event data. If the event data fulfills the subscription requirements, a notification record is created. To generate notifications, an application developer creates an event subscription rule based on subscriber/user input. In particular, a rule is created to implement a portion of application logic—user input in a general sense can drive requirements for what rules to implement. This rule specifies how events and subscriptions relate and any other conditions that must be met to generate a notification. In a simple application, when a single event matches a single subscription, a notification engine 504 creates an entry in a notification table 508. Data in a notification table, like exemplary table 600 (FIG. 6), is organized as a table of records. Specifically, the notification table 600 contains data about the event (e.g., stock alert) and references data about the subscriber (e.g., Jim Smith), the delivery devices (e.g., email, PDA, home phone, office phone, car phone, mobile phone), and could also contain other information required for distribution. Creation of a notification table or an entry therein does not however mean that the notification is actually sent—the generator can write the notification to the internal notification table 508 and store it in system memory for further processing.

Notifications are processed in batches; unlike event batches (which are explicitly closed by the event provider), notification batches are automatically generated and closed by a generator function, so no application programmer interface (API) access is provided to them. However, developers can configure the notification batch size to meet specific application requirements.

In one particular embodiment of the invention, each time the notification generation process is started, a new notification batch record is created. Each notification record generated from that point in time until the process has finished will be associated with this batch. When processing is complete, the current notification batch is closed. This makes the notifications in this batch available for processing by other notification services components like the context analyzer 312 and the notification distributor 314 (FIG. 3). A new notification batch record is then created the next time the notification generation process is started, and the cycle starts again.

In many implementations, notification generation is likely to be more complex than simply matching an event to a subscription. For example, the notification engine 504 might generate a notification only if a new stock price is at least 5% more or less than the price in the subscriber's previous notification. To support state-based notifications such as this, the notification engine 504 employs at least one chronicle table 510 and multiple rules 512. The notification engine 504 may be used to store information such as previous events and notifications in a chronicle table 510. The notification engine then uses additional rules to either check or update the chronicle table 510. These rules should fire when events arrive or according to a pre-defined schedule.

Chronicle rules are sets of one or more queries that manipulate data in an event chronicle table 510. An event chronicle rule is processed for an event batch that contains events of the event class for which the rule is defined. Event chronicle rules are executed when the notification engine 504 processes an event batch. Furthermore, where an event batch is processed, the event chronicle rules are processed first, followed by the subscription event rules. If an event chronicle rule fails during execution, subscription event rules associated with the same event class are marked as failed. Further, the subscription scheduled rules, which processes information for scheduled subscriptions and may contain notification generation rules or chronicle update rules, operate independently of the event chronicle and subscription event rules. Therefore, the success or failure of the event-related rules will not affect the processing of the subscription scheduled rules. After the notification engine 504 executes the generation rules, resulting notifications are written to the notification table 508—from this table, the notifications are ready to be processed by the other notification services components.

FIG. 7 illustrates an exemplary use of chronicle tables—an event chronicle table 700 can be employed to prevent duplicate notifications. Assume an event-driven subscription is defined to provide a subscriber with a notification any time a new headline is posted to a news site. Event chronicle table 700 is empty at Time 0 ($T_0$). Then at $T_1$, the system receives an event and a notification is sent to the subscriber based on the 09:00 GMT data, containing the current headline, "Political Gridlock in Olympia." After the event batch is processed and a notification is generated, a row in the current headline is inserted in the event chronicle table 700 by an event chronicle rule that is defined for this application to prevent duplicate notifications. The rule prevents duplicate notifications by simply excluding any events whose headline value already exists in the event chronicle table 700. As the processes proceeds to $T_2$, a second headline, "Political Gridlock in Olympia" is received by the system. Because this headline is identical to the existing record from the first headline in the chronicle table, it is not written to the chronicle table and a notification is not sent to the subscriber. However, if a third headline is received by the system at $T_3$ that is not already in the chronicle table 700 like "Wildfire in the Cascades" then the table is updated and a notification is generated.

Returning to FIG. 3, the notification engine 310 can also access information stored in a user profile by the context analyzer 312 in lieu of or to support a personalized decision-theoretic analysis. For example, the user profile can indicate that at a given time, the user prefers to be notified via a pager, and only if the notification has a predetermined importance level. Such information can be utilized as a baseline from which to start a decision-theoretic analysis, or can be the manner by which the notification engine 310 determines how and whether to notify the user. Decision-theoretic analysis is discussed in further detail infra.

Figure 8:
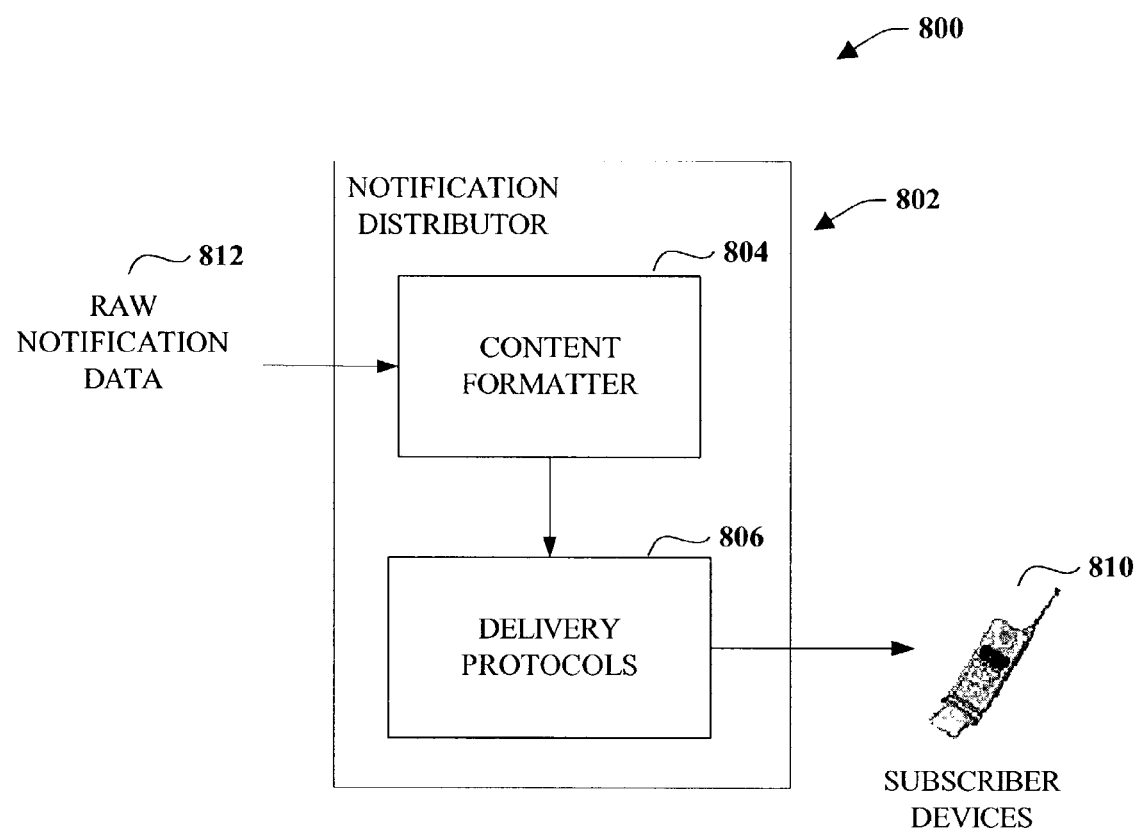
FIG. 8 is a block diagram illustrating a notification distributor in accordance with an aspect of the present invention.

Referring to FIG. 8, a system 800 is illustrated depicting the notification distributor of FIG. 3 in more detail. System 800 components include notification distributor 802, context formatter 804, and delivery protocols 806. The notification distributor 802 receives raw notification data as input and outputs formatted notifications that ultimately arrive at subscriber devices 810. After raw notification data 812 is written to notification tables, notifications are transformed into a readable notification that is formatted for the destination device, and possibly for the subscriber's preferred language and then sent to the device via the delivery protocols(s) 806. Content formatting is a task handled by the content formatter component 804. The content formatter 804 can be implemented as a class in a managed code assembly. Furthermore, respective notification classes can use respective content formatter(s) to handle the display formatting of data. The selected content formatter 804 can be specified in a section of an application definition file (ADF) described in detail below.

More specifically, the content formatter 804 takes notification data, packaged into an array, as input. For standard delivery, there should be only one element in the array, which contains the information for a single notification record. For digest delivery, where multiple notifications are sent to a subscriber in a single message, there should be multiple elements in the array, each of which contains the data from one of the component notifications. The content formatter 804 then formats the notification fields for display, using the recipient information included in the notification data to determine the appropriate formatting. If digest delivery is employed, the content formatter 804 is also responsible for appropriately aggregating the component notification information. When the content formatter is completed with its task, it outputs a string containing the formatted data. The notification distributor 802 passes this string, along with some notification header information that it generates, to a delivery protocol. Internally, the content formatter 804 may use any suitable scheme to format the notification fields. For example, such scheme can be as simple as employing basic string manipulation, or it can be more complex, like using for example Extensible Stylesheet Language (XSL) transforms or ASP.NET rendering.

Generally, notification formatting is customizable and therefore can be left to the application developer to design. The notification system of the subject invention empowers developers by defining an interface to facilitate defining a notification services system object. The system will subsequently host, load, and call proper procedures for objects defined by an application developer. However, notification services system may provide a content formatter 804, such as for example XSL Transformations (XSLT), to assist application developers in quickly developing an application. The format can be utilized in an application after specifying some basic information about it in the ADF. Additionally, as noted developers are also free to develop a custom content formatter. A notification services API (described supra) provides an interface to assist developers with this matter.

Notification delivery is accomplished via the delivery protocols 806. When a batch of notifications becomes available, the notification distributor 802 reads the subscriber data in notification(s) to determine proper formatting. The distributor 802 then sends notification(s) by way of a delivery protocol 806 to a delivery service, such as a .NET Alerts or SMTP server, for example. More specifically, when the application is running, the distributor 802 reads each notification to obtain the subscriber delivery device and locale. The distributor then matches the combination of device and locale to a specific formatter object to generate the final notification. The notification itself can contain a combination of the raw notification data, data that is computed at formatting time, and text specified by the content formatter.

These options allow for professional and user-friendly notification text and the inclusion of Web links and branding information.

The notification services system does not itself handle have to handle final delivery of notifications. Instead, the system uses delivery channels, which can be thought of as pipes to delivery services such as e-mail gateways or .NET Alerts servers. Specifically, a delivery channel consists of a protocol and an end point address. The administrator configures a delivery protocol 806 to provide a pipeline from the distributor 802 to the external delivery system that transmits the notification to the recipient. The distributor then packages notifications into a protocol packet and sends the notifications to one or more delivery protocols 806. The delivery channels 806 subsequently present the packets to an external delivery service, which ultimately sends the notification to the recipient.

The notification services system 302 (FIG. 3) includes but is not limited to the following "well-known" protocols, which support a standard set of delivery channels/protocols 806 for notification applications. Multiple delivery channels can be configured for each of these protocols:

Simple Mail Transfer Protocol (SMTP) for sending notifications to Exchange or other SMTP servers.

Notify.NET protocol for sending notifications via .NET Alerts servers (e.g., Microsoft Alerts)

Referring back to FIG. 3, for performance monitoring and troubleshooting, the notification system 302 can retain information about the delivery of notifications in the previously described notification table 508 (FIG. 5). The status of notification delivery can thereby be maintained by the distributor 314 by means of the notification table. Accordingly, delivery protocols can be enabled to invoke a callback to report delivery success or failures for individual notifications to the notification service. The callback thereafter updates the notification table, via the notification distributor 314, to reflect the success or failure of respective notifications.

Furthermore, digest delivery and multicast are two examples of methods available for notification delivery. In the digest system, multiple notifications within a batch are combined and sent to one subscriber as a single message. Thus, digest delivery could be employed if multiple notifications are likely to be sent to individual subscribers. This delivery method would be useful, for example, if the system needed to send a single subscriber three messages to his pager. In this case, it would be better to page the subscriber once with three messages than to page him/her three times with each individual message. Similarly, multicast delivery could be employed if multiple recipients would be receiving exactly the same message, for example a sports score, or news headline. In the multicast system, a single notification is formatted only once and then sent to two or more subscribers. Multicast is an optimization of the formatting step and can be used even if the protocol does not support true multicast delivery e.g., the formatting can be done once and the formatted message plus a list of recipients given to the protocol—the protocol could then send these out as multiple messages, but the formatting benefit is still realized. With respect to the distributor, it should be noted that retry functionality can be provided wherein the platform allows application developers to specify a pattern of retry attempts for failed notifications and retrys are implemented accordingly without requiring an application developer to specificy an inordinate amount of extra logic.

There is increasing interest in the class of applications broadly referred to as "publication-subscribe" (or pub-sub for short) applications. The basic idea of a pub-sub application is that data published by a publisher entity is sent to all subscriber entities that subscribed to the data. There are several properties of pub-sub applications that provide a simple taxonomy.

First, there is a difference between direct and brokered subscriptions. When subscribers set up subscriptions directly with publishers, this is deemed direct subscriptions. The alternative is allowing subscribers and publishers to register with a broker that acts as an intermediary between the parties. The broker model is advantageous especially with regard to scale and trust, but requires a large infrastructure.

Another distinguishing property of pub-sub applications is the distinction between topic-based and content-based subscriptions. This property is used to describe the richness of the subscriptions. Specifically, in topic-base or group-based applications, all the published data belongs to some specific topic area, and subscriptions are simply to a topic or channel of information. Content-based subscriptions are richer in that individual subscriptions may specify predicates or conditions that act as filters on the delivery of a particular data item generated by the publisher for the specific subscriber.

The final broad property of pub-sub applications also describes the richness of subscriptions. The distinction is between stateless and stateful subscriptions. In stateless systems, subscriptions specify simple (e.g., topic-based) or complex (e.g., content-based) filters on individual data items. In stateful systems, the subscription can involve data histories as well as application histories in deciding whether to send data to the subscriber, what data to send, and when to send it.

The following discussion relates to three examples of pub-sub applications. Each example involves human subscribers establishing up subscriptions and receiving notifications. There are a wide variety of other applications as well, but the following examples are illustrative of interactive schemes for ease of understanding. Additionally, it is important to note that in a business-to-business space, a number of applications may involve a program acting as the "subscriber" setting up subscriptions and receiving notifications rather than an individual.

One common and easily understood example is in the area of stock market alerts. In a stock typical market alert system, a customer purchasing stocks through an online trading site requests to be alerted when the stock being purchased crosses a particular value. The customer may then specify particulars for example:

a. Alert me when the price of MSFT moves above $85
 b. Send the alert to my phone
 c. If I have been alerted once in a day about MSFT already, do not send the message again.
 d. Send me an email with the value of my portfolio every weekday at the close of the NYSE.

Another example of a pub-sub application may be in the context of a business-to-customer environment. For instance, a delivery company may currently offer a delivery tracking service whereby a customer can proceed to a web site, type in a tracking number, and learn status of delivery. From the customer's point of view, a better service might allow the customer to receive an email alert with the name of the receiving party upon delivery of a parcel. Additionally, if the parcel has been delayed, an email might be sent to the customer notifying them of this fact and provide them with a link to a site that provides additional details.

Additionally, a sub-sub application could involve business-employee relations. For example, many corporations maintain internal web applications for their employees (e.g., payroll, benefits). In order to improve employee productivity, a corporation looks for mechanisms to educate its employees about their business and technical areas. In furtherance of this goal, some corporations could provide a library news alerting service that filters large volumes of news articles from a variety of sources and sends appropriate articles to each employee. Additionally the system might allow each employee to specify the following requests:

a. Let me know about articles about databases and messaging.
b. Let me know about earnings reports for technology companies.
c. Send me this information consolidated into a single message once a day at 5 PM.

Some observations can be drawn from the above examples of pub-sub applications. First, the examples are specific instances of a broad class of applications that share similarities. Currently, most of these applications are either constructed in a one-off fashion, or built using proprietary technology. Clearly there is value in a common, well understood platform that abstracts similarities between applications, so that respective application(s) simply focus on specific implementation logic. Second, there is significant value in a rigorous definition of the platform and of the application semantics, rather than the loose definition that currently exists with many conventional systems and methods. Once semantics of the application are defined, it becomes easier for the application developer to reason about its behavior and for the system developer to reason about valid implementation techniques. As an analogy, the development of the relational model and transaction theory added significant value to the development and adoption of database systems. Furthermore, In order to span the full rich range of pub-sub applications of interest, any supporting infrastructure will need to support brokered, content-based and stateful applications. In addition, while some applications need to support rich expressive subscriptions, others need to be very scalable (e.g., support large numbers of subscriptions). Some applications need to both support rich subscriptions as well as be very scalable. As described below, many pub-sub frameworks are oriented towards either scalability or richness, but not both. Finally, many pub-sub applications are data-centric applications. Consequently, one expects that the principles of pub-sub applications should share some similarity with the principles of database systems.

In notification applications, a basic requirement is to evaluate subscriptions at correct times. Some subscriptions are event-triggered, meaning they are evaluated when events arrive. Other subscriptions are schedule-based, meaning that the subscriptions are evaluated at specific times. For small systems, such requirements can be met by simply defining each subscription as its own query, and running the queries at appropriate times. However, when there are large numbers of subscriptions, running thousands or millions of individual queries evaluation thereof does not scale well.

Figure 9:
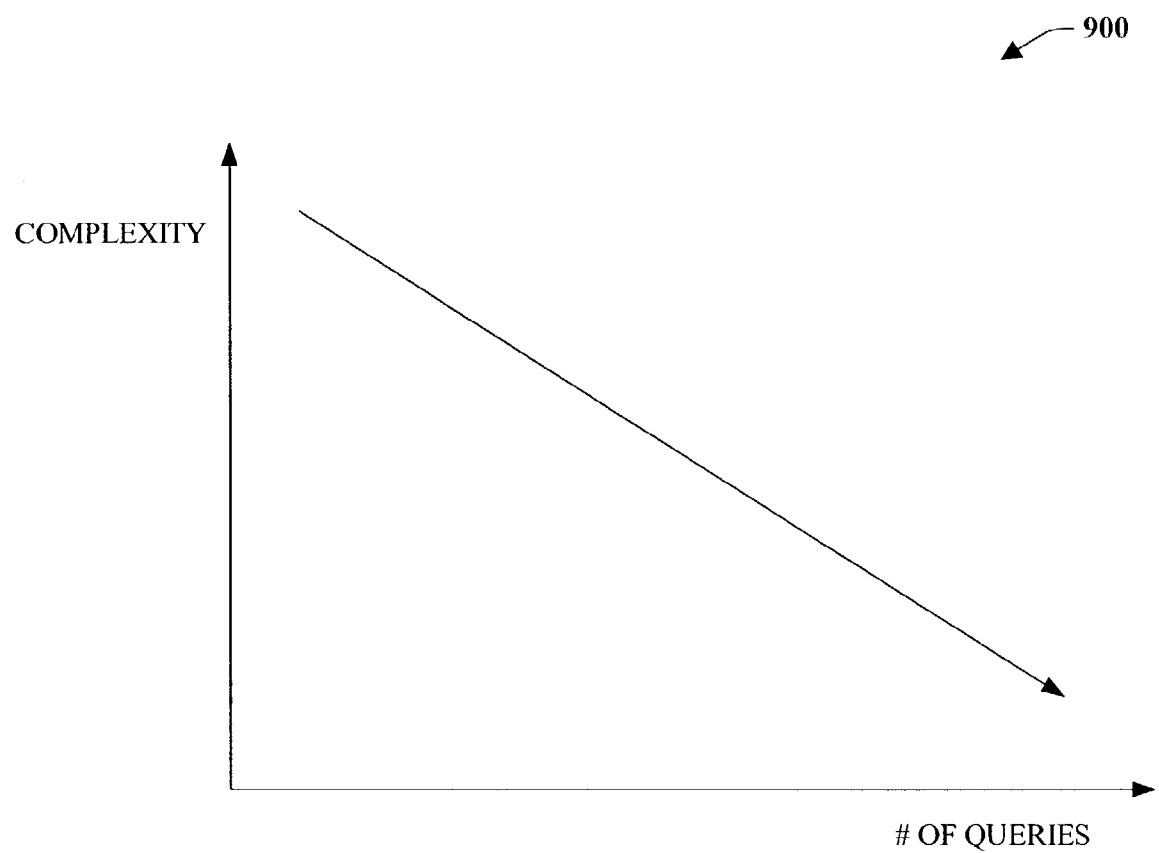
FIG. 9 is a graph depicting a facet of the publication subscription problem.

Referring to FIG. 9, a graph 900 depicts one facet of the publication subscription (Pub-Sub) problem. This problem is difficult to resolve with respect to scalability for at least several reasons. First, a trivial query yields less value than a complex query. Second, an application does not have unlimited time and resources. Third, there will be a large number of queries due to a natural diversity of interests among subscribers and their respective information needs and delivery preferences. Thus, to increase the number of queries necessitates a lower level of query complexity and vise-versa, as shown by graph 900. Consequently, a problem becomes how does one match a large number of complex queries, represented by subscriptions, with a large number of events or publications in an rapid and efficient manner?

To solve this problem the subject notification system takes advantage of the realization that subscriptions typically share a common structure. Millions of users may want to receive urgent news notifications. Thousands of users may want to know the result of a business event. If subscriptions share a common structure, the subscriptions can be parameterized. The subject invention leverages off of this observation via employment of subscription templates based at least in part upon common structures associated with subsets of queries; and subscribers can simply propagate various parameters to customize respective template. Instead of treating individual subscriptions as queries, the notification system treats individual subscriptions as parameter data. The evaluation of large numbers of subscriptions becomes a set-oriented data processing problem, for which database engines like SQL are well suited. This is the foundation of the notification system-programming framework. In this model, event-triggered subscriptions are evaluated by simply executing a database join between new events that have arrived and a large set of subscriptions.

In general, the notion of modeling subscriptions as data is based on an assumption that if the notification system defines various domains, then many queries will be common. For instance, many subscribers are interested in urgent, but at a finer granularity respective subscribers desire information about different types of news. Thus, an interest in a particular news item can be expressed as "BREAKING-NEWS" and "BUSINESSNEWS" so as to provide a common framework or parameter(s) for such information.

The subject invention also encompasses a programming model for building subscription applications. In subscription applications a user establishes subscriptions or declarations of interest in certain kinds of targeted information. Thereafter, when the information becomes available, the subscription application sends a notification to the subscriber. A function of a subscription application is to match incoming data with the set of user subscriptions to determine what notifications need to be delivered.

The subject programming model allows an application developer to write a small amount of application specific code (e.g. a mix of XML, SQL, and possibly C#) to build a fully-functional, rich subscription application. To enable such functionality, an execution engine can be built on top of SQL Server and the NET frameworks, for example, that implements the fundamental data constructs and execution semantics common to subscription applications. Thus, the subject programming model reduces development time, facilitates application maintenance and increases application efficiency by leveraging the power of a server, for instance SQL Server, to do subscription and event matching. The subject invention is a declarative programming model for building subscription applications. The programming model provides a base framework for the structure of applications; and a developer can adapt the base framework to build a specific application.

Figure 10:
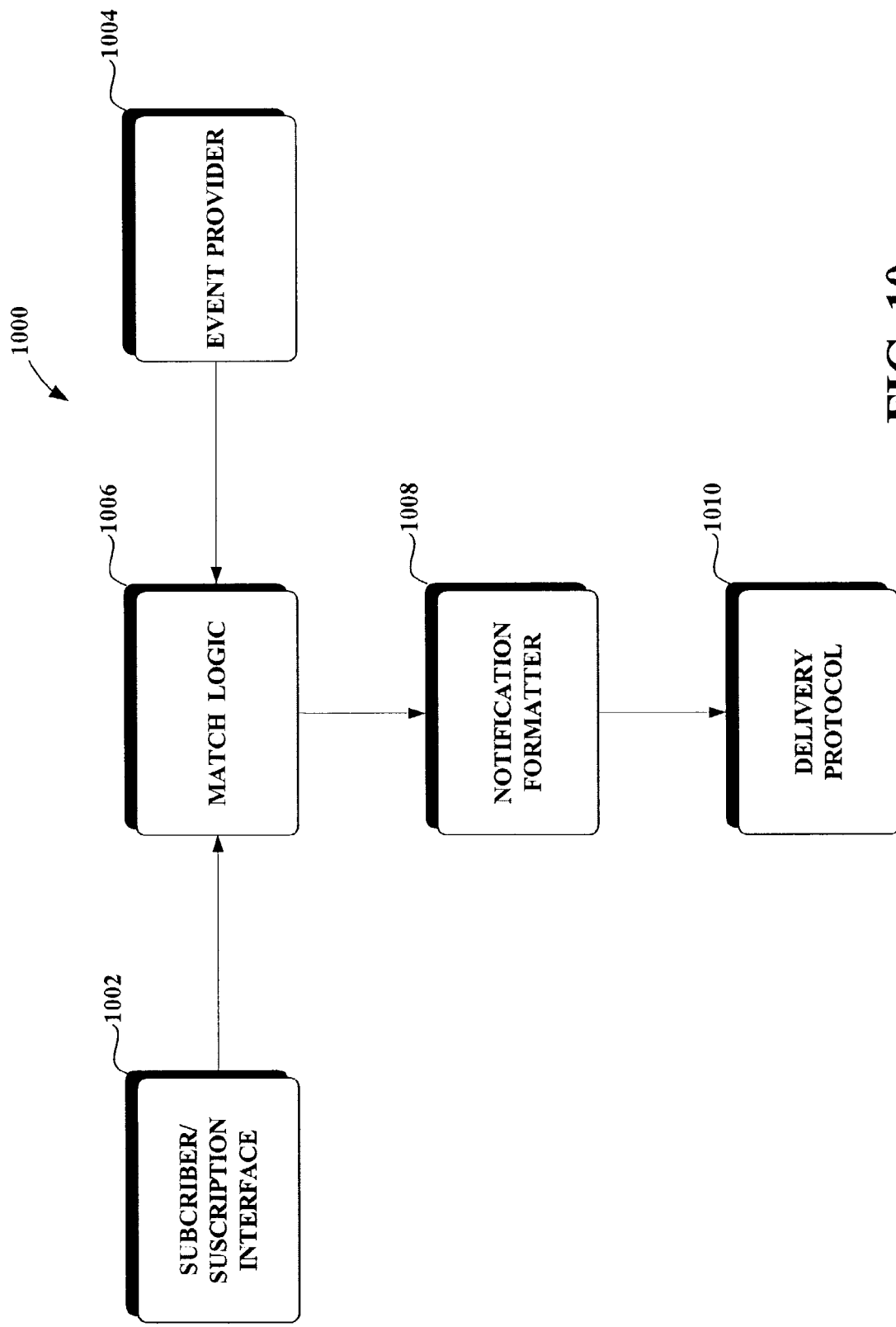
FIG. 10 is a block diagram depicting a subscription application in accordance with an aspect of the present invention

Turning to FIG. 10, a system 1000 depicts a subscription application in accordance with an aspect of the present invention. The system 1000 is illustrated and discussed with respect to five components: a subscriber/subscription interface 1002, event provider 1004, match logic 1006, notification formatter 1008, and delivery protocol 1010. It is to be appreciated that functionality associated with the various components can be combined into lesser components or extended across a larger number of components, and the description herein is intended to simply provide one particular scheme for carrying out the principles of the subject invention. Broadly speaking, the subscriber/subscription interface 1002 provides a means by which information about subscribers and their subscriptions enter the system 1000. The event provider 1004 is the component that submits new events into the system. Match logic 1006 provides rules for matching events with subscriptions. The notification formatter 1008 transforms raw notification data from match logic component 1006 into a form presentable to the end recipient. The delivery protocol 1010 is an implementation of network protocol necessary to deliver the formatted notification to its intended recipient.

Each of the above components of a subscription application can be constructed on entities provided by the programming model simply by supplying customizing information. Such customizing information is supplied by an application developer in the form of a subscription schema, an event schema, an event source, match rules, formatting transforms, and event protocols. The subscription schema specifies the structure and form of the data that needs to be kept for each subscription. For example, in a stock alerting application, each subscription would store the name of each stock symbol. Event schema indicates the structure and form of the events that enter the system. For instance, in the stock alert application, each event would contain a stock symbol as a string, and its current price, represented as a floating-point number, for example. The event source identifies the location from which events should be read. Match rules are a set of rules, possibly specified in T-SQL, for matching events with subscriptions. For example, the match rules can be SQL joins that match respective tables of information relating to providing notification services in accordance with the subject invention. Formatting rules are a set of transforms, e.g. XSL Transforms, for formatting raw notification data provided by the matching logic. Protocol headers are a set of configuration parameters for the set of delivery protocols that are supported by the notification services engine.

Figure 11:
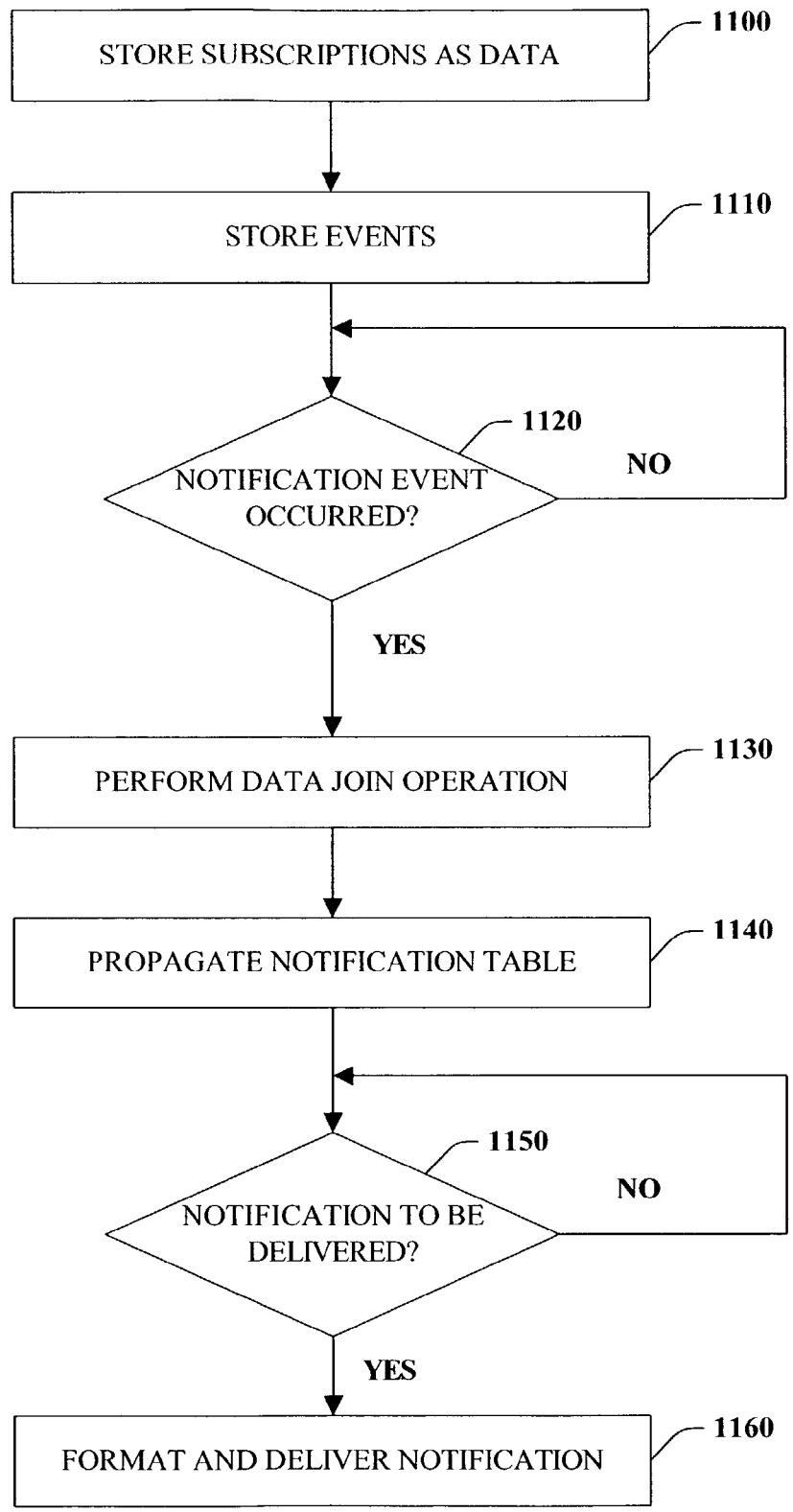
FIG. 11 is a high-level flow diagram relating to generating notifications in connection with one specific aspect of the subject invention.
Figure 12:
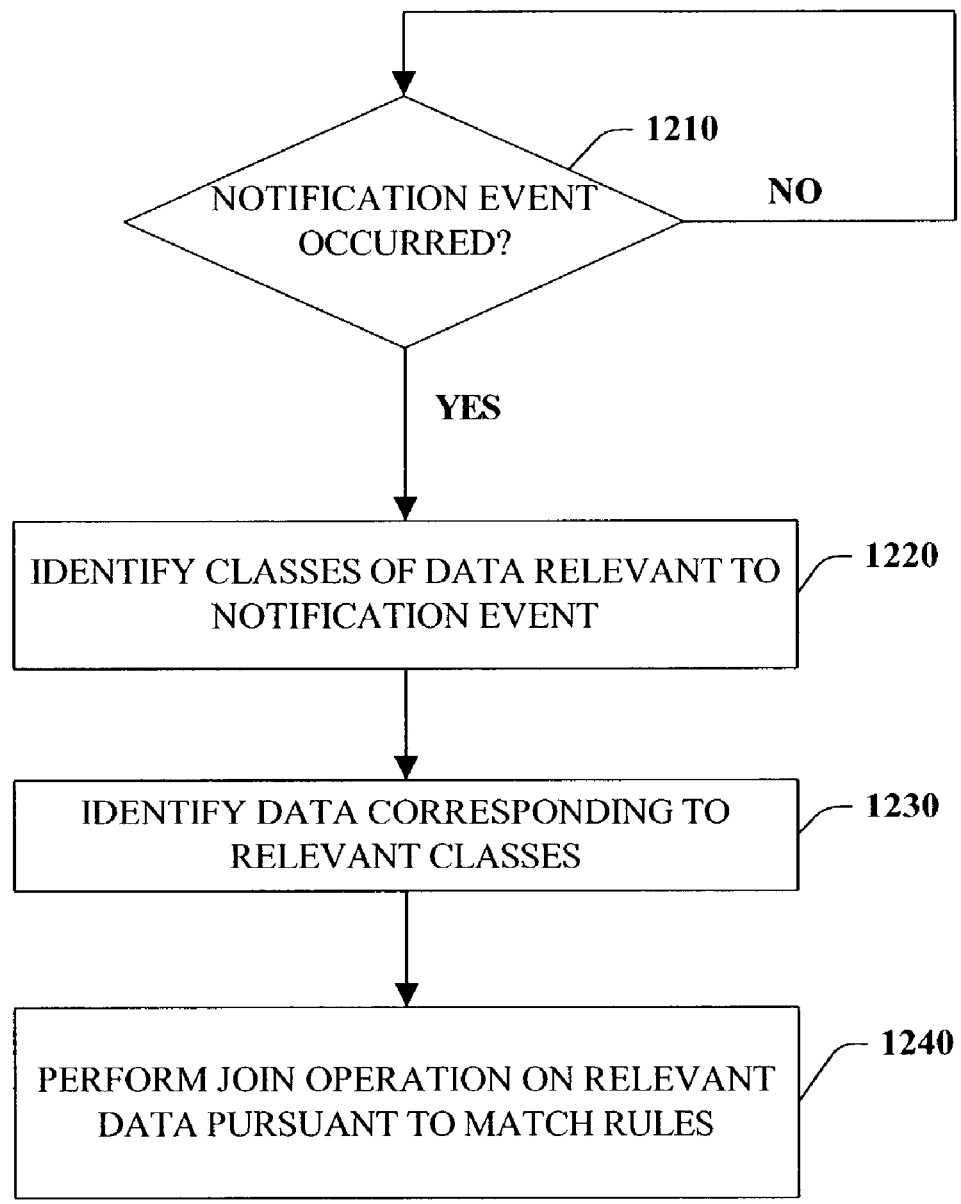
FIG. 12 is a high-level flow diagram of relating to generating notifications in connection with one specific aspect of the subject invention.

In view of the foregoing structural and functional features described above, methodologies in accordance with various aspects of the present invention will be better appreciated with reference to FIGS. 11 and 12. While, for purposes of simplicity of explanation, the methodologies of FIGS. 11 and 12 is depicted and described as executing serially, it is to be understood and appreciated that the present invention is not limited by the illustrated order, as some aspects could, in accordance with the present invention, occur in different orders and/or concurrently with other aspects from that depicted and described herein. Moreover, not all illustrated features may be required to implement a methodology in accordance with an aspect the present invention.

FIG. 11 illustrates a high-level methodology for generating notifications in connection with one aspect of the subject invention. At 1100, subscriptions are stored as data. In particular, as described herein, the subject invention provides for modeling subscriptions as data. For example, subscriptions queries can be abstracted to high-level data fields and databases storing the data fields propagated with subscription specific data. Such modeling of subscriptions as data mitigates the need to perform notifications on a subscription by subscription basis as in many conventional notification schemes. At 1110, event information is stored, and at 1120 a determination is made as to whether or not a notification event has occurred. If NO, the process returns to 1120, but if YES a join operation is preformed at 1130. Although, this act is described at a high level for ease of understanding, it is to be appreciated that as an option a join can always be performed when a batch of events enters the system, but that join may yield no notifications The join operation joins data classes of information (subscription classes, subscriber classes) relevant to the particular notification event to generate notifications in connection with the subject invention. The notifications can be generated initially as a notification table that is subsequently propagated with notification information at 1140. At 1150, a determination is made as to whether or not a notification is to be delivered. If NO, the process returns to 1150; if YES, at 1160 the notification(s) are formatted and delivered in accordance with recipient delivery preferences, recipient and device state(s) as well as in accordance with recipient device/mode capabilities.

FIG. 12 illustrates in greater detail one particular join operation in connection with the subject invention. At 1210, a determination is made as to whether or not a notification event has occurred. For example, a notification event can be a stock price increase. If a notification event has occurred, at 1220 and 1230 classes of data (e.g., type of stock, price, subscriber(s) . . . ) and specific data corresponding to the classes relevant to the notification event are identified. At 1240 a join operation is performed pursuant to match rules in accordance with the present invention. The join operation can be performed by a database engine (e.g., SQL server) and tables corresponding to the relevant classes are joined via a database join function. The join function can be controlled by pre-defined match rules that govern how various data classes are to be associated. The join operation results in notification data being generated relevant to the particular notification event. As can be appreciated the subject methodology mitigates the need to individually process independent subscriptions per subscriber per notification event. By performing a join operation at a data class level, batches of common subscriptions can be processed concurrently thus providing for increased scalability as compared to many conventional notification schemes.

Figure 13:
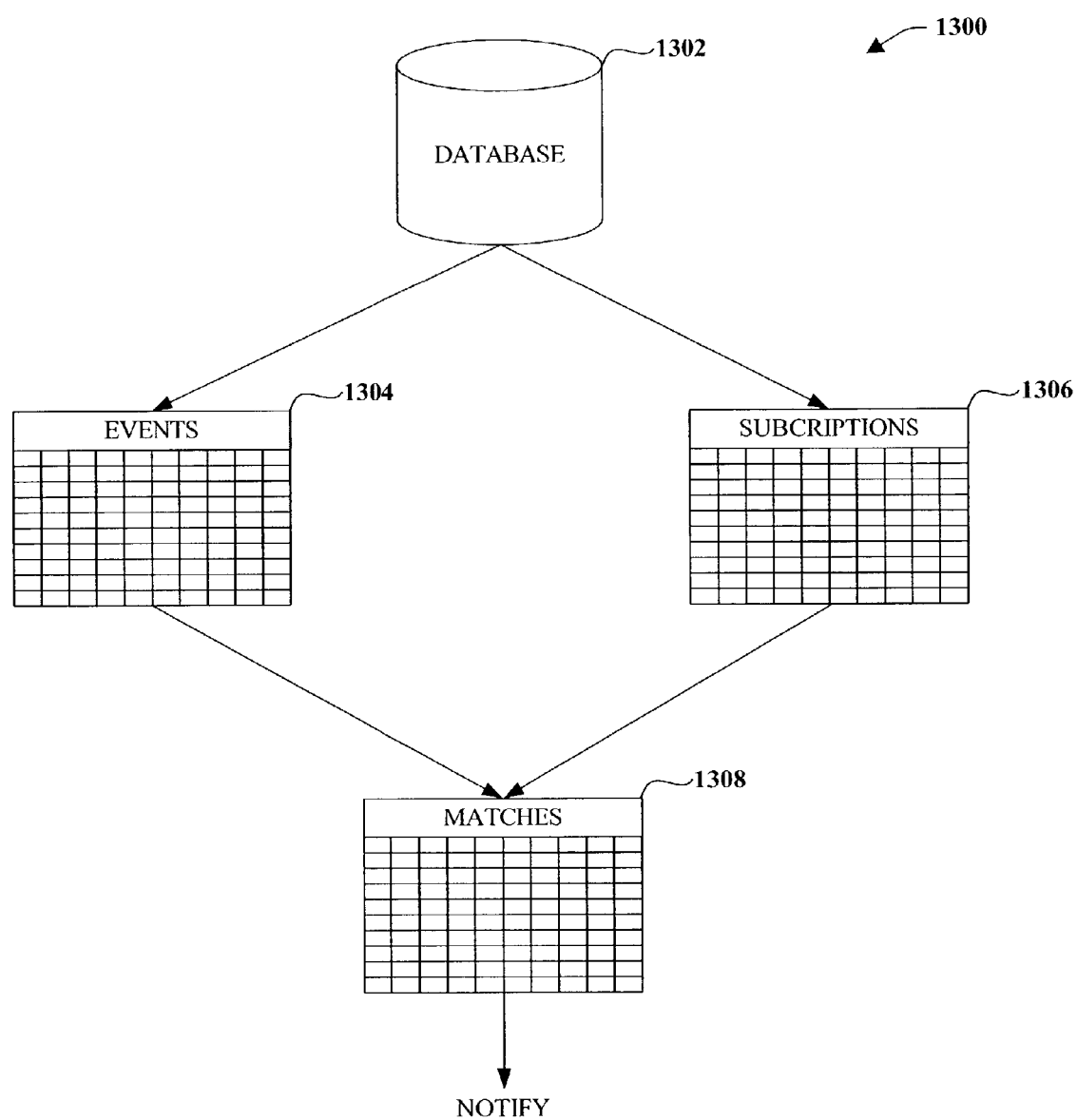
FIG. 13 illustrates a system for producing notifications in accordance with an aspect of the present invention.

Turning to FIG. 13, a system 1300 for producing notifications is illustrated in accordance with an aspect of the subject invention. Database base 1302 may house both subscription and event data in well organized and indexed tables. It should be understood that although a single database 1302 is being shown for exemplary purposes, multiple databases are contemplated by the subject invention. Moreover, events 1304 and subscriptions 1306 are extracted from the database and matched by a standard transactional database joining operation to produce a table of individual notifications 1308. For example, assuming the invention is being used for a stock alert application, a user is interested in knowing when a particular stock price is equal to or greater than a specified price, for example when Company A is higher than 120. In this case an event 1304 is made of Company A, the stock symbol, and the current price "STOCKVALUE." A subscription 1306 is then established including Company A (STOCKSYMBOL) and 120 (TRIGGERPRICE). Then, using a database join operation the events 1304 are joined with the subscriptions 1306 on Company A (STOCKSYMBOL) with the condition that "STOCKVALUE" is greater than or equal to "TRIGGERPRICE." The resulting rows in the joined table represent the matches 1308 for which individual notifications should be sent.

Expanding this model, notification services can implement the following broad categories of subscriptions:
The simple event-triggered subscriptions described above.
Subscriptions that are evaluated according to a schedule.
Subscriptions based on event history.
Subscriptions based on application state (e.g., event history, subscriber-specific state, subscription-specific state, and other state(s) associated with the application, independent of any of the aforementioned—for example, total number of events processed).
Subscriptions that utilize external databases.

Using the set-based notification services model, application developers can quickly create a robust and scalable notification application. Application development is relatively easy, and performance gains are large.

The application developer is responsible for creating the programmatic elements of a notification services application; whereas the system administrator is responsible for installing, configuring and managing notification services. The individuals serving in these roles should work together when planning a system, to ensure that the system is written and configured to be optimal for their environment and business purposes.

The notification services platform (comprising the notification services service and the system databases), stores system data and provides functions for notification generation and distribution. The application developer is responsible for completing the following items:

1. Creating an application definition file (ADF), and filling out metadata nodes.
2. Specifying one or more event classes in the application definition file. Event class(es) corresponding to particular event types accepted by the application.
3. Specifying one or more notification classes in the application definition file. Notification class(es) corresponding to one particular kind of notification generated by the application.
4. Specifying one or more subscription classes in the application definition file.
   Subscription class(es) corresponding to one particular kind of subscription accepted by the application. Specifying a subscription class includes writing rules, which are Transact-SQL statements that either generate notifications, or update chronicle tables. These rules can be invoked when an event provider submits a new batch of events, or on a scheduled basis, or both.
5. Completing the application settings in the ADF.
6. Writing a subscription management application that allows users to subscribe to the service and receive notifications. Many subscription management applications are web based. The subscription management application accepts and validates information about the subscriber, the target devices that the subscriber is using for notification delivery, and the subscriptions that specify the information that the subscriber would like to receive. Notification Services APIs are used to add, update, or delete this information in the system databases.
7. Define an event provider that monitors an external entity and generates an event each time something noteworthy happens. You may use one of the standard event providers included with Notification Services, or you may develop a custom event provider tailored to your specific business needs.
8. Optionally, creating one or more XSLT files for use by the standard XSLT content formatter. These XSL transforms will be used to format the raw notification data appropriately for display, based on the language, locale, and device type of the recipient. Alternatively, you may develop a custom content formatter tailored to your specific business needs.
9. Build a custom delivery protocol if one is desired or needed.

Figure 14:
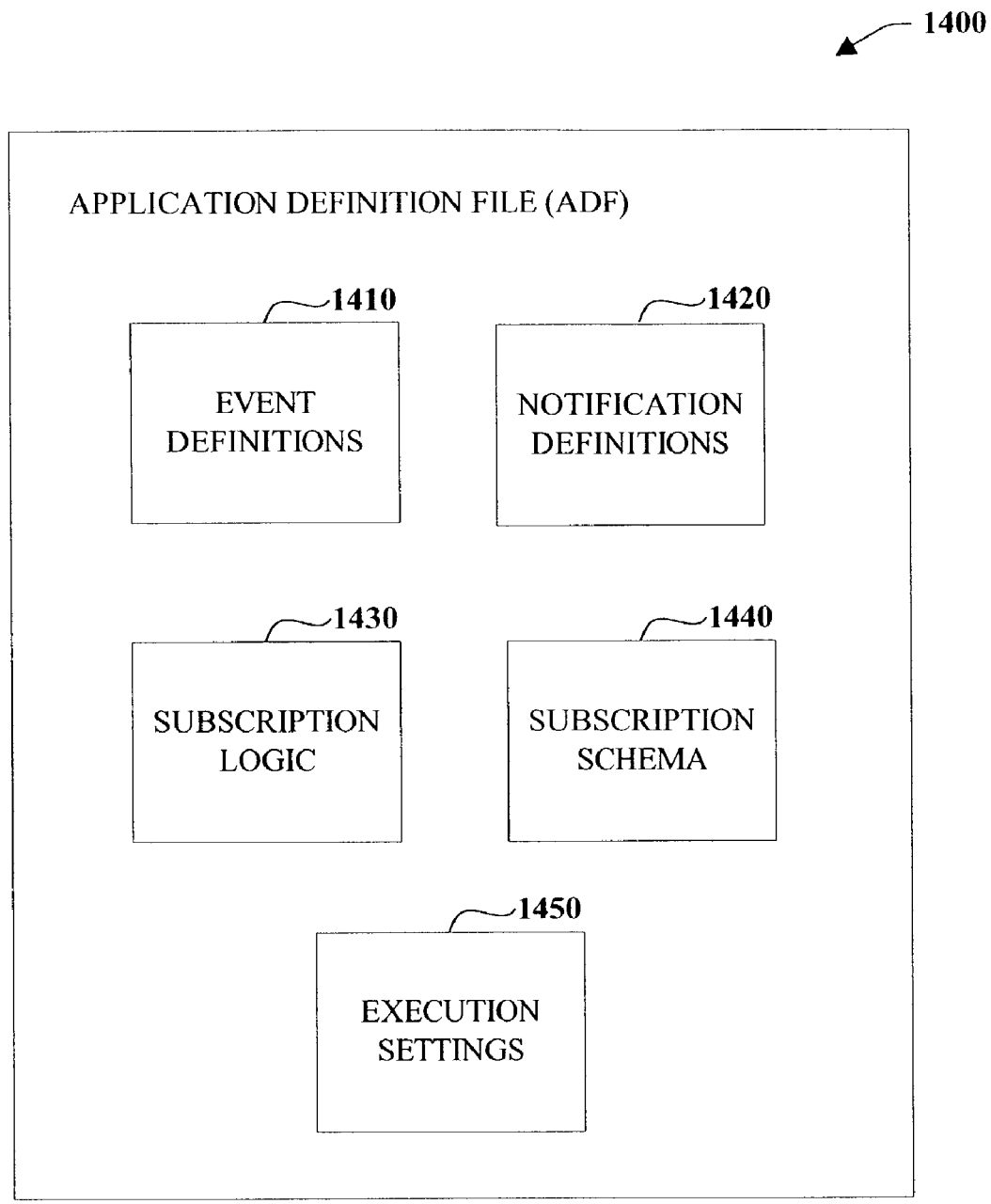
FIG. 14 is a block diagram depicting an ADF and its components in accordance with an aspect of the present invention.

The application developer creates an application by producing an application definition file (ADF), among other things. Specifically, the developer should include as input into the notification services system subscription schema, event schema, event source, match rules, formatting transforms and protocol headers, as defined above. The application developer should provide the aforementioned information in the ADF, which can be in formatted as an Extensible Markup Language (XML) document, for example. The schema of the ADF is defined as part of the programming model. More particularly, the XML schema defines XML elements, which enables the developer to specify the required information. The system then processes or compiles the ADF and saves its contents to the configuration database. Thereafter, the notification services system builds application specific database tables from the schema information provided. After these database tables are created, the application can be run by invoking a service (e.g., Win32) service provided by the programming model. This service employs the configuration information supplied in the ADF to customize components provided by the programming model. Additionally, the system provides a generic matching component that applies match rules provided in the ADF to the incoming event and subscription data. Furthermore, the system may implement a set of generic delivery protocols that deliver notifications for a specific application by reading the provided information into the application's ADF and tailoring their behavior accordingly. Thus, both static (database tables and structures) as well as dynamic (running code) parts of the application can be built from components of the system, and customized through the ADF Turning to FIG. 14, a block diagram depicting an ADF 1400 and its components is illustrated in accordance with an aspect of the present invention. The ADF 1400 defines central logic of the application and contains schemas for events, subscriptions, and notifications; the rules for matching events with subscriptions; and may provide the name of the file used to format generated notifications. The ADF 1400 generally includes five components: event definitions 1410, notification definitions 1420, subscription logic 1430, subscription schema 1440 and execution settings 1450. It is to be appreciated that the functionality of the various components can be combined into a lesser number of components or extrapolated into a larger set.

The event definitions 1410 specify structure of event data, the event providers that collect the data, and the structure of any event chronicles used by the application. The notification definitions 1420 specify the structure of raw notification data, the formatting for the messages that will be sent to subscribers, and the delivery protocols used to send the messages. The subscription logic 1430 defines how subscriptions are evaluated. Transact-SQL statements, for example, may match subscriptions to events, or evaluate subscriptions at certain recurring times. Additionally, subscription logic 1430 can be parameterized in a well-defined manner, so that individual subscriptions can personalize the subscription logic. Further, the subscription schema 1440 defines the structure of the subscription parameters, and evaluation times define when subscriptions are to be evaluated. Finally, the execution settings 1450 allow an application developer to enhance behavior and performance of the application when executed by notification services.

Additionally, the application developer may define application settings in several sections of the application definition file (ADF). These settings specify such items as the machines that host notification services, and execution schedules for notification services functions—they also document metadata about the ADF itself. This includes the structure of the events and subscriptions that the application accepts as input, and the structure of the notifications it produces. Examples of such metadata, described in detail below, include but are not limited to generator settings, distributor settings, vacuuming, version settings, notification history, application database information, application executing settings, and distributor information.

The notification services component 220 (FIG. 2) includes a generator component (not shown) within the notification engine 310 (FIG. 3) that matches events to subscriptions and ultimately produces notifications. Generator setting considerations may be defined in a <Generator> node in the ADF. One consideration that should be taken into account is how many threads the generator may use to process event batches. Such a factor can be considered a trade-off between improving application speed and monopolizing system resources. Part of such consideration is evaluating how much benefit can be gained by adding more threads. It is appreciated that some operations do not lend themselves to better efficiency through parallelism and may sometimes become less efficient. To indicate this information, a value can be specified for in a <ThreadPoolSize> element in the <Generator> node.

Functionally, the notification services generator attempts to execute event chronicle rules in parallel, followed by subscription rules (both event rules and scheduled rules). The generator will attempt to utilize threads available within the thread pool while executing rules. However, it should be noted that the generator should not execute event chronicle rules in parallel with subscription rules, since the chronicle table 510 (FIG. 5) data that the event chronicle rules maintain must be updated before the subscription rules that might reference it are processed.

The generator may then use the <ThreadPoolSize> value, if specified, to determine how many operating system threads it can use in this parallel processing. If no value is specified, the system may default, for example, to an allocation of up to 25 threads per processor for parallel rule execution. The default value is meant to make sure there is always a dedicated thread for each rule that is processed, thereby ensuring maximum throughput. Specifying a higher value for <ThreadPoolSize> would burden the system with thread-switching overhead without improving application performance. However, developers may be inclined to provide a lower value for the <ThreadPoolSize> element if the consumption of processor time is a concern of the system. By lowering the thread pool size, generator processing speed will decrease, but the generator's demand for system resources will also decrease.

The following example indicates that the generator for an application runs on the server SIF (Source Intermediate Format), and may process notification services requests on up to 5 threads. The machine name of the server that hosts the notification services instance that provides the generator function is provided in the <SystemName> element.

```
<Generator>
<SystemName>SIF</SystemName>
<ThreadPoolSize>5</ThreadPoolSize>
</Generator>
```

A value specified for distributor settings should also be considered in terms of a trade-off between improving application speed and monopolizing system resources.

A quantum is a block of time used by the notification services 302 (FIG. 3) to determine how frequently to trigger system functions. A <QuantumDuration> element may be used in a <Distributor> node to determine how frequently the distributor 314 checks for available work items. The <QuantumDuration> value can be employed to optimize distributor performance relative to the workload on the server. Smaller quantum durations can cause more frequent firing of the distributor, which can mean faster notification formatting and delivery for the application, or less latency in picking up new work items. Smaller quantum durations also mean that the distributor 314 can be occupying more processor time overall, and will therefore require more server resources. Application developers can therefore employ the <QuantumDuration> value to trade off between application speed and resource consumption, based on system specifics.

Notification services stores event and notification data in server tables. Data becomes obsolete once the notifications related to it are delivered. Therefore, a vacuuming function may be used to identify and delete obsolete data. The vacuuming function of notification services is called the vacuumer. The vacuumer is important, because it reclaims disk space and enhances application performance by keeping the number of records in the system to a minimum, thereby improving the speed with which a server, such as SQL Server, can search application tables.

The vacuumer may run based on a schedule defined in a <Vacuum> element of an <ApplicationExecutionSettings> node (discussed in further detail infra).

Functionally, the vacuumer may operate by reading the system clock on the database server when it first starts executing. It can then identify all expired data, by determining if it is older than an interval specified in a <RetentionAge> element, based on the current time. For example, assume the following is true:

The current time is 22:00:00 on January 28

The retention age is set to three days

There is event data that is timestamped at 19:00:00 on January 25

In this case, the vacuumer will identify and delete the event data that expired at 19:00:00 on January 28.

Generally, the vacuumer can operate to limit the number of records it deletes in one unit of work, based on a maximum number of records per table, thereby limiting the duration of each unit of work. This allows the vacuumer to function without taxing system resources and slowing application processing too much. Each time the vacuumer completes a unit of work, it can check the system clock to see if it has exceeded a particular duration, if one is actually specified. It also can check the database to determine if the application, with which it is associated, has been disabled. If either of these events has occurred, the vacuumer shall stop, log a message in an event log, and sleep until the next event.

Version information records provide a simple audit trail of application changes, if application developers desire to associate version numbers with the application definition file, or ADF. Developers can document such information by creating a <Version> node in the ADF. Documenting version information in the ADF allows developers to easily determine which version of notification services the ADF was written to work with.

Even though notification services may not verify or require the version information in the ADF, maintaining version information is recommended.

The <Version> node can include four child elements: <Major>, <Minor>, <Build>, and <Revision>. The following example depicts how a developer may set a version number of 1.0.24.8 for the application version:

```
<Version>
    <Major>1</Major>
    <Minor>0</Minor>
    <Build>24</Build>
    <Revision>8</Revision>
</Version>
```

Application developers may also wish to maintain history information about the creation and subsequent updates to your application definition file, or ADF. Developers can document this information by creating a <History> node in the ADF.

Documenting history information allows developers to easily see when the ADF was created, and when it was last modified. This information is for the developer's own use, and as such may not be referenced or validated in any way by notification services. Furthermore, if decided that document history information is not going to be specified, then the <History> node must not be included in the ADF.

The following exemplary code sets the application creation time as 10:30 GMT on Sep. 22, 2001, and the application last update time as 22:30 GMT on Oct. 25, 2001:

```
<History>
    <CreationDate>2001-09-22</CreationDate>
    <CreationTime>10:30:00</CreationTime>
    <LastModifiedDate>2001-10-25</LastModifiedDate>
    <LastModifiedTime>22:30:00</LastModifiedTime>
</History>
```

Developers may also specify information about an application database in a <Database> node of the ADF. However, if the developer chooses not to specify application database information, the <Database> node should not be included in the ADF. In the absence of such information, server defaults can be employed when creating the application database.

For example, a <Database> node may be defined to include four optional child elements:

<NamedFileGroup>
<LogFile>
<DefaultFileGroup>
<CollationName>

The <NamedFileGroup> node might contain information about the application database data files on a particular server filegroup. One or more <NamedFileGroup> nodes could then be specified in the <Database> node. If the developer then chooses to create one or more <NamedFileGroup> nodes, then one of these nodes could represent the primary filegroup for the application, and named "Primary". The primary filegroup might then be used as the default for the application database files if no <DefaultFileGroup> setting is specified. It should be noted that servers, such as SQL Server, provide such filegroups to simplify database administration, as well as to allow for optimal allocation of system data across multiple physical disks.

The <NamedFileGroup> element might contain two child elements: <FileGroupName> and <FileSpec>. Both of these elements of which could be required. Furthermore, the application developer may specify the name of a SQL Server filegroup they are referencing in this <NamedFileGroup> node in the <FileGroupName> element.

A <FileSpec> node might contain information about an application database data file that resides on the filegroup specified in the <FileGroupName> element. Developers may specify one or more <FileSpec> nodes in the <NamedFileGroup> node. The <FileSpec> node could contains five child elements itself: <LogicalName>, <FileName>, <Size>, <MaxSize>, and <GrowthIncrement>

Application developers would then specify the logical name of the application database data file in the <LogicalName> element. The logical name could then be used to refer to the file in all Transact-SQL statements, for example.

The full path and physical file name of the data file might be specified in a <FileName> element. Further, developers may specify the initial size of the data file in the <Size> element. The value of this element might be a non-negative integer indicating the database size, with an optional suffix to indicate the unit of measure. The kilobyte (KB), megabyte (MB), gigabyte (GB), or terabyte (TB) suffixes may be used. If the suffix is not specified, the unit of measure may default to megabytes (MB), and the <FileSpec> should be excluded from the ADF.

Developers may also specify a maximum size of the data file in the <MaxSize> element. The value of this element could be a non-negative integer indicating the database size, with an optional suffix to indicate the unit of measure. The kilobyte (KB), megabyte (MB), gigabyte (GB), or terabyte (TB) suffixes may be used. If the suffix is not specified, the unit of measure will default to megabytes (MB). Moreover, if the <MaxSize> element is not specified, the element should be excluded from the <FileSpec> node.

Application developers may optionally specify the growth increment of the data file in a <GrowthIncrement> element. The value of this element could either be the increment size, or a percentage. If the developer chooses to indicate the increment size, the value should be specified as a non-negative integer, with an optional suffix to indicate the unit of measure. The kilobyte (KB), megabyte (MB), gigabyte (GB), or terabyte (TB) suffixes may be used. If the suffix is not specified, the unit of measure might default to megabytes (MB). If developers specify a percentage, the database will grow by that percentage of the current database size if it runs out of room and needs to expand. This element must be excluded from the <FileSpec> node if is not going to be used.

Furthermore, one or more <LogFile> nodes may be specified in the <Database> node. The <LogFile> node contains information about an application database log file. In particular, a <LogFile> node contains exactly the same elements as the <FileSpec> portion of the <NamedFileGroup> node. The only difference is that it is describing a log file rather than a data file.

Additionally, developers may specify the name of the default server filegroup that they wish to use for application database data files in a <DefaultFileGroup> element. This filegroup must be one of those specified in a <NamedFileGroup> node. Developers must exclude this element from the <Database> node if they choose not to use it.

Developers may specify the name of the default collation that they wish to use for their application database in the <CollationName> element. The collation of a database determines the languages it supports, and the sort order with which query results are returned. The value of this element could be the full collation name of either a Windows® or a SQL Server collation, for example. If the developer chooses do not provide a <CollationName> value, the application database collation will be the same as the default collation of the server instance that hosts the database. Moreover, developers must exclude this element from the <Database> node if they choose not to use it.

The following example depicts an application that has two named file groups, Primary and Secondary, and a log file named StockLog. It uses the Secondary filegroup as its default filegroup, and uses the SQL_Latin1_General_Cp437_BIN collation:

```
<Database>
  <NamedFileGroup>
    <FileGroupName>Primary</FileGroupName>
    <FileSpec>
      <LogicalName>StockPrimary</LogicalName>
      <FileName>C:\SQLData\StockPrimary.mdf</FileName>
      <Size>2GB</Size>
      <MaxSize>5GB</MaxSize>
      <GrowthIncrement>500MB</GrowthIncrement>
    </FileSpec>
  </NamedFileGroup>
  <NamedFileGroup>
    <FileGroupName>Secondary</FileGroupName>
    <FileSpec>
      <LogicalName>StockSecondary1</LogicalName>
      <FileName>D:\Data\StockSecondary1.ndf</FileName>
      <Size>1000MB</Size>
      <MaxSize>5000MB</MaxSize>
      <GrowthIncrement>25%</GrowthIncrement>
    </FileSpec>
    <FileSpec>
      <LogicalName>StockSecondary2</LogicalName>
      <FileName>D:\Data\StockSecondary2.ndf</FileName>
    </FileSpec>
  </NamedFileGroup>
  <LogFile>
    <LogicalName>StockLog</LogicalName>
    <FileName>E:\Logs\StockLog.ldf</FileName>
  </LogFile>
  <DefaultFileGroup>Secondary</DefaultFileGroup>
  <CollationName>SQL_Latin1_General_Cp437_BIN</CollationName>
</Database>
```

Developers are required to maintain information about the machines that host the notification services instances that provide the one or more distributor functions that service the application. This information may be stored in the <Distributors> node of the application definition file.

Within the <Distributors> node, developers may create a <Distributor> node for each distributor that services the application. The <Distributor> node can then be defined further as comprising three child elements:

<SystemName>
<ThreadPoolSize>
<QuantumDuration>

Additionally, it should be noted that <ThreadPoolSize> and <QuantumDuration> elements are optional and are described supra. Developers should, however, specify the machine name of the server that hosts the notification services instance that provides the given distributor function in the <SystemName> element.

The value of the <ThreadPoolSize> element will determine the amount of work the distributor can perform in parallel, and will affect the overall speed of the notification services system. Also, the number of distributors specified in the <Distributors> node will affect system performance.

The following is an exemplary application that has two distributors. The first runs on the server THORFINN, uses a distributor quantum period of 30 seconds, and uses the default thread pool size. The second runs on the server HARALD, uses the default distributor quantum period of 1 minute, and may process notification services requests on up to 5 threads:

```
<Distributors>
  <Distributor>
    <SystemName>THORFINN</SystemName>
    <QuantumDuration>P0DT00H00M30S</QuantumDuration>
  </Distributor>
  <Distributor>
    <SystemName>HARALD</SystemName>
    <ThreadPoolSize>5</ThreadPoolSize>
  </Distributor>
</Distributors>
```

It may also be desirable to maintain execution information about an application. This may includes such things as:

How frequently the generator fires. The period between each firing of the generator being referred to as a quantum.

How the application handles processing backups.

Whether rules are fired based on event batch arrival times or on quantum periods.

How frequently the performance query is processed.

How frequently expired event, notification, and batch header data is removed from the system.

An <ApplicationExecutionSettings> node may be created in the application definition file (ADF) in order to specify values for these settings. However, such a node should be excluded from the ADF if the developer chooses not to specify application setting. System defaults could then be used in that case.

An exemplary <ApplicationExecutionSettings> node might include the following six optional child elements:

<QuantumDuration>
<ChronicleQuantumLimit>
<SubscriptionQuantumLimit>
<ProcessEventsInOrder>
<PerformanceQueryInterval>
<Vacuum>

Developers might subsequently specify the value of the <QuantumDuration> element as defined previously.

Developers may also specify the number of quantums that the logical generator clock can fall behind the real time clock before processing of event chronicle rules is skipped in order to catch up. Developers could use the <ChronicleQuantumLimit> element to document this value. If a value for the <ChronicleQuantumLimit> element is not specified, then the system could default to a chronicle quantum limit of 1440 minutes (1 day, assuming a quantum interval of 1 minute) in this case.

Additionally, developers may specify the number of quantums that the logical generator clock can fall behind the real time clock before processing of subscription rules (both event and scheduled) is skipped in order to catch up. Developers should use the <SubscriptionQuantumLimit> element to document this value. If a value for the <SubscriptionQuantumLimit> element is not specified, then the system could default to a subscription quantum limit of 30 minutes (assuming a quantum interval of 1 minute).

Application developers may also indicate whether event and subscription rules are fired when an event batch comes in (known as sub-quantum sequencing), or whether they are fired once per quantum period, regardless of event batch arrival time (known as quantum sequencing). Developers should use the <ProcessEventsInOrder> element to document this information. A Boolean value should be specified for this element, with "true" indicating that sub-quantum sequencing has been selected and "false" indicating that quantum sequencing has been selected. If a value for the <ProcessEventsInOrder> element is not specified, the system could default to quantum sequencing.

A <PerformanceQueryInterval> element may be specified to denote how frequently the high-overhead performance counters get updated. The <PerformanceQueryInterval> element value should be specified as an XML duration data type. If a value for the <PerformanceQueryInterval> element is not specified, the element must be excluded from the <ApplicationExecutionSettings> node. In such a case, the performance query interval will default to 1 minute.

Developers may specify how frequently old event, notification, and batch header data is removed from the system in the <Vacuum> element, as discussed above. The <Vacuum> element may comprise two optional child elements: <RetentionAge> and <VacuumSchedule>.

The minimum retention period for system data may be specified in the <RetentionAge> element. Data will not be vacuumed any earlier than the period specified by this element, although it will not necessarily be vacuumed immediately upon expiration of the specified period. The <RetentionAge> element value could be specified as an XML duration data type. Please refer to the information about the <QuantumDuration> element, above, for details on this format.

Scheduling information for the vacuuming process may be specified in the <VacuumSchedule> element. The <VacuumSchedule> element has one required child element, <Schedule>. Developers may specify multiple <Schedule> elements, one for each vacuuming period they would like to specify. The <Schedule> element has two child elements: <StartTime> and <Duration>. The <StartTime> element is required, while the <Duration> element is optional.

Information about when the vacuuming period will begin should be specified in the <StartTime> element. Coordinated Universal Time (UTC) notation should be used when indicating the <StartTime> value. If a date is indicated as well as a time for this value, only the time portion will be used. Vacuuming will start at the specified time on the current day.

Developers may optionally specify information about the length of the vacuuming period in the <Duration> element. Because vacuuming may occur daily, one must ensure that the value of the <Duration> element does not exceed 24 hours. The <Duration> element value must also be specified as an XML duration data type. Please refer to the information about the <QuantumDuration> element, above, for details on this format. If a value for the <Duration> element is not specified, the element must be excluded from the <Schedule> node. The vacuuming duration will default to 6 hours in this case.

Furthermore, vacuuming intervals cannot overlap. Notification services will determine when they would overlap, and will stop the earlier one at the start of the later one. For example, these intervals:

<StartTime>: 1 pm, <Duration>: 2 hours
<StartTime>: 2 pm, <Duration>: 2 hours would translate to:

<StartTime>: 1 pm, <Duration>: 1 hour
<StartTime>: 2 pm, <Duration>: 2 hours

The following exemplary code illustrates creation of an <ApplicationExecutionSettings> element. The example indicates that this application has a generator quantum period of 5 minutes, with a chronicle quantum limit of 25 quantums (125 minutes, or just over 2 hours), and a subscription quantum limit of 12 quantums (60 minutes, or 1 hour). It will use sub-quantum sequencing, and will run the performance query once every hour. Vacuuming will run from 3:00 AM to 5:00 AM. and from 11:00 PM to 1:00 AM every day, removing data older than 3 days:

```
<ApplicationExecutionSettings>
  <QuantumDuration>P0DT00H05M00S</QuantumDuration>
  <ChronicleQuantumLimit>25</ChronicleQuantumLimit>
  <SubscriptionQuantumLimit>12</SubscriptionQuantumLimit>
  <ProcessEventsInOrder>true</ProcessEventsInOrder>
  <PerformanceQueryInterval>P0DT01H00M00S</PerformanceQueryInterval>
  <Vacuum>
    <RetentionAge>P3DT00H00M00S</RetentionAge>
    <VacuumSchedule>
      <Schedule>
        <StartTime>23:00:00</StartTime>
        <Duration>P0DT02H00M00S</Duration>
      </Schedule>
      <Schedule>
        <StartTime>03:00:00</StartTime>
        <Duration>P0DT02H00M00S</Duration>
      </Schedule>
    </VacuumSchedule>
  </Vacuum>
</ApplicationExecutionSettings>
```

An additional responsibility of the application developer is specifying one or more event classes in the application definition file. Each event class corresponds to one particular kind of event accepted by an application.

The following six acts combine to define an event:

1. Naming the event class.
2. Defining the fields in the event class. Event providers that gather events of this class use these field definitions to validate their event data. These fields are also used to automatically create the server table that stores the event data.
3. Designating the server filegroup on which the event table should be created. This step is optional, as the event table is automatically created on the default filegroup for the application database if no other is specified.
4. (Optionally) Providing statements, such as Transact-SQL statements, to create one or more indexes on your event table.
5. (Optionally) Defining a chronicle rule associated with the event class. The chronicle rule defines queries that manipulate data in one or more event chronicle tables.
6. (Optionally) Defining one or more event chronicle tables associated with this event class.

All of the above information can be stored in particular section of the ADF. Additionally, note that one <EventClass> node will need to be created for each event class that is ultimately defined. Below is an example of an event class definition.

```
<EventClasses>
  <!--Sample Definition of a Stock Event Class.-->
  <EventClass>
    <!--Name of the event class.-->
    <EventClassName>Stock</EventClassName>\
    <!--Event fields are defined in the Schema section.-->
    <Schema>
      <!--Define the stock symbol field.-->
      <Field>
        <FieldName>StockSymbol</FieldName>
        <FieldType>char(10)</FieldType>
        <FieldTypeMods>not null</FieldTypeMods>
      </Field>
      <!--Define the stock value field.-->
      <Field>
        <FieldName>StockValue</FieldName>
        <FieldType>money</FieldType>
        <FieldTypeMods>not null</FieldTypeMods>
      </Field>
    </Schema>
    <!--Name of the SQL Server filegroup
    upon which the event table will be created.-->
    <FileGroup>Primary</FileGroup>
    <!--The Transact-SQL statement that creates
    an index on the event table.-->
    <IndexSqlSchema>
      <SqlStatement>
      IF EXISTS (SELECT name FROM sysindexes
      WHERE name = 'StockIndex')
      DROP INDEX StockIndex
      </SqlStatement>
      <SqlStatement>
      CREATE CLUSTERED INDEX StockIndex
      ON StockEvents (StockSymbol)
      </SqlStatement>
    </IndexSqlSchema>
    <!--The rules that determine the state of the data
    in the event chronicle table.-->
    <ChronicleRule>
      <RuleName>StockEventChronRule</RuleName>
      <Action>
      INSERT StockEventChron
      (StockSymbol, StockHighValue)
      SELECT StockEvents.StockSymbol, StockEvents.StockValue
      FROM StockEvents
      WHERE StockEvents.StockSymbol
      NOT IN (SELECT StockSymbol FROM StockEventChron);
      UPDATE StockEventChron
      SET StockEventChron.StockHighValue = StockEvents.StockValue
      FROM StockEvents JOIN StockEventChron
      ON StockEvents.StockSymbol = StockEventChron.StockSymbol
      WHERE StockEvents.StockValue > StockEventChron.
      StockHighValue
      </Action>
      <ActionTimeout>P0DT00H05M00S</ActionTimeout>
    </ChronicleRule>
    <Chronicles>
      <!--The Transact-SQL statement that determines the
      structure of the event chronicle table.-->
      <Chronicle>
        <ChronicleName>StockEventChron</ChronicleName>
        <SqlSchema>
          <SqlStatement>
          IF EXISTS (SELECT name FROM sysobjects
          WHERE name = 'StockEventChron'
          AND xtype = 'U')
          DROP TABLE StockEventChron
          </SqlStatement>
          <SqlStatement>
          CREATE TABLE StockEventChron
          (
          StockSymbol char(10),
          StockHighValue money
          PRIMARY KEY (StockSymbol)
          )
          </SqlStatement>
        </SqlSchema>
      </Chronicle>
    </Chronicles>
  </EventClass>
</EventClasses>
```

To define field events a determination must first be made as to what fields are needed to store the event data. These fields may be documented in the <Schema> section of the <EventClass> node. One <Field> node should be created within the <Schema> section for each field you define.

An exemplary <Field> node may comprise three child elements:
<FieldName>
<FieldType>
<FieldTypeMods>

A<FieldName> element may then be defined by documenting the field name in the <FieldName> element. Similarly, to define the <FieldType> element, the developer may document the field data type in the <FieldType> element.

The <FieldTypeMods> element might allow the developer to specify null and default settings for this field. These settings could be specified using SQL Server Transact-SQL syntax conventions, for example. Furthermore, if this element is not used, it should be excluded from the <Field> node.

The following illustrates an exemplary code section for defining filed events. For purposes of this example, assume two event fields are defined: a 10-character stock symbol field, and a stock value field that accepts monetary data:

```
<Schema>
  <Field>
    <FieldName>StockSymbol</FieldName>
    <FieldType>char(10)</FieldType>
    <FieldTypeMods>NOT NULL</FieldTypeMods>
  </Field>
  <Field>
    <FieldName>StockValue</FieldName>
    <FieldType>money</FieldType>
    <FieldTypeMods>NOT NULL DEFAULT 10</FieldTypeMods>
  </Field>
</Schema>
```

Another action needed to define an event class is designating the filegroup.

Servers, like Microsoft's SQL Server™, provide filegroups to simplify database administration, as well as to allow optimal allocation of system data across multiple physical disks. Optimized data allocation can be critical to the performance of high-volume SQL Server notification services applications.

Developers may specify the name of the filegroup upon which they wish their event table to be created as the value for this element. Additionally, if this element is not used, it should be excluded from the <EventClass> node. The event table will be created on the default filegroup for the application database in this case.

The following is exemplary code for designating filegroups. In this example, the "NSFiles" filegroup is selected as the default filegroup for the event table:
<FileGroup>Primary</FileGroup>

An optional action in defining an event class is providing statements, like Transact-SQL statements, to create one or more indexes on your event table. Indexes speed the location of particular records based on the data in a specified field. An index is automatically used when processing a Transact- SQL query that uses the table that the index is created on, provided that using the index improves query performance. The performance of an application can be significantly enhanced by creating appropriate indexes.

Developers may use one or more indexes on their event table by defining Transact-SQL statements to create them in the <IndexSqlSchema> node, for example. If developers do not use an index, they should exclude this node from the <EventClass> node.

The <IndexSqlSchema> node consists of one or more <SqlStatement> elements. Each <SqlStatement>will contain a Transact-SQL CREATE INDEX statement that defines an index on the event table. The event table name you will use in the CREATE INDEX statement is the concatenation of the event class name and the word "Events".

An initial <SqlStatement> element with a statement to drop the index if it exists should always be included, prior to the <SqlStatement> element that creates the index. Without this statement, NSControl Update may raise errors related to attempting to create duplicate SQL Server objects if you ever run it against this application.

Furthermore, it should be noted that indexes specified in the <IndexSqlSchema> node of a <SubscriptionClass> are created against the subscription table itself. Indexes specified in the <IndexSqlSchema> node of an<EventClass> are created against a view that bears an identical name to the event table. This view contains only the most recent events, rather than the full set of all of the events in the system. Using this subset of events in a view significantly improves rule processing time by reducing the number of records involved.

The following is exemplary code illustrating the creation of an index. In this example a clustered index named "StockIndex" will be created on the StockSymbol field of the StockEvents table in the application database:

```
<IndexSqlSchema>
  <SqlStatement>
  IF EXISTS (SELECT name FROM sysindexes
  WHERE name = 'StockIndex')
  DROP INDEX StockIndex
  </SqlStatement>
  <SqlStatement>
  CREATE CLUSTERED INDEX StockIndex
  ON StockEvents (StockSymbol)
  </SqlStatement>
</IndexSqlSchema>
```

Optional act five in creating an event class is defining chronicle rules associated with the event class. If the application uses event chronicle tables, chronicle rules must be defined. The chronicle rules contain the queries, for instance Transact-SQL queries, which manipulate the data in the event chronicle tables. Chronicle rule information is specified in the <ChronicleRule> node. If a chronicle rule is not defined, then the <ChronicleRule> node must be excluded from the <EventClass> node.

An exemplary <ChronicleRule> node comprises three child elements:

<RuleName>
<Action>
<ActionTimeout>

Developers can record the rule name in the <RuleName> element, which is a string value.

The <Action> element may be used to define queries. In particular, Transact-SQL queries, for example, may establish the actions that a chronicle rule should take. Developers define these queries in the <Action> element. The <Action> element may contain one or more Transact-SQL statements specifying the actions that this rule should take. Developers can either define a Transact-SQL query, or call a stored procedure that provides the same functionality. In addition, all statements that are defined in the <Action> element can be treated as part of the same transaction, so either they will all complete successfully or they all will be rolled back. If the event chronicle rule fails, an error will be logged to the system log. Also, any event subscription rules that are associated with events of this class will not be fired.

The <ActionTimeout> element specifies the permitted length of time for queries in the <Action> element to complete their task. If they are not completed during this time, the transaction containing them is rolled back, and an error is written to the system log.

The value of the <ActionTimeout> element should be specified in the format of an XML duration data type. The notation "P0DT00H00M00S" should be used, where P is the designator for the data type, D represents days, T is the designator for the time portion of the value, H represents hours, M represents minutes, and S represents seconds. Except for the P and T designators, unused duration elements may be skipped. For example, a timeout period of 2 minutes and 30 seconds may be represented as "P0DT00H02M30S" or "PT2M30S". Furthermore, this element is not used, it should be excluded from the <ChronicleRule> node. The timeout interval defaults to 30 minutes in such a case.

The following exemplary code illustrates the creation of a chronicle rule. In this instance, event chronicle rule "StockEventChronRule" is being created. The rule first inserts new stock data into the chronicle table, then updates existing stock records in the chronicle table. Additionally, this rule is permitted five minutes to complete successfully.

```
<ChronicleRule>
  <RuleName>StockEventChronRule</RuleName>
  <Action>
  <!--This statement inserts stock records
  into the chronicle if it cannot find
  an existing record with the same stock symbol -->
  INSERT StockEventChron
  (StockSymbol, StockHighValue)
  SELECT StockEvents.StockSymbol, StockEvents.StockValue
  FROM StockEvents
  WHERE StockEvents.StockSymbol
  NOT IN (SELECT StockSymbol FROM SStockEventChron);
  <!--This statement updates stock records in the
  chronicle based on matching the new data to
  the chronicle records based on stock symbol -->
  UPDATE StockEventChron
  SET StockEventChron.StockHighValue = StockEvents.StockValue
  FROM StockEvents JOIN StockEventChron
  ON StockEvents.StockSymbol = StockEventChron.StockSymbol
  WHERE StockEvents.StockValue > StockEventChron.
  StockHighValue
  </Action>
  <ActionTimeout>P0DT00H05M00S</ActionTimeout>
</ChronicleRule>
```

The final optional action that contributes to the definition of an event class is defining one or more event chronicle tables associated with the event class. In general developers may want to define one or more event chronicle tables for use by an application. These tables can cache event data for use by scheduled subscriptions, or for some other purpose.

Developers may document chronicle table information in a particular section of the ADF, for example /EventClasses/

EventClass/Chronicles. One <Chronicle> node exists in the <Chronicles> section for each event chronicle table to be defined. If no event chronicle tables are to be described, then the <Chronicles> node from the <EventClass> node should be excluded.

An exemplary <Chronicle> node may comprise two child elements:

<ChronicleName>
<SqlSchema>

The chronicle name should be indicated in the <ChronicleName> element. This can be a unique string value, for example. For consistency, the chronicle name defined here and the name of the chronicle table created in the <SqlSchema> element should probably be the same.

The schemas for creating event chronicle tables can be specified in the <SqlSchema> node. The <SqlSchema> node comprises one or more <SqlStatement> elements. Each <SqlStatement> may contain a Transact-SQL CREATE TABLE statement that defines an event chronicle table. It should include the table name, and the field names and their data types. It may include arguments for constraints, and any other optional CREATE TABLE parameters that the developer wishes to specify. The application developer may also choose to include a CREATE INDEX statement to create an index on your event chronicle table.

Specifically, the schema may be developed with any text editor, although SQL Query Analyzer, which installs with Microsoft® SQL Server™, is recommended for ease of use. This tool provides templates for creating tables and other objects in the Templates tab of its Object Browser.

An initial <SqlStatement> element should be included with a statement to drop the table if it exists, prior to the <SqlStatement> element that creates the table. Without this statement, NSControl Update may raise errors related to attempting to create duplicate SQL Server objects if you ever run it against this application.

The following is exemplary code illustrating the creation of a chronicle table. In particular, this example creates the event chronicle table "StockEventChron", which consists of the StockSymbol and StockValue fields.

```
<Chronicles>
  <Chronicle>
    <ChronicleName>StockEventChron</ChronicleName>
    <SqlSchema>
      <SqlStatement>
      IF EXISTS (SELECT name FROM sysobjects
      WHERE name = 'StockEventChron'
      AND xtype = 'U')
      DROP TABLE StockEventChron
      </SqlStatement>
      <SqlStatement>
      CREATE TABLE StockEventChron
      (
      StockSymbol char(10),
      StockHighValue money
      PRIMARY KEY (StockSymbol)
      )
      </SqlStatement>
    </SqlSchema>
  </Chronicle>
</Chronicles>
```

In addition to defining event classes, the application developer is responsible for specifying one or more notification classes in the application definition file. Each notification class corresponds to one particular kind of notification generated by the application. Additionally, there may be one or more notification classes defined for each notification services application developed. In general, there are nine acts that define a notification:

1. Naming the notification class.
2. Defining the fields in the notification class. These fields provide the data that may be sent to your subscribers. These fields are also used to automatically create the table that stores the notification data.
3. Designating the server filegroup on which the notification table should be created. This step is optional, as the notification table is automatically created on the default filegroup for the application database if no other is specified.
4. Documenting the content formatter that this notification class will use. The content formatter takes the raw notification data and formats it appropriately for display.
5. Indicating whether this notification class uses digest delivery. Digest delivery means that all notifications generated by one execution of the notification generation rule that are destined for the same subscriber are grouped and handled as a single notification.
6. Indicating whether this notification class uses multicast delivery. Multicast delivery means that all notifications generated by one execution of the notification generation rule that share identical data are formatted just once, then this formatted data is sent out to all subscribers.
7. Specifying a notification batch size for notifications of this class.
8. Specifying one or more delivery protocols that this notification class will use for notification delivery. This consists of specifying header or other notification-specific information required for messages created by this delivery protocol.
9. Specifying an expiration age for notifications of this class.

The aforementioned information is stored in a section of the ADF, for example /NotificationClasses/NotificationClass. Further, the application developer needs to create one <NotificationClass> node for each event class that they have defined. The following is an exemplary code defining a notification class.

```
<NotificationClasses>
  <NotificationClass>
    <NotificationClassName>Stock</NotificationClassName>
    <Schema>
      <Fields>
        <Field>
          <FieldName>StockSymbol</FieldName>
          <FieldType>char(10)</FieldType>
        </Field>
        <Field>
          <FieldName>StockValue</FieldName>
          <FieldType>money</FieldType>
        </Field>
      </Fields>
    </Schema>
    <FileGroup>Secondary</FileGroup>
    <ContentFormatter>
      <ClassName>Stock.StockFormatter</ClassName>
      <AssemblyName>C:\CustomCFs\StockFormatter.dll</AssemblyName>
      <Arguments>
        <Argument>
          <Name>OutputHTML</Name>
          <Value>true</Value>
        </Argument>
      </Arguments>
    </ContentFormatter>
    <DigestDelivery>true</DigestDelivery>
    <NotificationBatchSize>100</NotificationBatchSize>
```

```
-continued

<Protocols>
  <Protocol>
    <ProtocolName>SMTP</ProtocolName>
    <Fields>
      <Field>
        <FieldName>Subject</FieldName>
        <SqlExpression>
        %SubjectLine%
        </SqlExpression>
      </Field>
      <Field>
        <FieldName>From</FieldName>
        <SqlExpression>%fromAddress%</SqlExpression>
      </Field>
      <Field>
        <FieldName>To</FieldName>
        <FieldReference>DeviceAddress</FieldReference>
      </Field>
      <Field>
        <FieldName>Priority</FieldName>
        <SqlExpression>%mailPriority%</SqlExpression>
      </Field>
      <Field>
        <FieldName>BodyFormat</FieldName>
        <SqlExpression>"html"</SqlExpression>
</Field>
    </Fields>
    <ProtocolExecutionSettings>
      <RetrySchedule>
        <RetryDelay>P0DT00H15M00S</RetryDelay>
        <RetryDelay>P0DT00H30M00S</RetryDelay>
        <RetryDelay>P0DT01H00M00S</RetryDelay>
      </RetrySchedule>
      <FailuresBeforeAbort>20</FailuresBeforeAbort>
      <MulticastRecipientLimit>10</MulticastRecipientLimit>
      <WorkItemTimeout>P0DT00H30M00S</WorkItemTimeout>
    </ProtocolExecutionSettings>
  </Protocol>
</Protocols>
<ExpirationAge>P0DT02H30M00S</ExpirationAge>
</NotificationClass>
</NotificationClasses>
```

Turning specifically to the first action, the application developer must name the notification class. The name for the notification class being defined should be a unique string value. Moreover, this name should be entered in the <NotificationClassName> element. For example, the following creates a notification class with a name of "StockNotification".

<NotificationClassName>StockNotification</NotificationClassName>

Another action necessary to define a notification class is defining notification fields. These fields could be defined in the <Schema> section of the <NotificationClass> node. The <Schema> node perhaps comprising two child nodes: <Fields> and <ComputedFields>, where fields that store data within a database table are defined in the <Fields> node, and fields whose data should be computed at notification generation time are defined in the <ComputedFields> node.

In accordance with the above, the <Fields> and <ComputedFields> nodes might have subordinate <Field> and <ComputedField> nodes, each of which defines a single field for this notification class.

An exemplary <Field> node might comprise three child elements:
<FieldName>
<FieldType>
<DigestGrouping>.

The <FieldName> element specifies the name of the field and should probably be a unique string value. The <FieldType> element specifies the data type of the field. While, the <DigestGrouping> element can specify the field to be used for matching when grouping notifications. Notifications with the same SubscriberDeviceID and matching values in any <DigestGrouping> fields can subsequently be grouped into a single notification. In one particular embodiment, SubscriberId, DeviceId, SubscriberLocale, plus any <DigestGrouping> fields can be set to have to match, and notifications required to all be in the same batch—thus in such implementation digesting is not peformed across batch boundaries.

An exemplary <Computedfield> node may comprise the following three child elements:
<FieldName>
<SqlExpression>
<DigestGrouping>.

The <Fieldname> and <DigestGrouping> elements of a <ComputedField> node can be handled the same way as those in a <Field> node, as discussed above. The <SqlExpression> element may contain Transact-SQL expressions that compute the data for this field. Any Transact-SQL expression that can be evaluated as part of a SELECT query in the application database may be referenced in an<SqlExpression> element. This includes use of arbitrary constants, making SQL function calls, referring to data in chronicle tables, and so forth.

The following is an exemplary code section illustrating how a field is defined in a notification class. In this example, two notification fields are defined: a 10-character stock symbol field, and a stock value field that accepts monetary data. Additionally, a computed field is defined that determines how much the stock price has changed.

```
<Schema>
  <Fields>
    <Field>
      <FieldName>StockSymbol</FieldName>
      <FieldType>char(10)</FieldType>
      <DigestGrouping>true<DigestGrouping>
    </Field>
    <Field>
      <FieldName>StockValue</FieldName>
      <FieldType>money</FieldType>
    </Field>
  </Fields>
  <ComputedFields>
    <ComputedField>
      <FieldName>StockPriceChange</FieldName>
      <SqlExpression>
      <!--The event table name is the combination
      of the event class name ("Stock") and the word "Events"-->
      <!--The event chronicle name is the name you gave the
      chronicle table when you created it in the event class
      definition in the ADF-->
      (StockEvents.Stock Value - StockEventChron.StockLastValue)
      </SqlExpression>
    </ComputedField>
  </ComputedFields>
</Schema>
```

The fourth action that contributes to defining a notification class is designating a server filegroup on which the notification table should be created. Servers, such as Microsoft® SQL Server™ provide filegroups to simplify database administration, as well as to allow optimal allocation of system data across multiple physical disks. Optimized data allocation can be critical to the performance of high-volume notification services applications.

In particular, developers may specify the name of the filegroup upon which they wish the notification table to be created as the value for this element. Additionally, the filegroup named should be one of the filegroups defined as a <NamedFileGroup>in the <Database> node. Further, if this element is not used, it should be excluded from the <NotificationClass> node. In such a situation, a notification table will be created on the default filegroup for the application database.

The following is an exemplary code illustrating how a field group is specified. In this example, the "NSFiles" filegroup is selected as the default filegroup for the notification table.

<FileGroup>Secondary</FileGroup>

According to the action numbered four above, documenting the content formatter that the notification class will use is required to define a notification class. A <ContentFormatter> node of the ADF may be used to specify information about the class that provides content formatting functionality to a notification class. This class can be part of a managed code assembly that contains all of the functions necessary to take raw notification data and format it appropriately for the locales, languages, and devices desired to be supported by the subscription application.

An exemplary <ContentFormatter> node might include three child elements:
    <ClassName>
    <AssemblyName>
    <ArgumentList>

Class name information can be stored in the <ClassName> element. Additionally, it is important that developers define a class name for any custom content formatters they create.

Class assembly information is stored in the <AssemblyName> element. Developers should specify the full path and assembly file name for any custom content formatters they create. In addition developers may use a parameter in the ADF and/or configuration file to represent the path to the file. This allows the application developer or the system administrator to control the physical location of the files without hard-coding a specific path in this element.

Any arguments that need to be passed to the content formatter when it is initialized ought to be documented in the <Arguments> section of the <ContentFormatter> node. Each argument will have its own <Argument> node within the <Arguments> section.

Furthermore, each <Argument> node might comprise two child elements: <Name> and <Value>. In this case, the argument name should be defined in the <Name> element, while the argument value should be defined in the <Value> element. Individual content formatter implementations can define what the recognized arguments are, and which of these are required or optional.

The following is exemplary code illustrates one technique of documenting a content formatter. In this example, the Stock.StockFormatter class provides the content formatting functionality, and is implemented in the StockFormat.dll file. It takes a single argument that tells it to output the content in an HTML format:

```
<ContentFormatter>
  <ClassName>Stock.StockFormatter</ClassName>
  <AssemblyName>C:\CustomCFs\StockFormat.dll<AssemblyName>
  <Arguments>
    <Name>OutputHTML</Name>
    <Value>true</Value>
  </Arguments>
</ContentFormatter>
```

Defining a notification class also entails indicating whether the notification class uses digest delivery or multicast delivery. A<DigestDelivery> element might be used to indicate if notifications of this class are digested. Subsequently, developers can specify "true" as the value of the element if they wish to enable digest delivery. Similarly, specifying "false", or excluding this element from the <NotificationClass> node, might provide for disabling digest delivery. For example, the following statement might be provided to enable digest delivery for this notification class:

<DigestDelivery>true</DigestDelivery>

If the notification class uses multicast delivery, a <MulticastDelivery> element can be employed to indicate that notifications are to be multicasted. Similar to the above, a developer could specify "true" as the value if they wish to enable multicast delivery and either specify "false", or exclude the element from the <NotificationClass> node, to disable multicast delivery. The following exemplary statement may be used to enable multicast delivery for this notification class:

<MulticastDelivery>true</MulticastDelivery>

For example with respect to defining conditions for multicast grouping, notifications can have the same values for DeviceType, SubscriberLocale, and ALL of the notification and computed fields (e.g., and they should be in the same batch for one particular implantation).

In accordance with the above regarding defining a notification class, the act of specifying a notification batch size for notifications of this class is now described in more detail. In particular, a <NotificationBatchSize> element might be used to indicate the maximum number of notifications that may be included in a batch for the notification class. Furthermore, the <NotificationBatchSize> node should not be included in the <NotificationClass> node if it is not utilized. In such a case, there will be no limit to the number of notifications that can be included in a single batch. The following may be used to set the notification batch size for a notification class to 100:

<NotificationBatchSize>100</NotificationBatchSize>

If digest is not enabled, then the value is used as described. If digest is enabled, if NotificationBatchSize is N, the generator creates N batches, and inserts notifications into them in a round-robin like fashion. In so doing, notifications going to the same subscriber together are kept together so that they can be placed into digest groups (e.g., for implementations where digesting is not performed across batch boundaries). Specifying one or more delivery protocols that a notification class will use for notification delivery is also necessary to define a notification class. Generally, this consists of specifying header or other notification-specific information required for messages created by this delivery protocol. A<Protocols> node can be used to document the delivery protocols that are valid for the notification class. Each delivery protocol could possibly include a <Protocol>child node within the <Protocols> node, the <Protocol> node comprising a <ProtocolName> element, and two additional child nodes: <Fields> and <ProtocolExecutionSettings>.

A developer must determine the name of the delivery protocol the application will use. This could be either a well-known protocol (like SMTP), or the name of a custom delivery protocol that documented in the <Protocols> node of the configuration file. The developer must enter this name in the <ProtocolName> element. The configuration file entry provides the mapping between an application developer-assigned delivery protocol name, and the class name of its implementation.

The <Fields> node documents the header fields that are required for a message that is to be created and routed by this delivery protocol. Each header field will have a <Field> child node within the <Fields> node. These fields can subsequently be provided to a deliver notification method of the class that implements the delivery protocol as a set of name/value pairs, for example, where the values are computed at notification delivery time.

Additionally, a field node may comprise two child elements: <FieldName>, and either a <FieldReference> element or an<SqlExpression> element. The <FieldName> element can be utilized to document the name of the header field.

A<FieldReference> element could be used if the value of the header field already exists within one of the notification fields or computed fields. The <FieldReference> element specifies the name of the notification or computed field whose value should be used in this header field. Both static and computed notification fields can be used to provide this value.

An<SqlExpression> element could be used if the value of the header field does not already exist within one of the notification fields. The <SqlExpression> element might contain a Transact-SQL expression that computes the data for this field. Any Transact-SQL expression that can be evaluated as part of a SELECT query in the application database may be referenced in an<SqlExpression> element. This includes use of arbitrary constants, making SQL function calls, referring to data in chronicle tables, and so forth. An<SqlExpression> element may also take an application parameter as a value, possibly defined in a <ParameterDefaults> node of the ADF.

An exemplary <ProtocolExecutionSettings>section may include the follwoing six child elements:
<RetrySchedule>
<FailuresBeforeLoggingEvent>
<FailureEventLogInterval>
<FailuresBeforeAbort>
<MulticastRecipientLimit>
<WorkitemTimeout>

The <Retry Schedule> node might be comprised of one or more <RetryDelay> elements, each element defining a period of time after a failed notification delivery attempt that a retry should be attempted. For instance, if the retry attempted at the time specified by the first <RetryDelay> element fails, then another retry attempt will be made at the time specified by the second <RetryDelay> element, and so forth. It is to be appreciated that these are relative times, and not absolute. Thus, if the first attempt fails, the distributor waits the amount of time specified in the first <RetryDelay> element, then tries again, and so on thereafter.

The <FailuresBeforeLoggingEvent> element can be used to define the number of failures that may occur before a system event log entry is created to document the failure. The value of this element should be a non-negative integer. If a value is not specified for this element, the default is to allow five failures before logging an event.

The <FailureEventLogInterval> element specifies the minimum amount of time that must pass before consecutive failure events are logged. The value of the <FailureEventLogInterval> element should be specified in the format of an XML duration data type. Please refer to the <RetryDelay> element, above, for more information on this format. If a value is not specified for this element, the default interval is five minutes, for example. However, it is to be appreciated that the default can be "no limit"—log as often as errors occur.

The <FailuresBeforeAbort> element might be used to define the number of retry attempts that are permissible before aborting any further attempts. Moreover, it controls the number of consecutive delivery failures within a batch that are allowed before the entire batch is aborted (and might be retried later). If, for example, 20 notifications are attempted to be delivered in a row and they all fail, trying for that batch thereafter can be ceased.

The value of this element should be a non-negative integer. If a value is not specified for this element, the default is to allow 20 failures before aborting the distributor process.

The <MulticastRecipientLimit> element can be used to limit the number of recipients allowed for each multicasted notification. The value of this element should be a non-negative integer. If a value is not specified for this element, the default is to allow 100 recipients per multicasted notification.

The <WorkItemTimeout> element specifies the amount of time a distributor thread may take in order to complete a work item assigned to it. If the <WorkItemTimeout> value is exceeded, the work item is cancelled for that thread. The work item is then returned to the pool of available work items, so that it can be picked up by another thread and processed. This prevents a work item from being "lost", by being assigned for processing by a thread, but not actually being completed because of some error.

The following example specifies SMTP as a valid delivery protocol for creating and routing notifications of this class, and provides values for the fields required to create an SMTP message. Notifications sent using this protocol are allowed three redelivery attempts if initially unsuccessful: one at 15 minutes after the first attempt, the second half an hour after that, and the final attempt yet an hour later. If multicast delivery is being employed, it will limit each multicast notification to 10 recipients. Work items will time out after 10 minutes.

```
<Protocols>
  <Protocol>
    <ProtocolName>SMTP</ProtocolName>
    <Fields>
      <Field>
        <FieldName>Subject</FieldName>
        <SqlExpression>
        %SubjectLine%
        </SqlExpression>
      </Field>
      <Field>
        <FieldName>From</FieldName>
        <SqlExpression>%fromAddress%</SqlExpression>
      </Field>
      <Field>
        <FieldName>To</FieldName>
        <FieldReference>DeviceAddress</FieldReference>
      </Field>
      <Field>
        <FieldName>Priority</FieldName>
        <SqlExpression>%mailPriority%</SqlExpression>
      </Field>
      <Field>
        <FieldName>BodyFormat</FieldName>
        <SqlExpression>"html"</SqlExpression>
      </Field>
    </Fields>
    <ProtocolExecutionSettings>
      <RetrySchedule>
        <RetryDelay>P0DT00H15M00S</RetryDelay>
        <RetryDelay>P0DT00H30M00S</RetryDelay>
        <RetryDelay>P0DT01H00M00S</RetryDelay>
      </RetrySchedule>
      <FailuresBeforeAbort>20</FailuresBeforeAbort>
```

-continued

```
    <MulticastRecipientLimit>10</MulticastRecipientLimit>
    <WorkItemTimeout>P0DT00H10M00S</WorkItemTimeout>
   </ProtocolExecutionSettings>
  </Protocol>
 </Protocols>
```

The final action necessary to defining a notification class is specifying an expiration age for notifications of the class. The <ExpirationAge> element allows developers to specify the length of time permitted for notification re-sends before the notification data is determined to be out of date. If notification services cannot deliver a notification before it expires, it abandons the notification without delivering it. If an expiration age is not specified, notifications can be set to never expire, for example.

Further, the value of the <ExpirationAge> element can be specified in the format of an XML duration data type. Developers might use the notation "P0DT00H00M00S", where P is the designator for the data type, D represents days, T is the designator for the time portion of the value, H represents hours, M represents minutes, and S represents seconds. Except for the P and T designators, unused duration elements may be skipped. For example, an expiration age of 1 hour and 45 minutes may be represented as "P0DT01H45M00S", or "PT01H45M30S".

The following exemplary code sets the expiration age of this notification class to 1 hour and 45 minutes:

<ExpirationAge>PT01H45M30S</ExpirationAge>

Returning to the developer's responsibilities, the act numbered four states that the developer is responsible for specifying one or more subscription classes in the application definition file. Each subscription class corresponds to one particular kind of subscription accepted by the application. Specifying a subscription class includes writing rules, which are Transact-SQL statements that either generate notifications, or update chronicle tables. These rules can be invoked when an event provider submits a new batch of events, or on a scheduled basis, or both. In particular, seven acts define a subscription:

1. Naming the subscription class.
2. Defining the fields that make up your subscription class. The field definitions are used to validate any subscription data supplied by a subscription management application. They are also used to automatically create the table that stores the subscription data.
3. Designating the SQL Server filegroup for the subscription table. This step is optional, as the subscription table may be automatically created on the default filegroup if no other is specified
4. Providing Transact-SQL statements to create one or more indexes on your subscription table. This step is also optional, as the system does not require an index on the subscription table.
5. Defining the event rules associated with this subscription class. Event rules are named sets of one or more queries, such as Transact-SQL queries, that either create notifications or manipulate the data in a subscription chronicle table. Event rules are processed each time a new event batch is processed. This step is conditionally optional: developers are not required to have an<EventRules> node, but they need to have a notification generation rule defined in either this node or a <ScheduledRules> node.
6. Defining the scheduled rules associated with this subscription class. Scheduled rules are named sets of one or more queries, such as Transact-SQL queries, that create notifications or manipulate the data in a subscription chronicle table. Scheduled rules are processed each time notifications are generated for scheduled subscriptions of this class. This step is conditionally optional. Developers are not required to have a <ScheduledRules> node, but they must have a notification generation rule defined in either this node or an<EventRules> node.
7. Defining one or more subscription chronicle tables associated with this subscription class. The subscription chronicle tables store subscription data for use in your application. For instance, you might use a subscription chronicle table to store information about the last notification delivered to a subscriber, and generate the next notification based only on data that has come in during the intervening time. This step is optional, as you may not need subscription chronicle tables in your application.

All of the above information may be stored in a specific section of the ADF for the application that uses the subscription class. Furthermore, the application developer may create one <SubscriptionClass> node for each subscription class that the developer defines. The following is an example of a subscription class definition.

```
<SubscriptionClasses>
 <SubscriptionClass>
  <SubscriptionClassName>Stock</SubscriptionClassName>
  <Schema>
   <Field>
    <FieldName>StockSymbol</FieldName>
    <FieldType>char(10)</FieldType>
    <FieldTypeMods>NOT NULL</FieldTypeMods>
   </Field>
   <Field>
    <FieldName>StockTriggerValue</FieldName>
    <FieldType>money</FieldType>
    <FieldTypeMods>NOT NULL DEFAULT 10</FieldTypeMods>
   </Field>
   <Field>
    <FieldName>SubscriberID</FieldName>
    <FieldType>char(10)</FieldType>
    <FieldTypeMods>NOT NULL</FieldTypeMods>
   </Field>
   <Field>
    <FieldName>SubscriberDeviceName</FieldName>
    <FieldType>nvarchar(255)</FieldType>
    <FieldTypeMods>NOT NULL</FieldTypeMods>
   </Field>
   <Field>
    <FieldName>SubscriberLocale</FieldName>
    <FieldType>nvarchar(10)</FieldType>
    <FieldTypeMods>NOT NULL</FieldTypeMods>
   </Field>
  </Schema>
  <FileGroup>Secondary</FileGroup>
  <IndexSqlSchema>
   <SqlStatement>
   IF EXISTS (SELECT name FROM sysindexes
   WHERE name = 'StockSubIndex')
   DROP INDEX StockSubIndex
   </SqlStatement>
   <SqlStatement>
   CREATE INDEX StockSubIndex
   ON StockSubscriptions (SubscriberID)
   </SqlStatement>
  </IndexSqlSchema>
  <EventRules>
   <EventRule>
    <RuleName>StockSubscriptionNotifyRule</RuleName>
    <Action>
    SELECT dbo.StockNotificationNotify(S.SubscriberID,
    S.SubseriberDeviceName, S.SubscriberLocale,
    E.StockSymbol, E.StockValue)
    FROM StockSubscriptions S JOIN StockEvents E
```

-continued

```
    ON S.StockSymbol = E.StockSymbol
    JOIN StockEventChron C
    ON S.StockSymbol = C.StockSymbol
    WHERE S.StockTriggerValue <= E.StockValue
    AND S.StockTriggerValue > C.StockHighValue
    </Action>
    <ActionTimeout>P0DT00H01M00S</ActionTimeout>
    <EventClassName>Stock</EventClassName>
  </EventRule>
  <EventRule>
    <RuleName>StockSubscriptionEventChronRule</RuleName>
    <Action>
    INSERT StockEventChron
    (StockSymbol, StockHighValue)
    SELECT StockEvents.StockSymbol, StockEvents.StockValue
    FROM StockEvents
    WHERE StockEvents.StockSymbol NOT IN
    (SELECT StockSymbol FROM StockEventChron);
    UPDATE StockEventChron
    SET StockEventChron.StockHighValue = StockEvents.StockValue
    FROM StockEvents JOIN StockEventChron
    ON StockEvents.StockSymbol = StockEventChron.StockSymbol
    WHERE StockEvents.StockValue >
    StockEventChron.StockHighValue
    </Action>
    <ActionTimeout>P0DT00H01M00S</ActionTimeout>
    <EventClassName>Stock</EventClassName>
  </EventRule>
</EventRules>
<ScheduledRules>
  <ScheduledRule>
    <RuleName>StockSubScheduledNotifyRule</RuleName>
    <Action>
    SELECT dbo.StockNotificationNotify
    (S.SubscriberID, S.SubscriberDeviceName, S.SubscriberLocale,
    C.StockSymbol, C.StockValue)
    FROM StockSubscriptions S JOIN StockEventChron C
    ON S.StockSymbol = C.StockSymbol
    WHERE S.StockTriggerValue <= C.StockValue
    GROUP BY S.StockSymbol, C.StockValue
    </Action>
    <ActionTimeout>P0DT00H00M45S</ActionTimeout>
  </ScheduledRule>
</ScheduledRules>
<Chronicles>
  <Chronicle>
    <ChronicleName>StockSubscriptionChron</ChronicleName>
    <SqlSchema>
      <SqlStatement>
      IF EXISTS (SELECT name FROM sysobjects
      WHERE name = 'StockSubscriptionChron'
      AND xtype = 'U')
      DROP TABLE StockSubscriptionChron
      </SqlStatement>
      <SqlStatement>
      CREATE TABLE StockSubscriptionChron
      (
      SubscriberId bigint,
      EventId bigint,
      StockSymbol char(10),
      Stock Value money
      PRIMARY KEY (SubscriberID)
      );
      </SqlStatement>
    </SqlSchema>
    <FileGroup>Secondary</FileGroup>
  </Chronicle>
</Chronicles>
</SubscriptionClass>
</SubscriptionClasses>
```

Defining a subscription necessitates naming the subscription class. Specifically, the name for the subscription class can be entered as a string value in a <SubscriptionClassName> element. For example, the following code can be used to create a subscription class with a name of "Stock."

<SubscriptionClassName>Stock</SubscriptionClassName>

Additionally, to define a subscription class the fields that make up the subscription class should be defined. As mentioned above, the field definitions can be used to validate any subscription data supplied by a subscription management application, for example XML code. They may also be used to automatically create the server table that stores the subscription data. The server table creation occurs when the application is added to notification services by the system administrator, using the NSControl Create or NSControl Update commands, for example.

In order to define subscription fields, a determination should be made about what fields are needed to store your subscription data. Application developers should document these fields in the <Schema>section of the <SubscriptionClass> node.

An exemplary <Field> node may be comprised of the following three child elements:

<FieldName>
<FieldType>
<FieldTypeMods>

The field name is indicated in the <FieldName> element probably as a string. Additionally, the application developer should designate the field type in the <FieldType> element. Field types must be indicated using server data types, for example SQL Server data types.

The <FieldTypeMods> element can be used to enable developers to specify null and default settings for this field. Developers could specify these settings using SQL Server Transact-SQL syntax conventions, for example.

The following exemplary code illustrates how a subscription filed may be defined in accordance with the subject invention. In this example, two subscription fields are defined: a 10-character stock symbol field, a stock trigger value field that accepts monetary data, a 10-character subscriber ID field, a 25-character subscriber device name field, and a 5-character subscriber locale field:

```
<Schema>
  <Field>
    <FieldName>StockSymbol</FieldName>
    <FieldType>char(10)</FieldType>
    <FieldTypeMods>NOT NULL</FieldTypeMods>
  </Field>
  <Field>
    <FieldName>StockTriggerValue</FieldName>
    <FieldType>money</FieldType>
    <FieldTypeMods>NOT NULL DEFAULT 10</FieldTypeMods>
  </Field>
  <Field>
    <FieldName>SubscriberID</FieldName>
    <FieldType>char(10)</FieldType>
    <FieldTypeMods>NOT NULL</FieldTypeMods>
  </Field>
  <Field>
    <FieldName>SubscriberDeviceName</FieldName>
    <FieldType>nvarchar(255)</FieldType>
    <FieldTypeMods>NOT NULL</FieldTypeMods>
  </Field>
  <Field>
    <FieldName>SubscriberLocale</FieldName>
    <FieldType>nvarchar(10)</FieldType>
    <FieldTypeMods>NOT NULL</FieldTypeMods>
  </Field>
</Schema>
```

The third act listed in defining a subscription application is designating the server filegroup for the subscription table.

As mentioned above, this step is optional, as the subscription table may be automatically created on the default filegroup if no other is specified.

Servers, like Microsoft's SQL Server™, provide filegroups to simplify database administration, as well as to allow optimal allocation of system data across multiple physical disks. Optimized data allocation can be critical to the performance of high-volume notification services applications.

Developers may specify the name of the filegroup upon which they wish the subscription table to be created as the value for this element. The following exemplary code demonstrate a simple method used to specify the name of a filegroup.

<FileGroup>Secondary</FileGroup>

Defining a subscription class may optionally involve providing statements, like Transact-SQL statements, to create one or more indexes on your event table. Indexes speed the location of particular records based on the data in a specified field. Furthermore, an index may be automatically employed when processing a query that uses the table that the index is created on, provided that using the index improves query performance. In brief, application performance can be significantly enhanced by creating appropriate indexes.

The following exemplary code illustrates the creation of an index. This example specifies that a clustered index named "StockSubIndex" will be created on the SubscriberID field of the StockSubscriptions table in the application database:

```
<IndexSqlSchema>
 <SqlStatement>
 IF EXISTS (SELECT name FROM sysindexes
 WHERE name = 'StockSubIndex')
 DROP INDEX StockSubIndex
 </SqlStatement>
 <SqlStatement>
 CREATE INDEX StockSubIndex
 ON StockSubscriptions (SubscriberID)
 </SqlStatement>
</IndexSqlSchema>
```

In defining a subscription class, the event rules associated with the subscription class should be specified. Event rules are named sets of one or more queries, for example Transact-SQL queries, that either create notifications or manipulate the data in a subscription chronicle table. Event rules are processed each time a new event batch is processed. This step is conditionally optional: developers are not required to have an <EventRules> node, but the must have a notification generation rule defined in either this node or a <ScheduledRules> node.

Developers may use the <EventRules> section to document any rules associated with the subscription class that should be executed each time a new event batch is processed. Developers might create one <EventRule> node within the <EventRules> section for each event rule they define.

In addition, if event-driven subscriptions are provided, an<EventRule> node must be used to specify the notification generation rule. The notification generation rule can be, for example, a Transact-SQL query consisting of a SELECT statement and a WHERE clause. The rule matches the most recent batch of events from the event table with the subscription information, based on the comparisons specified by the application developer. This query also contains a notification function. Calling this function triggers a notification.

Furthermore, if any subscription chronicle tables are being used to store subscription data, developers may want to define one or more rules that operate upon them as well. These queries can add, change, and delete subscription data in the chronicle tables, so that it is in the correct state for use by the application.

An exemplary <EventRule> node may be comprised of the following four child elements:
 <RuleName>
 <Action>
 <ActionTimeout>
 <EventClassName>

The <RuleName> element might be a string value indicating the name of the rule. The <Action> element may contain one or more Transact-SQL statements, for example, specifying the actions that this rule should take. Developers may either define a Transact-SQL query, or call a stored procedure that provides the same functionality. Additionally, all queries in the <Action> element are part of the same transaction, so they either all complete successfully or they all are rolled back. If the event rule fails, an error is logged to the system log.

The <ActionTimeout> element specifies the length of time permitted for the queries in the <Action> element to complete. If they are not completed during this time, the transaction containing them is rolled back, and an error is written to the system log. Additionally, the value of the <ActionTimeout> element could be specified in XML duration data type format. In such a case, the notation "P0DT00H00M00S" might be used, where P is the designator for the data type, D represents days, T is the designator for the time portion of the value, H represents hours, M represents minutes, and S represents seconds. Except for the P and T designators, unused duration elements may be skipped. For example, a timeout period of 2 minutes and 30 seconds may be represented as "P0DT00H02M30S", or "PT2M30S".

The <EventClassName> element may be employed to specify the event class associated with the execution of these rules. Only the processing of event batches of the specified event class causes execution of the rules.

The following exemplary code illustrates how an event subscription rule is created. This example specifically creates the subscription event rule "StockSubscriptionNotifyRule", which creates event-driven notifications, based on the processing of event batches containing events of the Stock class. This rule is permitted one minute to complete successfully.

```
<EventRules>
 <EventRule>
  <RuleName>StockSubscriptionNotifyRule</RuleName>
  <Action>
  SELECT dbo.StockNotificationNotify(S.SubscriberID,
  S.SubscriberDeviceName, S.SubscriberLocale,
  E.StockSymbol, E.StockValue)
  FROM StockSubscriptions S JOIN StockEvents E
  ON S.StockSymbol = E.StockSymbol
  JOIN StockEventChron C
  ON S.StockSymbol = C.StockSymbol
  WHERE S.StockTriggerValue <= E.StockValue
  AND S.StockTriggerValue > C.StockHighValue
  </Action>
```

-continued

```
    <ActionTimeout>P0DT00H01M00S</ActionTimeout>
    <EventClassName>Stock</EventClassName>
   </EventRule>
   <EventRule>
    <RuleName>StockSubscriptionEventChronRule</RuleName>
    <Action>
    INSERT StockEventChron
    (StockSymbol, StockHighValue)
    SELECT StockEvents.StockSymbol, StockEvents.StockValue
    FROM StockEvents
    WHERE StockEvents.StockSymbol NOT IN
    (SELECT StockSymbol FROM StockEventChron);
    UPDATE StockEventChron
    SET StockEventChron.StockHighValue = StockEvents.StockValue
    FROM StockEvents JOIN StockEventChron
    ON StockEvents.StockSymbol = StockEventChron.StockSymbol
    WHERE StockEvents.StockValue >
    StockEventChron.StockHighValue
    </Action>
    <ActionTimeout>P0DT00H01M00S</ActionTimeout>
    <EventClassName>Stock</EventClassName>
   </EventRule>
</EventRules>
```

Act six in defining a subscription class is defining schedule rules associated with the subscription class. Specifically, the <ScheduledRules> section may be used to document any rules associated with this subscription class that should be executed each time notifications for scheduled subscriptions are generated. One <ScheduledRule> node should be created within the <ScheduledRules> section for each event rule defined.

If scheduled subscriptions are being provided for, a <ScheduledRule> node can be used to specify the notification generation rule. The notification generation rule may be a Transact-SQL query consisting of a SELECT statement with a WHERE clause. In such a case, the rule matches the events information from an event chronicle table with the subscription information, based on the comparisons desired by the application developer. This query also contains a notification function. Furthermore, calling this function triggers a notification.

If any subscription chronicle tables are being employed to store subscription data for use in the application, then the application developer may want to define one or more rules that operate upon them as well. These queries can add, change, and delete subscription data in the chronicle tables, so that it is in the correct state for use the application.

An exemplary <ScheduledRule> node comprises four child elements:
  <RuleName>
  <Action>
  <ActionTimeout>

The <RuleName> element could be a string value that indicates the name of the rule.

The <Action> element may contain one or more Transact-SQL statements specifying the actions that this rule should take. Developers may either define a Transact-SQL query, or call a stored procedure that provides the same functionality. Furthermore, all queries that are defined in the <Action> element are part of the same transaction, so they either all complete successfully or they all are rolled back. In addition, if the scheduled rule fails, an error is logged to the system log.

The <ActionTimeout> element specifies the length of time permitted for the queries in the <Action> element to complete. If they are not completed during this time, the transaction containing them is rolled back, and an error is written to the system log. Additionally, the value of the <ActionTimeout> element should be specified in XML duration data type format. In such a case, the notation "P0DT00H00M00S" must be used, where P is the designator for the data type, D represents days, T is the designator for the time portion of the value, H represents hours, M represents minutes, and S represents seconds. Except for the P and T designators, unused duration elements may be skipped. For example, a timeout period of 2 minutes and 30 seconds may be represented as "P0DT00H02M30S", or "PT2M30S".

The following exemplary code illustrates how scheduled rules are defined. This example creates the subscription schedule rule "StockSubScheduledNotifyRule", which creates scheduled notifications. This rule sends a stock notification according to a user-defined schedule. The notification contains information about stocks whose value exceeds the trigger value that the user selected. This rule is permitted 45 seconds to complete successfully:

```
<ScheduledRules>
  <ScheduledRule>
    <RuleName>StockSubScheduledNotifyRule</RuleName>
    <Action>
    SELECT dbo.StockNotificationNotify
    (S.SubscriberID, S.SubscriberDeviceName,
    S.SubscriberLocale, C.StockSymbol, C.StockValue)
    FROM StockSubscriptions S JOIN StockEventChron C
    ON S.StockSymbol = C.StockSymbol
    WHERE S.StockTriggerValue <= C.StockValue
    GROUP BY S.StockSymbol, C.StockValue
    </Action>
    <ActionTimeout>P0DT00H00M45S</ActionTimeout>
  </ScheduledRule>
</ScheduledRules>
```

Finally, to define a subscription class one or more subscription chronicle tables associated with this subscription class should be defined. Application developers may want to define one or more subscription chronicle tables for use in their application. These tables can be used to store subscription data in order to avoid duplications, to conditionally generate notifications based on those previously sent, or for any other reason. Furthermore, subscription chronicle table information may be documented in a particular section of the ADF, for example SubscriptionClasses/SubscriptionClass/Chronicles. In addition, developers should create one <Chronicle> node in the <Chronicles> section for each chronicle table they define. However, if chronicle tables are not going to be used, then the <Chronicles> node should be excluded from the <SubscriptionClass> node.

An exemplary <Chronicle> node includes the following two child elements:
  <ChronicleName>
  <SqlSchema>

The <ChronicleName> element identifies the chronicle name as a string value. The schemas for creating subscription chronicle tables are specified in the <SqlSchema> node. The <SqlSchema> node may consist of one or more <SqlStatement> elements. In such a case, each <SqlStatement> will contain a Transact-SQL CREATE TABLE statement that defines a subscription chronicle table. It must include the table name, and the field names and their data types. It may also include arguments for constraints, and any other optional CREATE TABLE parameters that the developer wishes to specify. Developers may also choose to include a CREATE INDEX statement to create an index on their subscription chronicle table.

The schema may be developed with any text editor, although SQL Query Analyzer, which installs with Microsoft® SQL Server™, is recommended for ease of use. This tool provides templates for creating tables and other objects in the Templates tab of its Object Browser.

Furthermore, in this illustrative example, developers should always include an initial <SqlStatement> element with a statement to drop the table if it exists, prior to the <SqlStatement> element that creates the table. Without this statement, NSControl Update may raise errors related to attempting to create duplicate SQL Server objects if developers ever run it against this application.

The following exemplary code shows how a chronicle event table is defined. This example creates the subscription chronicle table "StockEventChron", which consists of the SubscriberID, EventID, StockSymbol and StockValue fields:

```
<Chronicles>
  <Chronicle>
    <ChronicleName>StockSubscriptionChron</ChronicleName>
    <SqlSchema>
      <SqlStatement>
      IF EXISTS (SELECT name FROM sysobjects
        WHERE name = 'StockSubscriptionChron'
        AND xtype = 'U')
        DROP TABLE StockSubscriptionChron
      </SqlStatement>
      <SqlStatement>
      CREATE TABLE StockSubscriptionChron
      (
      SubscriberId bigint,
      EventId bigint,
      StockSymbol char(10),
      StockValue money
      PRIMARY KEY (SubscriberID)
      );
      </SqlStatement>
    </SqlSchema>
  </Chronicle>
</Chronicles>
```

The application developer's fifth responsibility, listed above, in creating an application is completing the application setting in the ADF. Application settings are described in great detail supra.

Figure 15:
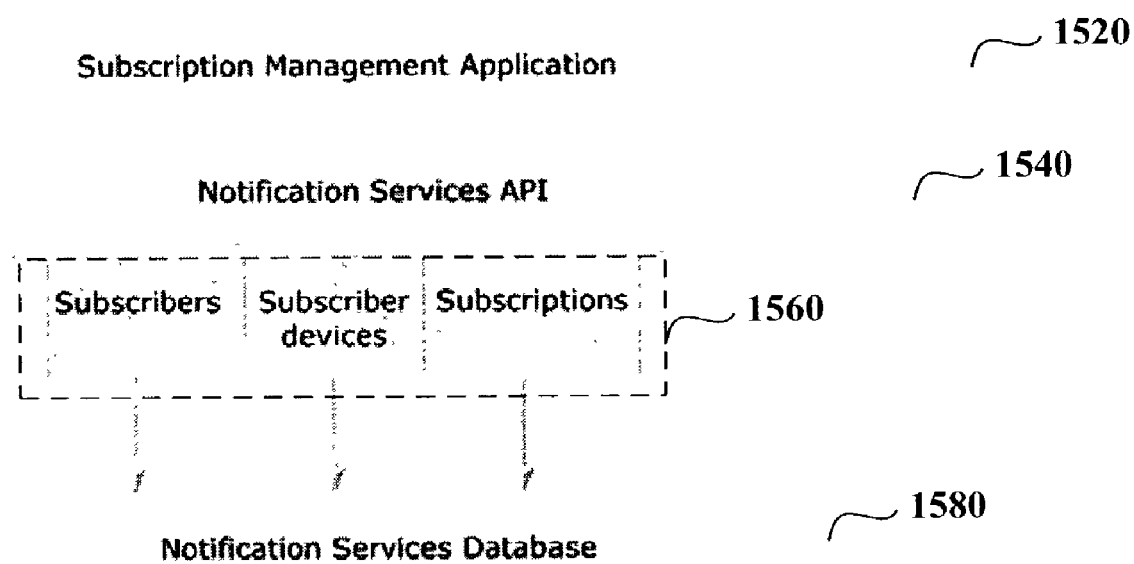
FIG. 15 is a block diagram of a system for updating subscription information in accordance with an aspect of the present invention.

The last components that need to be created by the application developer to define an application are a subscription management application and, optionally, custom event providers, content formatters, or delivery protocols. Referring to FIG. 15, a system for updating subscriber information is depicted. A subscription management application 1520 is an application that subscribers use to submit and manage their subscriptions. More specifically, the subscription management application 1520 provides the user with an interface for subscribers to update their information 1560, for one or more applications. The subscription management application 1520 updates subscriber information by invoking a notification services API 1540. Notification services API 1540 uses managed code classes to allow users to add, update, and delete information 1560, such as subscribers, subscriber devices, and subscriptions, which is stored in the notification services database 1580.

Finally, the application developer may optionally create custom event providers, content formatters, or delivery protocols. For many applications, however, these custom objects are not always necessary because standard event providers, content formatters, and delivery channels are provided with notification services.

As described above regarding notification services architecture, event collection is the process of obtaining event data from one or more sources such as XML files, applications, or databases and making this information available to a notification application. In the notification services system, event collection is the responsibility of an event provider.

An event provider obtains event data from an external event source and submits the data to notification services using an event interface. The event provider writes the data to an event table in batches. When the provider commits a batch of data to the event table, the notification generator can then process the batch and create notifications, either as soon as the batch of events arrives or according to a schedule.

Figure 16:
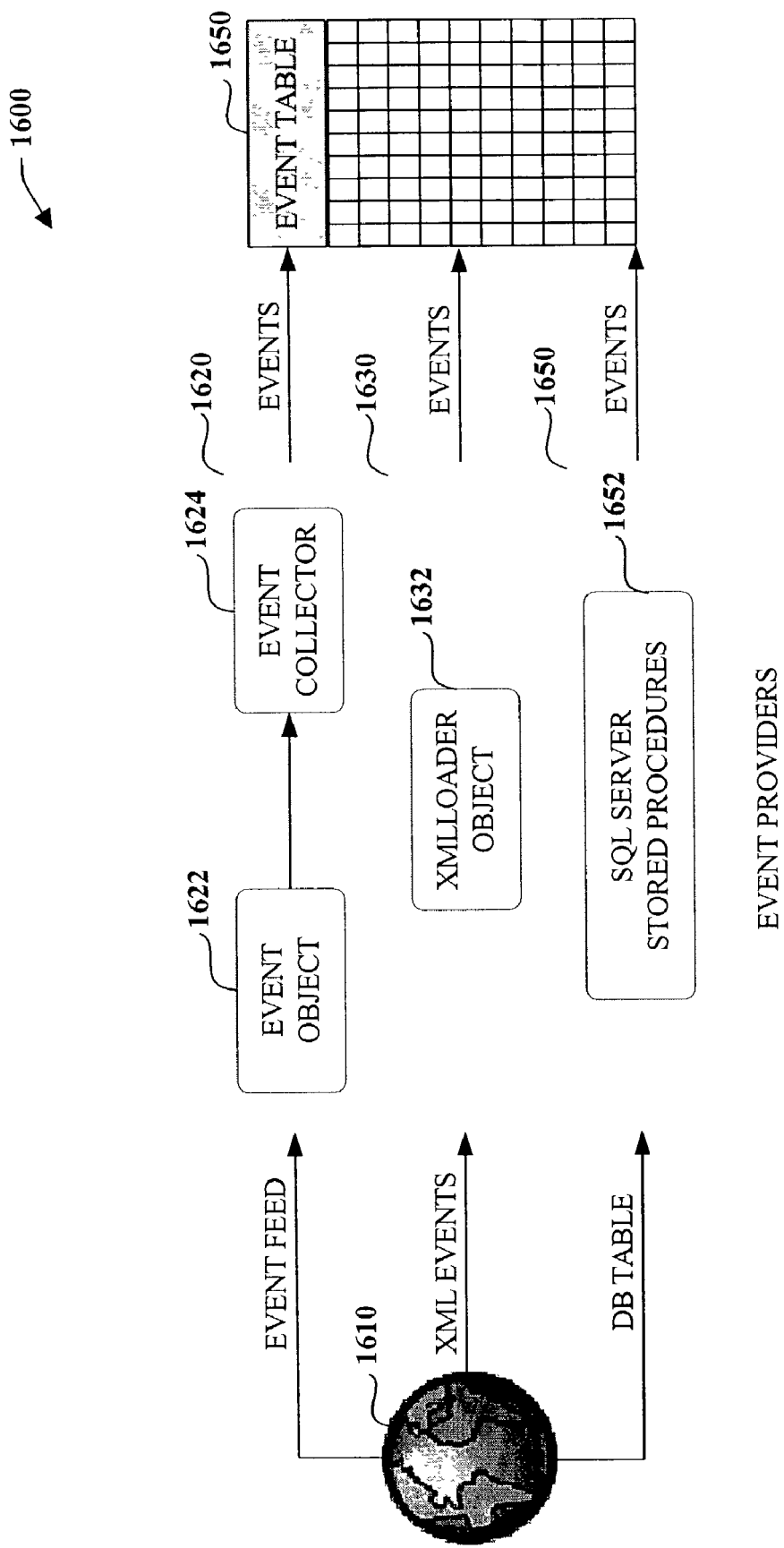
FIG. 16 is a block diagram illustrating the use of event submission APIs to implement event provider functionality in accordance with an aspect of the present invention.

Referring to FIG. 16, a system 1600 illustrates a high-level view of the use of event submission APIs to implement event provider functionality. An application programming interface (API) is a virtual interface implemented via software to facilitate data exchange between two or more different applications. The notification services system uses event submission APIs to facilitate communication of events to the system by converting external multi-format data to a recognizable system object. Four APIs are generally made available by notification services for submitting events 1610: a managed API 1630, an XML API 1630, a SQL API 1640, and a COM API that uses the managed API 1630.

The managed API 1630 uses event object 1622 and event collector object 1624 to submit events 1602 to the event table 1550. Using the name of the fields in the event table 1650, an application submits data, which is converted to an event object 1622, and then commits the data to the event table 1650 using the event collector object interface. Alternatively, the COM API uses COM interop to expose the subscriber, subscription, and event classes as COM interfaces.

The XML API 1630 provides a means to bulk-load XML data. The XML event provider collects an XML document or stream from an event source and submits the data to the XMLLoader interface 1632, which then writes the events to the event table.

The SQL API 1640 uses stored procedures to load event data from database objects. Typical ways of using the SQL event provider are to invoke the provider using a stored procedures 1642 or to run a query according to a schedule. The event provider receives a result set and writes it to the event table using the API stored procedures. This API is helpful because if a user already has data stored in a SQL database, there is no need to remove and create a new object for each entry of data, as the managed API 1620 does above. The SQL API 1640 simply needs to load the formatted information into the event table. It is to be appreciated that a join operation does not have to be coincident with an event submission, and that such join operation can occur substantially after events are submitted.

When deploying the notification system application, more than notification services components must be configure and supported. The data storage system, the subscription collection systems, and the delivery systems must all be deployed or configured. Additionally, instances and versions are two important factors to consider when deploying a notification system such as the system described herein. Depending on application requirements and optimal configurations, one may run multiple instances and multiple versions on a single system, or instances may span multi-machine configurations.

The subject notification system is based on instances. An instance is a single, named configuration of notification services that hosts a set of applications. The applications hosted by an instance use the same configuration and can be administered as a group. Instances also provide many benefits. First, because each instance has its own registry entries and service, one instance may run separately from other instances. In addition, all applications hosted by an instance share the same set of subscriber data, which may influence which applications you want to group under a single instance. Finally, instances can be scaled across multiple servers, providing flexible configuration and allowing a higher throughput of data and notifications.

When administrators deploy notification services, they create a configuration file that specifies the instance name, database system, database settings, applications, protocols, and delivery channels. The administrator then creates the instance using a command-line utility like NSControl. In the single-server scenario, the event provider, generator, and distributor processes are all hosted by a single service. The event provider collects data, the notification engine processes subscriptions, the context formatter formats notifications, and the distributor distributes them to the delivery service(s). Administrators may configure this system by creating the instance and registering the instance on that server. When an instance must be scaled out to support larger applications, the event provider, notification engine, and distributor processes can be scaled out across multiple servers.

Additionally, the subject notification system allows installation of multiple versions of notification services on a single system. This allows multiple instances to each run a different version of notification services if required. It also allows a single instance to be upgraded or downgraded easily.

Applications are deployed through instances. Deploying an application requires administrators to have all of its supporting files, such as the ADF and any custom objects, and the administrator specify application information in the instance configuration file. When administrators create the instance, the hosted applications are deployed with the instance.

The system administrator is also responsible for implementing applications in production. Ensuring that applications operate optimally requires careful planning, installation, configuration, management, and monitoring. Planning and installation is the process of defining what infrastructure is necessary for applications, planning the system architecture, and then installing system components on each server. Configuration is the process of creating notification services instances. This requires version management and careful planning so that system maintenance and upgrades cause minimal service interruptions. Management is similar to the management of SQL Server databases. This involves defining security, performing backups, and running maintenance jobs. Monitoring is extremely important for proper system operation. When an application is in production, the system administrator must monitor the application to ensure that the notification services system is receiving events and also generating and distributing notifications. It is also very important to make sure the delivery service is delivering the notifications. Through the aforementioned tasks, the system administrator defines the system configuration and ensures the system is operating as planned.

The notification services framework allows one to create and deploy notification applications quickly and easily. The notification services APIs streamline input of event, subscriber, and subscription data. The notification services engine provides functions to seamlessly generate, format, and route notifications to external delivery systems based on this information.

Notification services is intended to integrate with existing notification delivery services. Notification services will hand notification messages to these services for transportation to the subscriber's target device. .NET Alerts and SMS phone delivery are good examples of external delivery services, although neither of these services are required for a notification services application. Some of the benefits of programming with the notification services framework are:

Speed of development: An application can be prototyped in days.

Cost of development: Most of the underlying application requirements are provided by the notification services infrastructure, so you can concentrate on the details of your applications.

Ability to leverage existing knowledge: Notification Services may use popular technologies like Transact-SQL, XML, and the Microsoft .NET Framework to implement its components. Therefore, a user does not have to learn a proprietary language to create notification services applications.

Programmability: Event providers, subscription management applications, and notification formatting and delivery mechanisms can be tailored to a subscribers business needs. The notification services APIs can be used to capture data from any new or existing application that you create.

A notification services application runs on a platform based on the notification services engine and a server such as SQL Server. A notification services application is comprised of six primary components:

The notification services platform, consisting of the Notification Services service and the system databases. The platform stores system data and provides functions for notification generation and distribution.

The configuration and application definition (ADF) metadata files. These files describe the configuration information for a notification services instance, and the data and structure of a notification services application, respectively.

The subscription management application, which manages subscriber and subscription information and adds, updates, and deletes it in Notification Services.

One or more event providers, which gather event data and input it into notification services.

One or more content formatters, which take raw notification data after it has been generated, and format it appropriately for display on the target device.

One or more delivery protocols, which create a notification message, and then route it to the external delivery service that delivers the message to the target device.

The application developer should create the ADF and the subscription management application. The configuration file should also be created, but this task may fall to a person like the system administrator.

The subscription management application is external to the notification services system, and must be tailored specifically for use with the notification service offered. Furthermore, the notification services system provides APIs to assist in the development of this component.

The subscription management application is the application that subscribers use to submit and manage their subscriptions. More specifically, this component collects subscriber, subscription, and device information. This application may be designed either using managed or unmanaged code. If subscription management applications are designed in managed code, or code that is under control of the runtime, subscription-related classes provided by the notification API may be used to write data to the database. If the subscription management application is designed in unmanaged code, or code that runs outside runtime, COM (Component Object Model) interoperability interfaces, provided by the notification API may be used to write data to the database.

Notably, the generator function of the notification engine matches the event and subscription data using a query, known as a rule, and produces notification data based on the results. The generator is run on a scheduled basis, which is determined by the developer or system administrator and specified in the ADF.

The context formatter component of the delivery system formats the notification data and then distributes the resulting notifications. It is run on a scheduled basis, determine by the system administrator and specified in the ADF.

Finally, the notification services system provides for data and subscription security. The system security encompasses securing data and systems from unauthorized access, assigning permissions to users to perform necessary tasks, and ensuring that applications can read and write data as necessary. Securing notification services primarily involves securing the databases used by the notification services system. All access to read and write events, subscriptions, and notifications is controlled through database security. Any application or user that must read or write data, including the notification services system, must have permissions granted on the appropriate database objects. For example:

The Windows service for each instance uses either integrated security or a SQL Server account to execute stored procedures that process subscriptions and generate notifications.

Event providers must be able to execute stored procedures to execute stored procedures that submit events to the application databases.

Subscription management applications must have access to read and update the instance and application databases.

Administrators must be able to manage applications and instances, including running reports, monitoring performance, and running NSControl commands.

To simplify the administration of permissions on database objects, the notification services system includes a set of pre-defined database roles in each database. Administrators assign user accounts used by services to these roles. Database roles are divided into two categories: instance database roles and application database roles. The instance database is used primarily for subscriber management and message delivery. The application database is used for processing subscriptions and generating notifications. Therefore, users and applications perform different task in these two types of databases. Most accounts require permissions in both databases. In the instance database, you typically add administrators, the service account, and subscription management application accounts to the roles. In the application database, you typically add administrators, the service account, non-hosted event providers, and subscription management application accounts to the roles. The primary differences between the permissions in the instance and application databases are the sets of objects each role provides access to.

Additional security issues arise because the notification services system must be able to access resources on the local system, as well as over the network if applications are distributed across multiple servers. Once the notification system is run an instance of notification services is created. Developers may then assign two accounts to this service for security purposes. One is a service account and the other is a server account, for example a SQL Server account. The service account gives the service permissions on the local system and on the network, while the server account gives the service permissions only for the server.

The following discussion relates to a system and methodology to enable a plurality of information associated with generated notifications or messages, for example, to be automatically prioritized by a priorities system for transmittal to a user or system. The priorities system can utilize classifiers that can be explicitly and/or implicitly trained to prioritize one or more received messages according to a learned importance to the user. As an example, notifications can be classified as high, medium, low or other degrees of importance via a training set of examples or types of notifications having similar degrees of importance. A background monitor can be provided to monitor a user's activities regarding message processing to further refine or tune the classifier according to the user's personal decisions relating to message importance. Other priorities classifications can involve determinations relating to a loss associated with a time for delayed review or processing of the message.

After messages or other notifications have been automatically prioritized, users can review more important messages without having to sort through a plurality of lesser important and/or non-relevant messages. Messages can further be collected into one or more folders in terms of importance, wherein users can review messages of similar categorized importance at a desired time. Other systems such as a notification platform can direct the messages to one or more notification sinks (e.g., mobile phone, hand held computer) based upon the determined priority. For example, if an e-mail message were determined to be of high importance, the notification platform can determine if the user is presently at their desk to receive the message. If not, the notification platform can re-direct the message to a most likely communications device currently at the disposal of the user such as a cell phone or home laptop computer, wherein the user can be notified of the important or urgent message.

Figure 17:
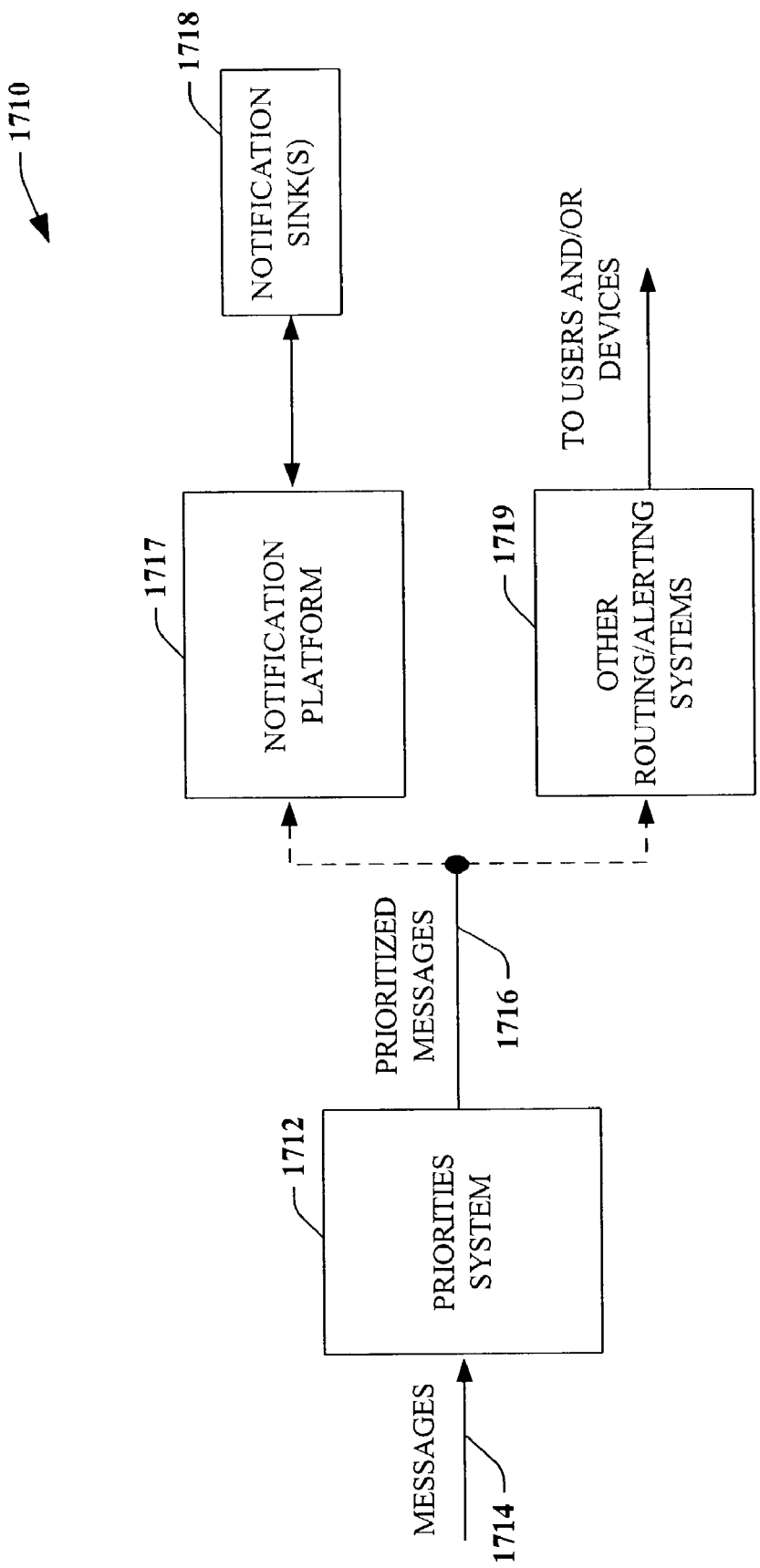
FIG. 17 is a schematic block diagram of a priorities system in accordance with an aspect of the present invention.

Referring to FIG. 17, a system 1710 illustrates a priorities system 1712 and notification architecture in accordance with an aspect of the present invention. The priorities system 1712 receives one or more messages or notifications 1714, generates a priority or measure of importance (e.g., probability value that the message is of a high or low importance) for the associated message, and provides the one or more messages with an associated priority value at an output 1716. As will be described in more detail below, classifiers can be constructed and trained to automatically assign measures of priorities to the messages 1714. For example, the output 1716 can be formatted such that messages are assigned a probability that the message belongs in a category of high, medium, low or other degree category of importance. The messages can be automatically sorted in an in box of an e-mail program (not shown), for example, according to the determined category of importance. The sorting can also include directing files to system folders having defined labels of importance. This can include having folders labeled with the degree of importance such as low, medium and high, wherein messages determined of a particular importance are sorted to the associated folder. Similarly, one or more audio sounds or visual displays (e.g., icon, symbol) can be adapted to alert the user that a message having a desired priority has been received (e.g., three beeps for high priority message, two beeps for medium, one beep for low, red or blinking alert symbol for high priority, green and non-blinking alert symbol indicating medium priority message has been received).

According to another aspect of the present invention, a notification platform 1517 can be employed in conjunction with the priorities system 1712 to direct prioritized messages to one or more notification sinks accessible to users. As will be described in more detail below, the notification platform 1717 can be adapted to receive the prioritized messages 1716 and make decisions regarding when, where, and how to notify the user, for example. As an example, the notification platform 1717 can determine a communications modality (e.g., current notification sink 1718 of the user such as a cell phone, or Personal Digital Assistant (PDA)) and likely location and/or likely focus of attention of the user. If a high importance e-mail were received, for example, the notification platform 1717 can determine the users location/focus and direct/reformat the message to the notification sink 1718 associated with the user. If a lower priority message 1716 were received, the notification platform 1717 can be configured to leave the e-mail in the user's in-box for later review as desired, for example. As will be described in more detail below, other routing and/or alerting systems 1719 may be utilized to direct prioritized messages 1716 to users and/or other systems.

In the following section of the description, the generation of a priority for text files such as an e-mail is described via an automatic classification system and process. The generation of priorities for texts as described can then be employed in other systems, such as a notification platform that are described in more detail below. The description in this section is provided in conjunction with FIG. 18 and FIG. 19, the former which is a diagram illustrating explicit and implicit training of a text classifier, and the latter which is a diagram depicting how a priority for a text is generated by input to the text classifier. The description is also provided in conjunction with FIGS. 20 and 21, which are diagrams of different schema according to which the priority of a text can be classified, and in conjunction with FIGS. 18 and 21, which are graphs illustrating cost functions that may be applicable depending on text type.

Figure 18:
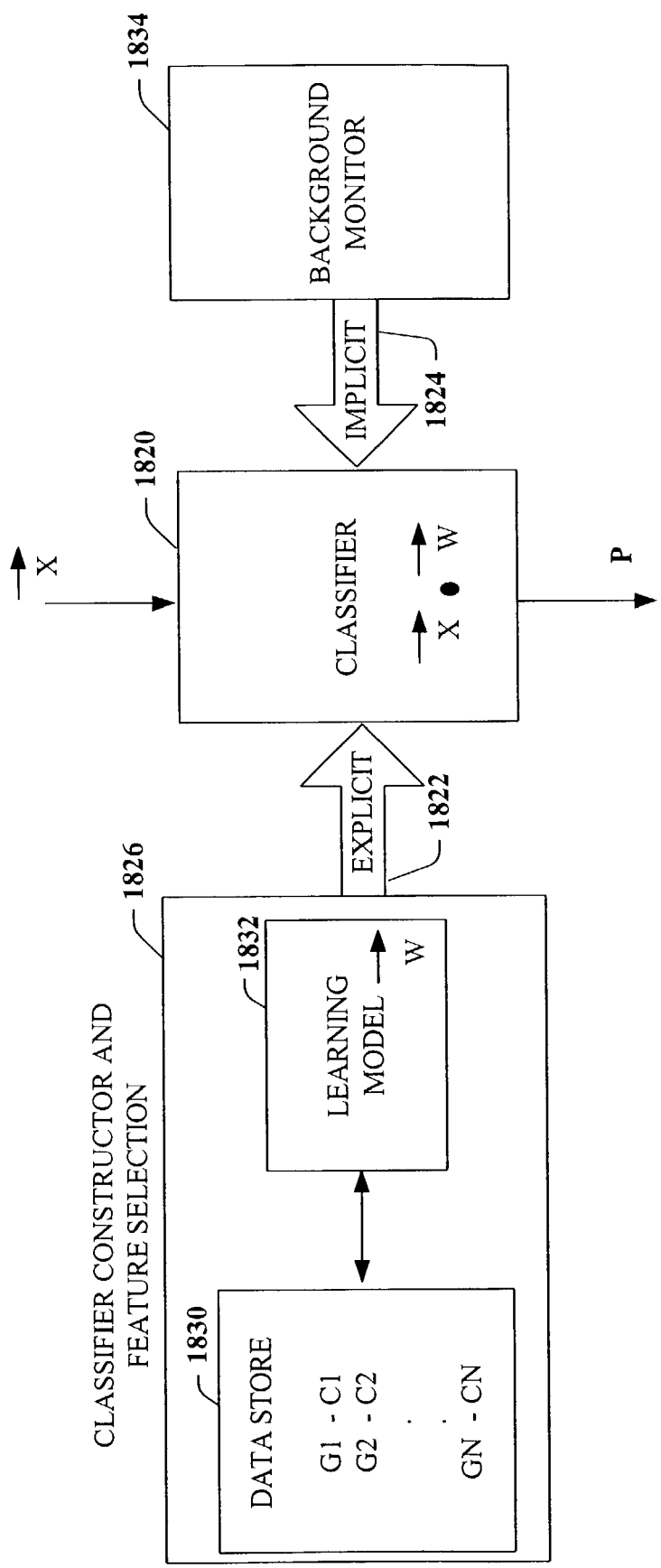
FIG. 18 is a block diagram illustrating a classifier in accordance with an aspect of the present invention.

Referring now to FIG. 18, a text/data classifier 1820 can be trained explicitly, as represented by the arrow 1822, and implicitly, as represented by the arrow 1824 to perform classification in terms of priority. Explicit training represented by the arrow 1822 is generally conducted at the initial phases of constructing the classifier 1820, while the implicit training represented by the arrow 1824 is typically conducted after the classifier 1820 has been constructed—to fine tune the classifier 1820, for example, via a background monitor 1834. Specific description is made herein with reference to an SVM classifier, for exemplary purposes of illustrating a classification training and implementation approach. Other text classification approaches include Bayesian networks, decision trees, and probabilistic classification models providing different patterns of independence may be employed. Text classification as used herein also is inclusive of statistical regression that is utilized to develop models of priority.

According to one aspect of the invention Support Vector Machines (SVM) which are well understood are employed as the classifier 1820. It is to be appreciated that other classifier models may also be utilized such as Naive Bayes, Bayes Net, decision tree and other learning models. SVM's are configured via a learning or training phase within a classifier constructor and feature selection module 1826. A classifier is a function that maps an input attribute vector, $x=(x1, x2, x3, x4, xn)$, to a confidence that the input belongs to a class—that is, $f(x?)$=confidence(class). In the case of text classification, attributes are words or phrases or other domain-specific attributes derived from the words (e.g., parts of speech, presence of key terms), and the classes are categories or areas of interest (e.g., levels of priorities).

An aspect of SVMs and other inductive-learning approaches is to employ a training set of labeled instances to learn a classification function automatically. The training set is depicted within a data store 1830 associated with the classifier constructor 1826. As illustrated, the training set may include a subset of groupings G1 through GN that indicate potential and/or actual elements or element combinations (e.g., words or phrases) that are associated with a particular category. The data store 1830 also includes a plurality of categories 1 through M, wherein the groupings can be associated with one or more categories. During learning, a function that maps input features to a confidence of class is learned. Thus, after learning a model, categories are represented as a weighted vector of input features.

For category classification, binary feature values (e.g., a word occurs or does not occur in a category), or real-valued features (e.g., a word occurs with an importance weight r) are often employed. Since category collections may contain a large number of unique terms, a feature selection is generally employed when applying machine-learning techniques to categorization. To reduce the number of features, features may be removed based on overall frequency counts, and then selected according to a smaller number of features based on a fit to the categories. The fit to the category may be determined via mutual information, information gain, chi-square and/or substantially any other statistical selection technique. These smaller descriptions then serve as an input to the SVM. It is noted that linear SVMs provide suitable generalization accuracy and provide suitably fast learning. Other classes of nonlinear SVMs include polynomial classifiers and radial basis functions and may also be utilized in accordance with the present invention.

The classifier constructor 1826 employs a learning model 1832 in order to analyze the groupings and associated categories in the data store 1830 to "learn" a function mapping input vectors to confidence of class. For many learning models, including the SVM, the model for the categories can be represented as a vector of feature weights, w, wherein there can be a learned vector of weights for each category. When the weights w are learned, new texts are classified by computing the dot product of x and w, wherein w is the vector of learned weights, and x is the vector representing a new text. A sigmoid function may also be provided to transform the output of the SVM to probabilities P. Probabilities provide comparable scores across categories or classes from which priorities can be determined.

Figure 19:
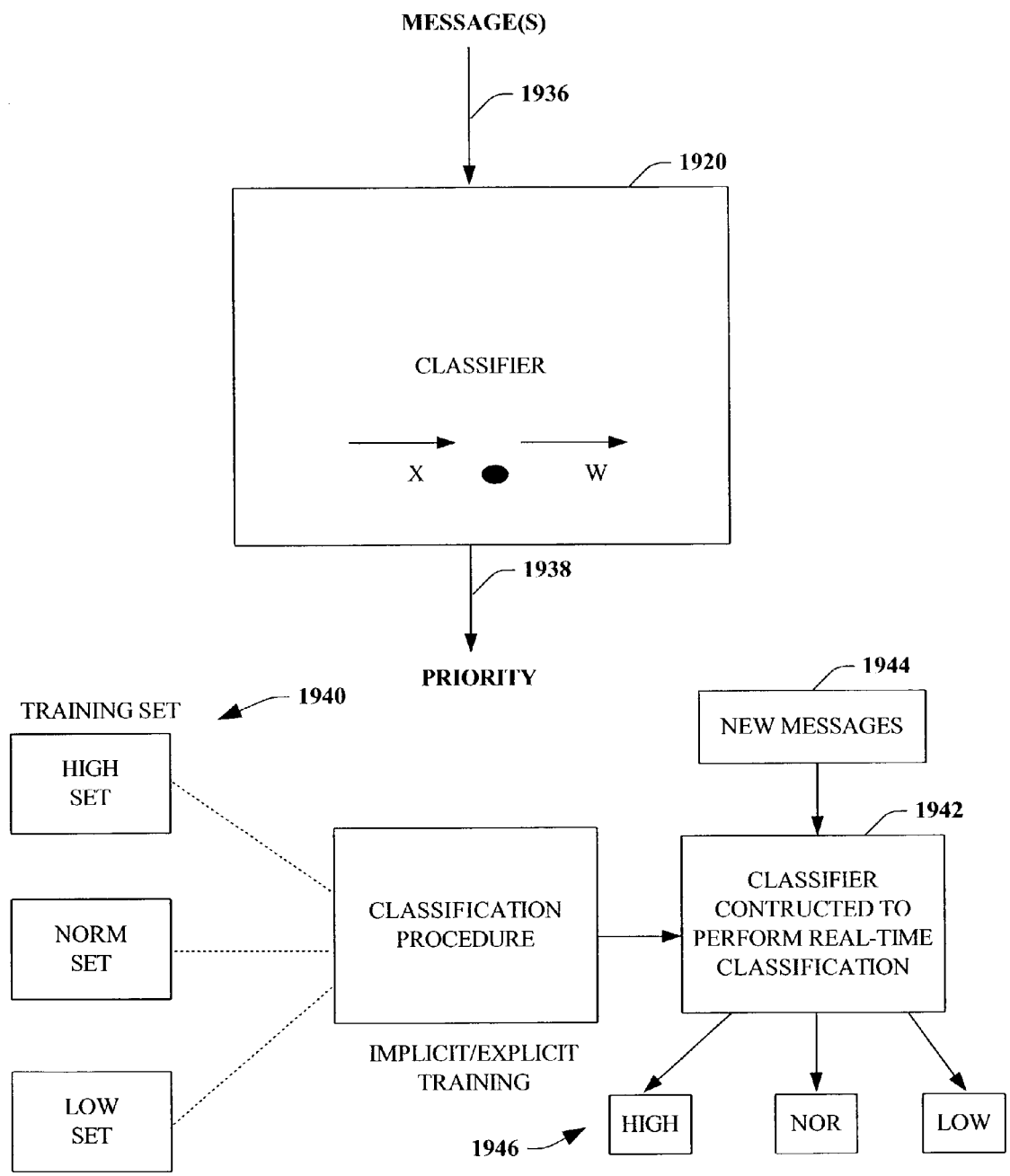
FIG. 19 is a schematic block diagram illustrating message classification in accordance with an aspect of the present invention.

The SVM is a parameterized function whose functional form is defined before training. Training an SVM generally requires a labeled training set, since the SVM will fit the function from a set of examples. The training set can consist of a set of N examples. Each example consists of an input vector, xi, and a category label, yj, which describes whether the input vector is in a category. For each category there can be N free parameters in an SVM trained with N examples. To find these parameters, a quadratic programming (QP)

problem is solved as is well understood. There is a plurality of well-known techniques for solving the QP problem. These techniques may include a Sequential Minimal Optimization technique as well as other techniques. As depicted in FIG. 19, a text input 1936 that has been transformed into an input vector x is applied to the classifier 1920 for each category. The classifier 1920 utilizes the learned weight vectors w determined by classifier constructor 1926 (e.g., one weight vector for each category) and forms a dot product to provide a priority output 1938, wherein probabilities P may be assigned to the input text 1936 indicating one or more associated priorities (e.g., high, medium, low).

Referring back to FIG. 18, training of the text classifier 1820 as represented by the arrow 1822 includes constructing the classifier in 1826, including utilizing feature selection. In the explicit training phase, the classifier 1820 can be presented with both time-critical and non-time-critical texts, so that the classifier may be able to discriminate between the two, for example. This training set may be provided by the user, or a standard or default training set may be utilized. Given a training corpus, the classifier 1820 first applies feature-selection procedures that attempt to find the most discriminatory features. This process employs a mutual-information analysis. Feature selection can operate on one or more words or higher-level distinctions made available, such as phrases and parts of speech tagged with natural language processing. That is, the text classifier 1820 can be seeded with specially tagged text to discriminate features of a text that are considered important.

Feature selection for text classification typically performs a search over single words. Beyond the reliance on single words, domain-specific phrases and high-level patterns of features are also made available. Special tokens can also enhance classification. The quality of the learned classifiers for e-mail criticality, for example, can be enhanced by inputting to the feature selection procedures handcrafted features that are identified as being useful for distinguishing among e-mail of different time criticality. Thus, during feature selection, one or more words as well as phrases and symbols that are useful for discriminating among messages of different levels of time criticality are considered.

As the following examples illustrate, tokens and/or patterns of value in identifying the criticality of messages include such distinctions as, and including Boolean combinations of the following:

Information in a Message Header

For example:
To: field (Recipient information)
Addressed just to user,
Addressed to a few people including user,
Addressed to an alias with a small number of people,
Addressed to several aliases with a small number of people,
Cc:'d to user,
Bcc:'d to user.
From: field (Sender information)
Names on pre-determined list of important people, potentially segmented into a variety of classes of individuals, (e g., Family members, Friends)
Senders identified as internal to the user's company/organization,
Information about the structure of organizational relationships relative to the user drawn from an online organization chart such as:
  Managers user reports to,
  Managers of the managers of users,
  People who report to the user,
  External business people.

Past tense Information

These include descriptions about events that have already occurred such as:
We met,
meeting went,
happened,
got together,
took care of,
meeting yesterday.

Future tense Information
Tomorrow,
This week,
Are you going to,
When can we,
Looking forward to,
Will this,
Will be.

Meeting and coordination Information
Get together,
Can you meet,
Will get together,
Coordinate with,
Need to get together,
See you,
Arrange a meeting,
Like to invite,
Be around.

Resolved dates

Future vs. past dates and times indicated from patterns of text to state dates and times explicitly or typical abbreviations such as:
On 5/2,
At 12:00.

Questions
Words, phrases adjacent to questions marks (?)

Indications of Personal Requests:
Can you,
Are you,
Will you,
you please,
Can you do,
Favor to ask,
From you.

Indications of Need:
I need,
He needs,
She needs,
I'd like,
It would be great,
I want,
He wants,
She wants,
Take care of.

Time criticality
happening soon,
right away,
deadline will be,
deadline is,
as soon as possible,
needs this soon,
to be done soon, done right away,
this soon,
by [date],
by [time].
Importance
is important,
is critical,
Word, phrase+!,
Explicit priority flag status (low, none, high).
Length of message
Number of bytes in component of new message.

Signs of Commercial and Adult-Content Junk e-mail
Free!!,
Word+!!!,
Under 18,
Adult's only,
Percent of capitalized words,
Percent non-alphanumeric characters.

It is noted that the word or phrase groupings depicted above illustrate exemplary words, groupings, or phrases that may be utilized from which to conduct classifier training. It is to be appreciated that other similar words, groups, or phrases may be similarly employed and thus the present invention is not limited to the illustrated examples.

Furthermore, still referring to FIG. 18, implicit training of the classifier 1820, as represented by the arrow 1824, can be conducted by monitoring the user work or usage patterns via the background monitor 1834 that can reside on the user's desktop or mobile computer, for example. For example, as users work, and lists of mail are reviewed, it can be assumed that time-critical messages are read first, and lower-priority messages are reviewed later, and/or deleted. That is, when presented with a new e-mail, the user is monitored to determine whether he or she immediately opens the e-mail, and in what order, deletes the email without opening, and/or replies to the e-mail relatively in a short amount of time. Thus, the classifier 1820 is adapted such that a user is monitored while working or operating a system, the classifier is periodically refined by training in the background and updated for enhancing real-time decision-making. Background techniques for building classifiers can extend from those that update the classifier 1820 with new training messages.

Alternatively, larger quantities of messages can be gathered, wherein new filters are created in a batch process, either per a daily schedule, per the number of new quantities of messages admitted to the training set, and/or combinations. For each message inputted into the classifier, for example, a new case for the classifier can be created. The cases are stored as negative and positive examples of texts that are either high or low priority, for example. As an example, one or more low, medium, and high urgency classes can be recognized such that the probabilities of membership in each of these classes are utilized to build an expected criticality. Larger numbers of criticality classes can be utilized to seek higher resolution. For example, as illustrated in FIG. 19, a training set of messages 1940 (e.g., very high, high, medium, normal, low, very low, etc.) can be initially employed to train a classifier 1942, such that real-time classification is achieved, as indicated at 1944, wherein new messages are classified according to the number of examples resolved by the training set 1940. In FIG. 19, three such categories are illustrated for exemplary purposes, however, it is to be appreciated that a plurality of such categories may be trained according to varying degrees of desired importance. As illustrated, the new messages 1944 may be labeled, tagged and/or sorted into one or more folders 1946, for example, according to the priorities assigned by the classifier 1942. As will be described in more detail below, the assigned priorities may further be utilized by subsequent systems to make message format, delivery and modality determinations to/for the user.

According to another aspect of the invention, an estimation of a number or value can be achieved by monitoring a user interact with e-mail, for example, rather than labeling the case or message as one of a set of folders. Thus, a classifier can be continued to be updated but have a moving window, wherein cases of messages or documents that are newer than some age are considered, as specified by the user.

For example, a constant rate of loss associated with the delayed review of messages is referred to as the expected criticality (EC) of the message, wherein, $$EC = \sum_i C^d(H_i) p(H_i | E^d)$$

wherein C is a cost function, d is a delay, E is an event, H is the criticality class of the e-mail, and EC is expressed as the sum over the likelihood of the class(es) weighted by the rate of loss described by the cost function C for the potential class(es).

As an example, still referring to FIG. 19, the text, such as an e-mail message, 1936 is input into the classifier 1920, which based thereon generates the priority 1938 for the text 1936. That is, the classifier 1920 generates the priority 1938, measured as a percentage from 0 to 100%, for example. This percentage can be a measure of the likelihood that the text 1936 is of high or some other priority, based on the previous training of the classifier 1920.

It is noted that the present invention as has been described above, the classifier 1920 and the priority 1938 can be based on a scheme wherein the e-mails in the training phase are construed as either high priority or low priority, for example. This scheme is illustrated in reference to FIG. 18, wherein the text classifier 1820 is trained by a group of texts 1847 that are predetermined to be high priority and a group of texts 1847 that are predetermined to be low priority. The text 1836 to be analyzed is input into the classifier 1820, which outputs a scalar number 1849, for example, measuring the likelihood that the text being analyzed is of high or low priority.

Figure 20:
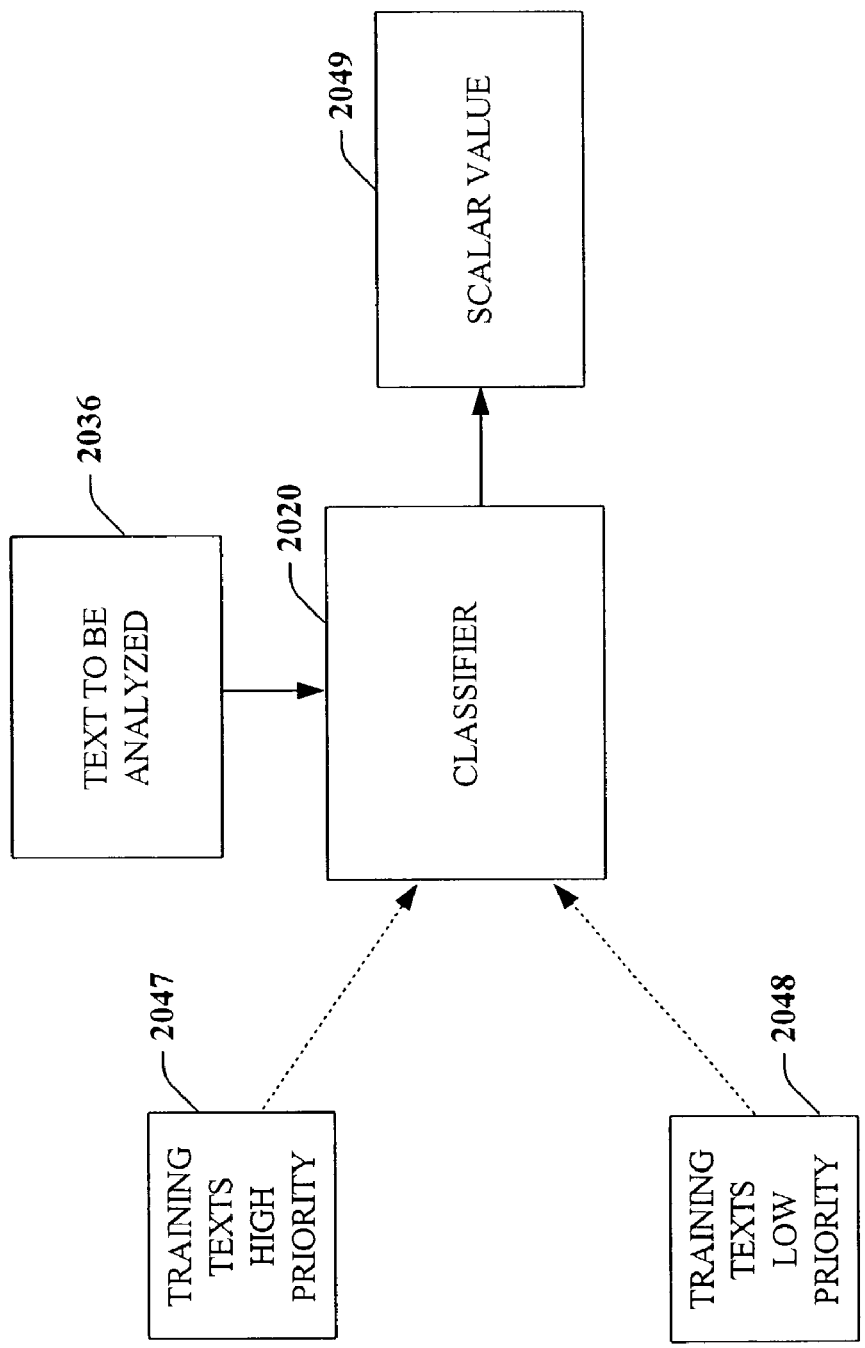
FIG. 20 is a schematic block diagram illustrating a scalar classifier output in accordance with an aspect of the present invention.
Figure 21:
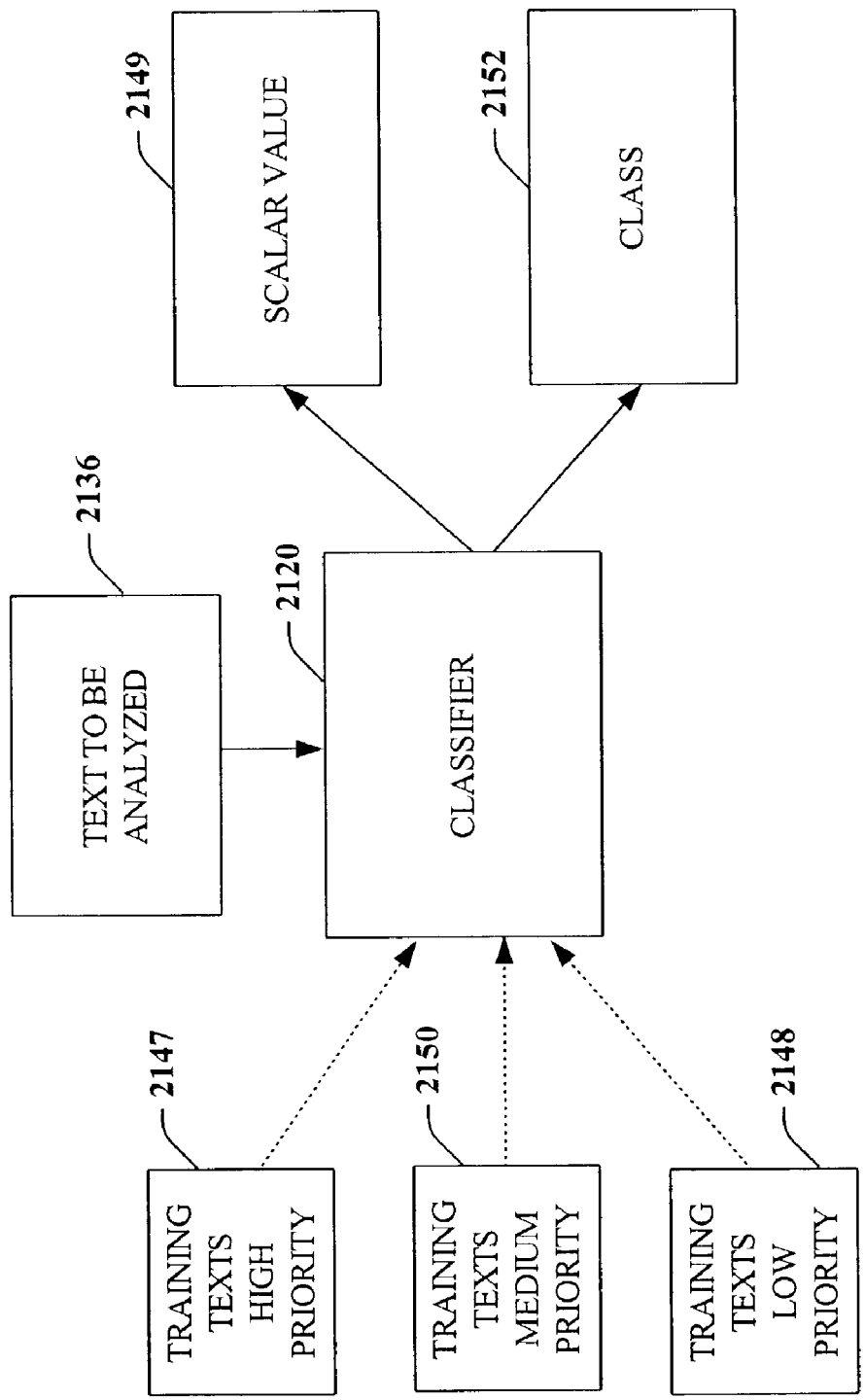
FIG. 21 is a schematic block diagram illustrating texts classified according to a class and scalar output in accordance with an aspect of the present invention.

For example, referring to FIGS. 20 and 21, diagrams illustrates a scheme wherein texts 2036, 2136 are categorized into low, medium, and high priority. As described above, a plurality of other training sets may be employed to provide greater or higher resolution distinctions of priorities. The text classifier 2020, 2120 is trained by a group of texts 2047, 2147 that are high priority and a group of texts 2048, 2148 that are low priority, and by a group of texts 2150 that are medium priority. Thus, the text 2036, 2136 to be analyzed is input into the classifier 2020, 2120, which outputs a scalar number 2049, 2149, that can measure the likelihood that the text being analyzed is of high priority, if so desired, or medium priority or low priority, for example. The classifier 2020, 2120 is also able to output a class 2152, which indicates the class of low, medium, or high priority that the text 2136 most likely falls into. Further classes can also be added if desired.

The present invention is not limited to the definition of priority as this term is employed by the classifier 2020, 2120 to assign such priority to a text such as an e-mail message. Priority can be defined in terms of a loss function, for example. More specifically, priority can be defined in terms of the expected cost in lost opportunities per time delayed in reviewing the text after it has be received. That is, the expected lost or cost that will result for delayed processing of the text. The loss function can further vary according to the type of text received.

Figure 22:
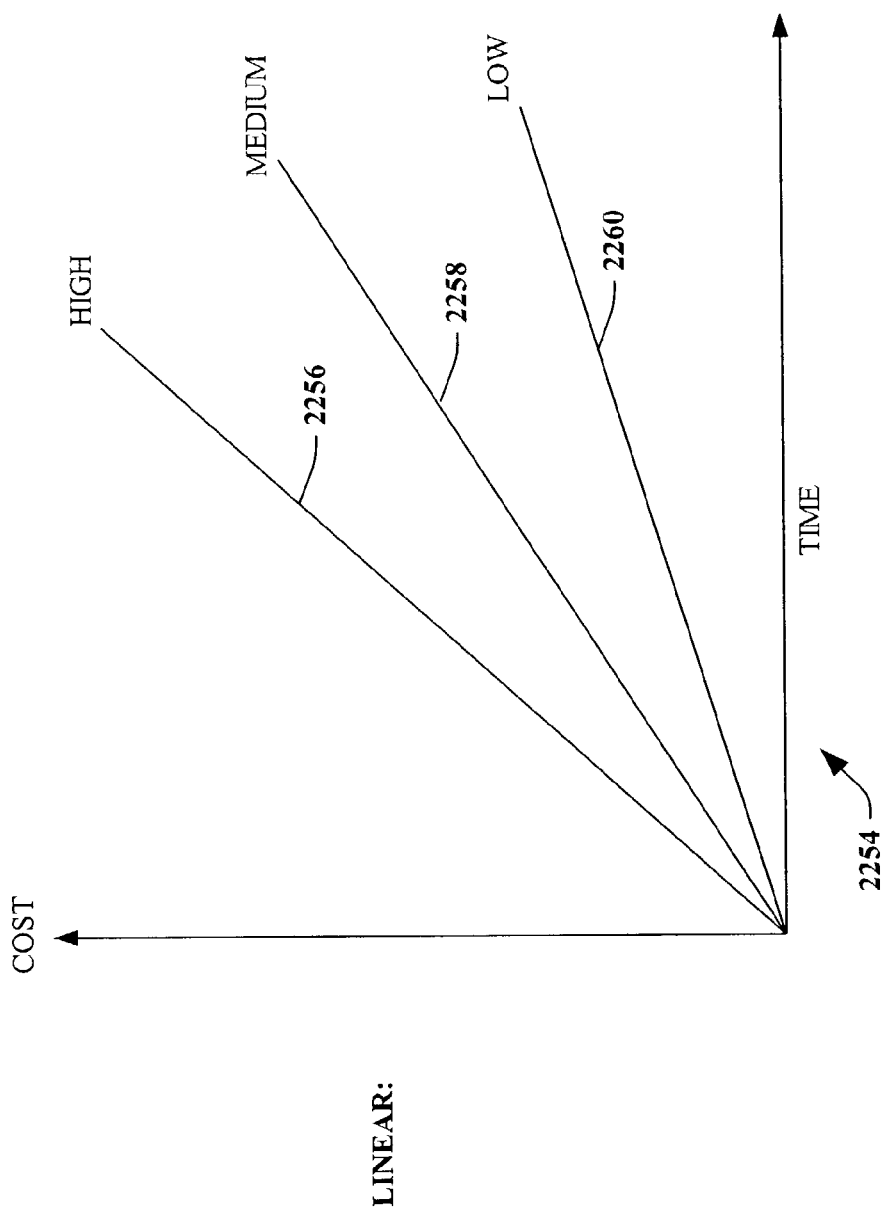
FIG. 22 is a diagram illustrating linear priorities models in accordance with an aspect of the present invention.

For example, a general case is illustrated in FIG. 22, which is a graph 2254 of linear cost functions dependent on the priority of a text. In the graph 2254, as time increases, the cost of not having reviewed a text also increases. However, the cost increases more for a high priority message, as indicated by the line 2256, as compared to a medium priority message, as indicated by the line 2258, or a low priority message, as indicated by the line 2260. For example, the high priority line 2256 may have a slope of 100, the medium priority line 2258 may have a slope of 10, and the low priority line 2260 may have a slope of one. These slope values can then be utilized by the classifier 22 in assigning a priority to a given text, for example, by regression analysis.

Figure 23:
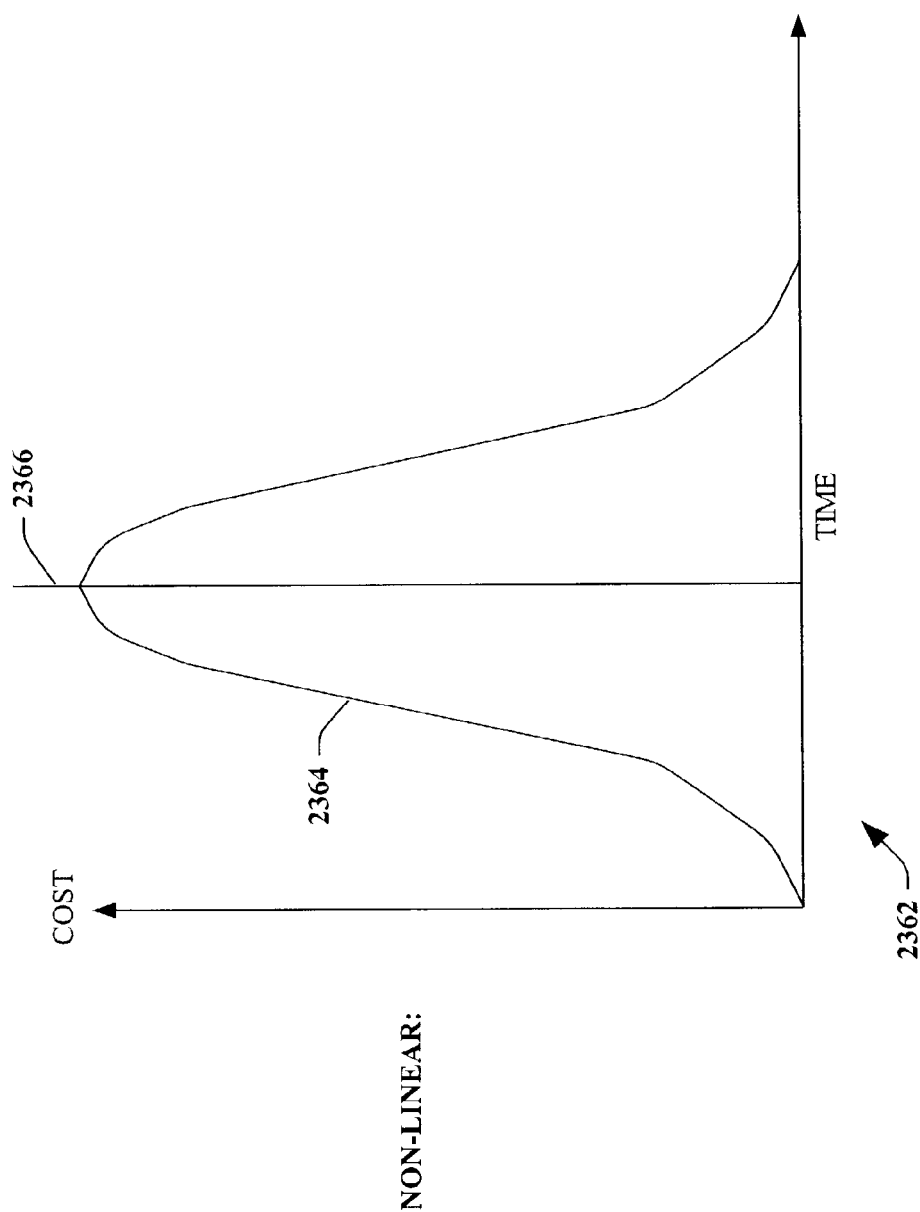
FIG. 23 is a diagram illustrating a non-linear priorities model in accordance with an aspect of the present invention.

Some messages, however, do not have their priorities well approximated by the use of a linear cost function. For example, a message relating to a meeting will have its cost function increase as the time of the meeting nears, and thereafter, the cost function rapidly decreases. That is, after the meeting is missed, there is not much generally a user can do about it. This situation is better approximated by a non-linear cost function, as depicted in FIG. 23. In a graph 2362, a cost function 2364 rapidly increases until it reaches the time of the meeting demarcated by the line 2366, after which it rapidly decreases. Depending on a message's type, the cost function can be approximated by one of many different representative cost functions, both linear and non-linear.

Thus, as has been described, the priority of a text can be just the likelihood that it is of one of a plurality of priorities based on the output of a classifier, or the most likely priority class the text applies to, also based on the output of the classifier. Alternatively, an expected time criticality of the text, such as an e-mail message, can determined. This can be written as:

$$EL = \sum_{i}^{n} p(critical_i)C(critical_i)$$

wherein EL is the expected loss, $p(critical_i)$ is the probability that a text has the criticality i, $C(critical_i)$ is the cost function for text having the criticality i, and n is the total number of criticality classes minus one. The cost functions may be linear or non-linear, as has been described. In the case where the function is linear, the cost function defines a constant rate of loss with time. For non-linear functions, the rate of loss changes with delayed review or processing of the text and can increase or decrease, depending on the amount of delay.

In the case where n=1, specifying that there are only two priority classes low and high, the expected loss can be reformulated as:

$$EC=p(critical_{high})C(critical_{high})+[1-p(critical_{low})]C(critical_{low})$$

wherein EC is the expected criticality of a text. Furthermore, if the cost function of low criticality messages is set to zero, this becomes:

$$EC=p(critical_{high})C(critical_{high})$$

The total loss until the time of review of a text can be expressed as the integration of the expressed criticality, or, $$EL = \int_0^t p(critical_{high})C(critical_{high}, t)dt$$

wherein t is the time delay before reviewing the document.

Other measures that accord a value metric for ranking documents, such as e-mail messages, by importance. While the discussion above focused on priority as time criticality, other notions of "importance" can also be trained. For example, this can be accomplished by labeling a set of training folders: "High Importance" all the way down to "Low Importance" wherein a measure of "expected importance" can be determined. Another metric can be based on a semantic label, "messages that I would wish to hear about within 1 day while traveling" and to determine a measure for prioritizing messages for forwarding to a traveling user. Furthermore, one utilized metric is urgency or time-criticality, as it has clear semantics for decision-making, triage, and routing. In this case, the classes are labeled according to different levels of urgency and computed as an expected urgency for each message from the probabilities inferred that the message is in each class.

Extensions to criticality classification, as described in the previous section, can also be provided in accordance with the present invention. For instance, classification can include an automatic search for combinations of high-payoff features within or between classes of features. As an example, combinations of special distinctions, structures, and so forth, with words that have been found to be particularly useful for certain users can be searched for and utilized in the classification process. A combination of two features is referred as a doublet, whereas a combination of three features is referred to as a triplet, and so forth. The combination of features can enable improved classification.

Classification can also be improved with the use of incremental indexing that employs a moving window in the classifier. This enables the classifier to be routinely refreshed, as old data is timed out, and new data is brought in.

Classification can also be based on the determination of the date and time of an event specified in a message. This determination can assign features to the message that can be utilized by the classifier. For example, the features assigned may include: today within four hours, today within eight hours, tomorrow, this week, this month, and next month and beyond. This enables the classifier to have improved accuracy with respect to the messages that are classified. In general, classification can be based on the time of the referenced event, considering whether the event is in the future or has past. With respect to future events, classification thus considers the sender's reference to a time in the future when the event is to occur.

Other new features can also be integrated into the classification process. For example, an organization chart can be utilized to determine how important a message is by the sender's location within the chart. Linguistic features may be integrated into the classifier. To accommodate different languages, the features may be modified depending on the origin of the sender, and/or the language in which the message is written. Classification may vary depending on different folders in which messages are stored, as well as other scaling and control rules. In addition to e-mail and other sources, classification can be performed on instant messages, and other sources of information, such as stock tickers, and so forth.

In general, a sender-recipient structural relationship may be considered in the classification process. If the user is substantially the only recipient of a message, for example, then this message may be considered as more important than a message sent to a small number of people. In turn, a message sent to a small number of people may be more important than a message on which the user is blind-copied (bcc'ed) or carbon-copied (cc'ed). With respect to the sender, criticality may be assigned based on whether the sender's name is recognized. Criticality may also be assigned depending on whether the sender is internal or external to the organization of which the user is associated.

Other distinctions that may be considered in classification include the length of the message, whether questions have been detected, and whether the user's name is in the message. Language associated with time criticality may increase the message's importance. For example, phrases such as "happening soon," "right away," "as soon as possible," "ASAP," and "deadline is," may render the message more critical. Usage of past tense as compared to future tense may be considered, as well as coordinative tasks specified by phrases such as "get together," "can we meet," and so on. Evidence of junk mail may lower the priority of a message. Predicates representing combinations, such as a short question from a sender proximate to the user in the organization chart, may also be considered in the classification process.

In the next section of the description, processes are described that provide a determination when to alert the user of a high-priority text, for example, a text that has a likelihood of being high priority greater than a user-set threshold, or greater than a threshold determined by decision-theoretic reasoning. That is, beyond knowing about time-critical messages, it is also important to decide when to alert a user to time-critical messages if the user is not directly viewing incoming e-mail, for example. In general, a cost of distracting the user from the current task being addressed to learn about the time-critical message is determined.

Alternatively, various policies for alerting and notification can be employed. These policies can be implemented within a notification platform architecture, for example, that is described in more detail below. Some of these policies include:

Setting a user-specified upper bound on the total loss. This policy would specify that a system should generate an alert when the total loss associated with the delayed review of a message exceeds some pre-specified "tolerable" loss "x".

Another policy can be a cost-benefit analysis based on more complete decision-theoretic analysis, such as NEVA=EVTA−ECA−TC, wherein NEVA is the net expected value of alerting, EVTA is the expected value of alerting, ECA is the expected cost of alerting, and TC is the transmission cost associated with communicating a message.

In general, a user should be alerted when a cost-benefit analysis suggests that the expected loss the user would incur in not reviewing the message at time t is greater than the expected cost of alerting the user. That is, alerting should be conducted if:

$EL-EC>0$ wherein EL is the expected loss of non-review of the text at a current time t, and EC is the expected cost of alerting the user of the text at the current time t. The expected loss is as described in the previous section of the description.

However, the above formulation may not be the most accurate, since the user will often review the message on his or her own in the future. Therefore, in actuality, the user should generally be alerted when the expected value of alerting, referred to as EVTA, is positive. The expected value of alerting should thus consider the value of alerting the user of the text now, as opposed to the value of the user reviewing the message later on their own, without alert, minus the cost of alerting. This can be stated as:

$EVA = EL_{alert} - EL_{no-alert} - EC$ wherein $EL_{alert}$ is the expected loss of the user reviewing the message if he or she were to review the message now, upon being alerted, as opposed to $EL_{no-alert}$, which is the expected loss of the user reviewing the message on his or her own at some point, without being alerted, minus EC, the expected cost of alerting based on a consideration of distraction and on the direct cost of the transmitting the information.

Furthermore, information from several messages can be grouped together into a single compound alert. Reviewing information about multiple messages in an alert can be more costly than an alert relaying information about a single message. Such increases in distraction can be represented by making the cost of an alert a function of the its informational complexity. It can be assumed that the EVA of an e-mail message is independent of the EVA of other e-mail messages. EVA($M_i$, t), for example, refers to the value of alerting a user about a single message $M_i$ at time t and ECA(n) refers to the expected cost of relaying the content of n messages. Thus, multiple messages can be considered by summing together the expected value of relaying information about a set of n messages, wherein:

$$NEVA = \sum_{i=1} EVA(M_i, t) - ECA(n).$$

It is also noted that in order to determine the expect cost of alerting, it is useful to infer or directly access information about whether the user is present or is not present. Sensors can be employed that indicate when a user is in the office, such as infrared sensors and pressure sensors. However, if such devices are not available, a probability that a user is in the office can be assigned as a function of user activity on the computer, for example, such as the time since last observed mouse or keyboard activity. Furthermore, scheduling information available in a calendar can also be employed to make inferences about the distance and disposition of a user and to consider the costs of forwarding messages to the user by different processes.

Figure 24:
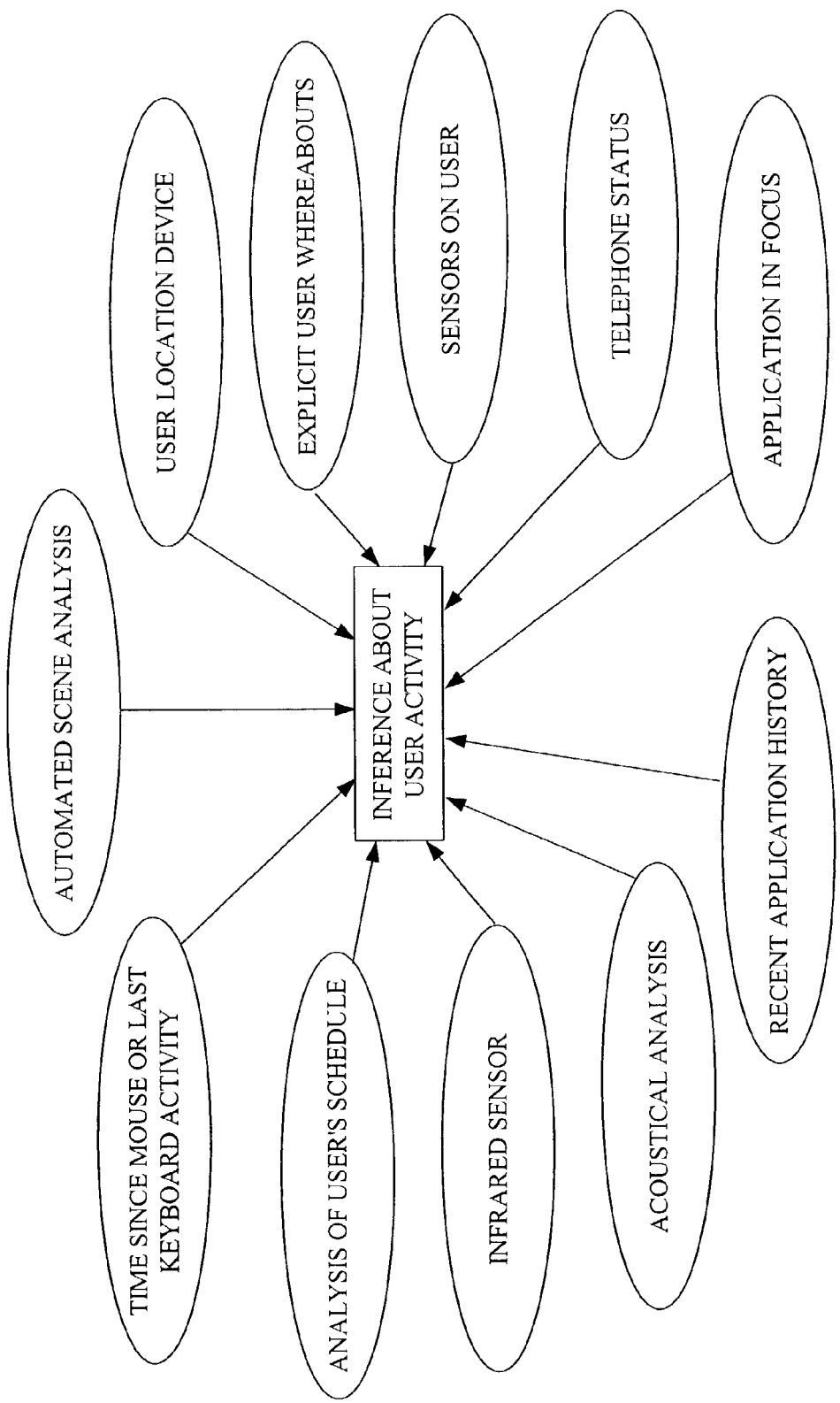
FIG. 24 is a diagram illustrating a model for determining user activity in accordance with an aspect of the present invention.
Figure 25:
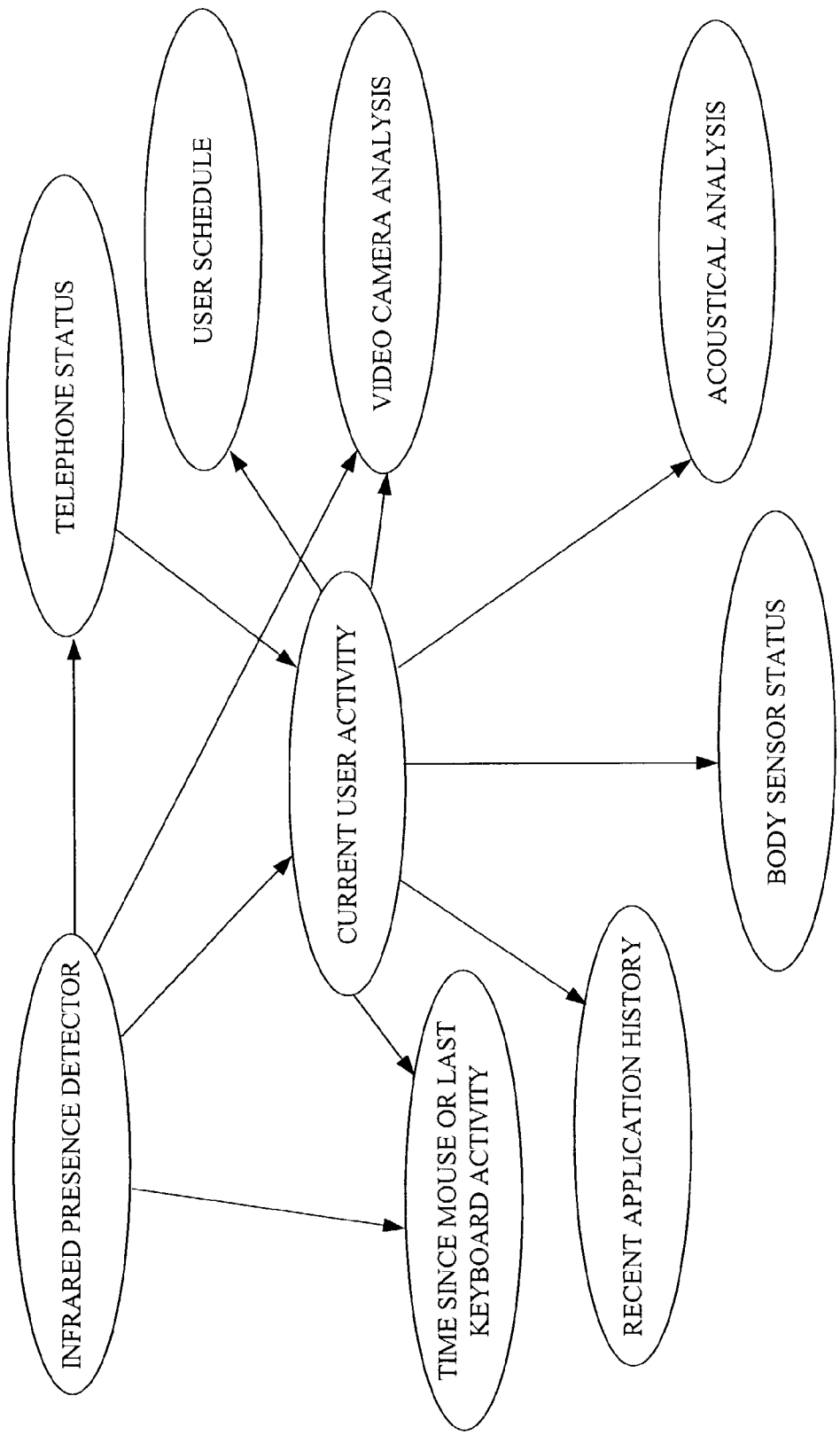
FIG. 25 is a diagram illustrating an inference-based model for determining current user activity in accordance with an aspect of the present invention.

It is also important to know how busy the user is in making decisions about interrupting the user with information about messages with high time criticality. It can be reasoned (e.g., inferential decision-making) about whether and the rate at which a user is working on a computer, or whether the user is on the telephone, speaking with someone, or at a meeting at another location. Several classes of evidence can be employed to assess a user's activity or his or her focus of attention, as illustrated in FIG. 24. A Bayesian network can then be utilized for performing an inference about a user's activity. An example of such a network is depicted in FIG. 25.

Figure 26:
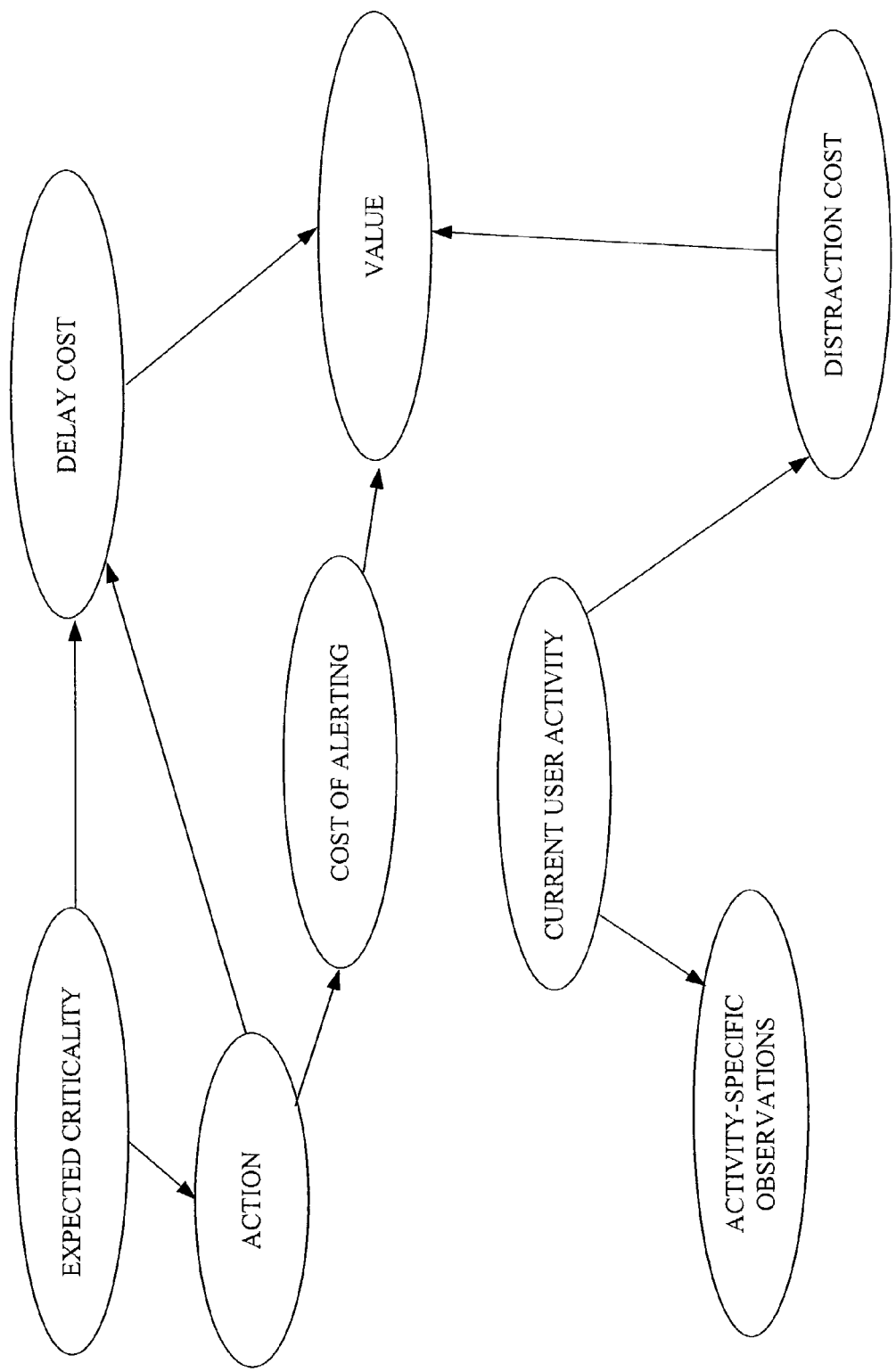
FIG. 26 is a diagram illustrating an inference-based model for determining alerting costs in accordance with an aspect of the present invention.
Figure 27:
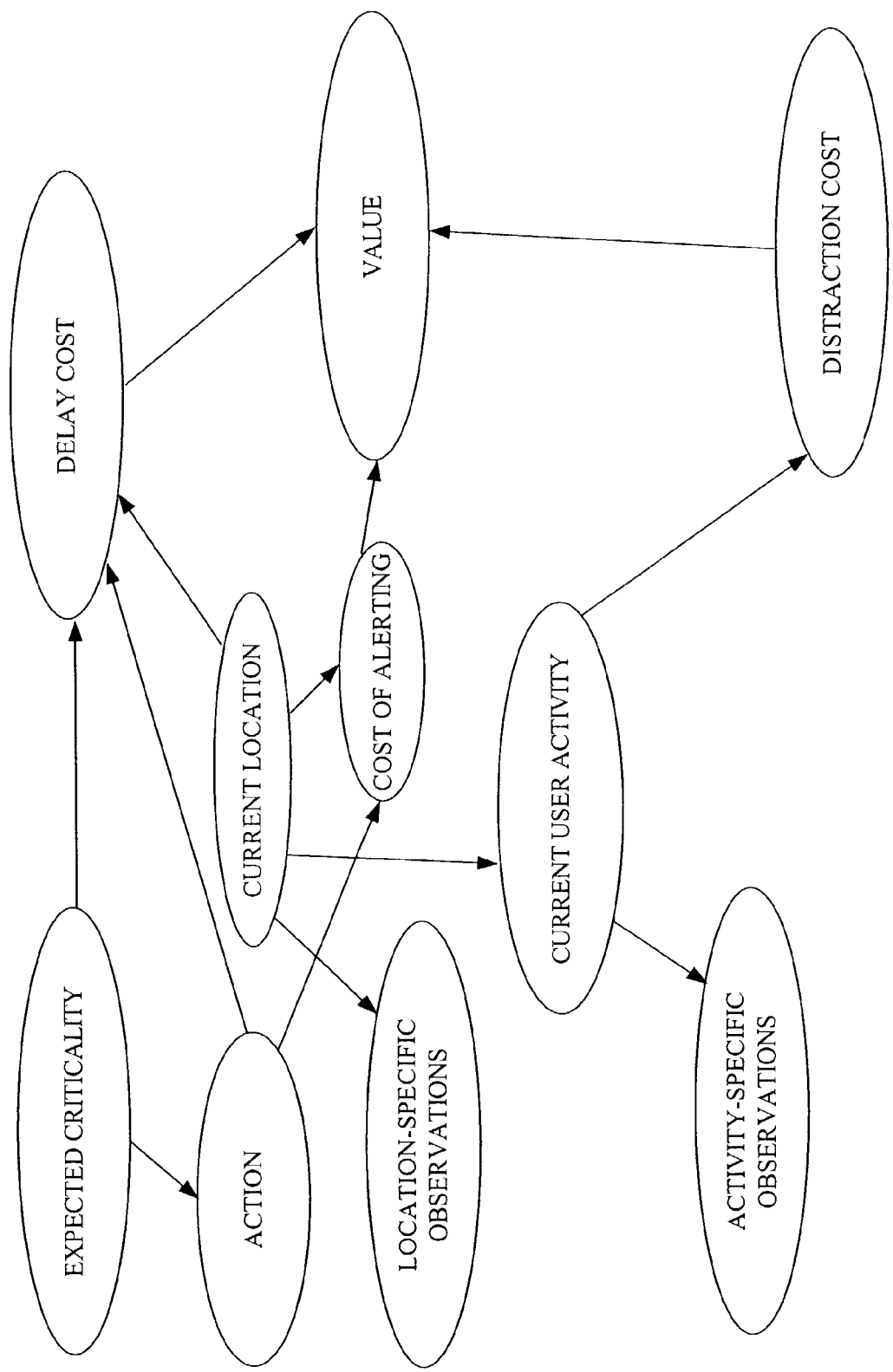
FIG. 27 is a diagram illustrating a more detailed inference-based model for determining alerting costs in accordance with an aspect of the present invention.
Figure 28:
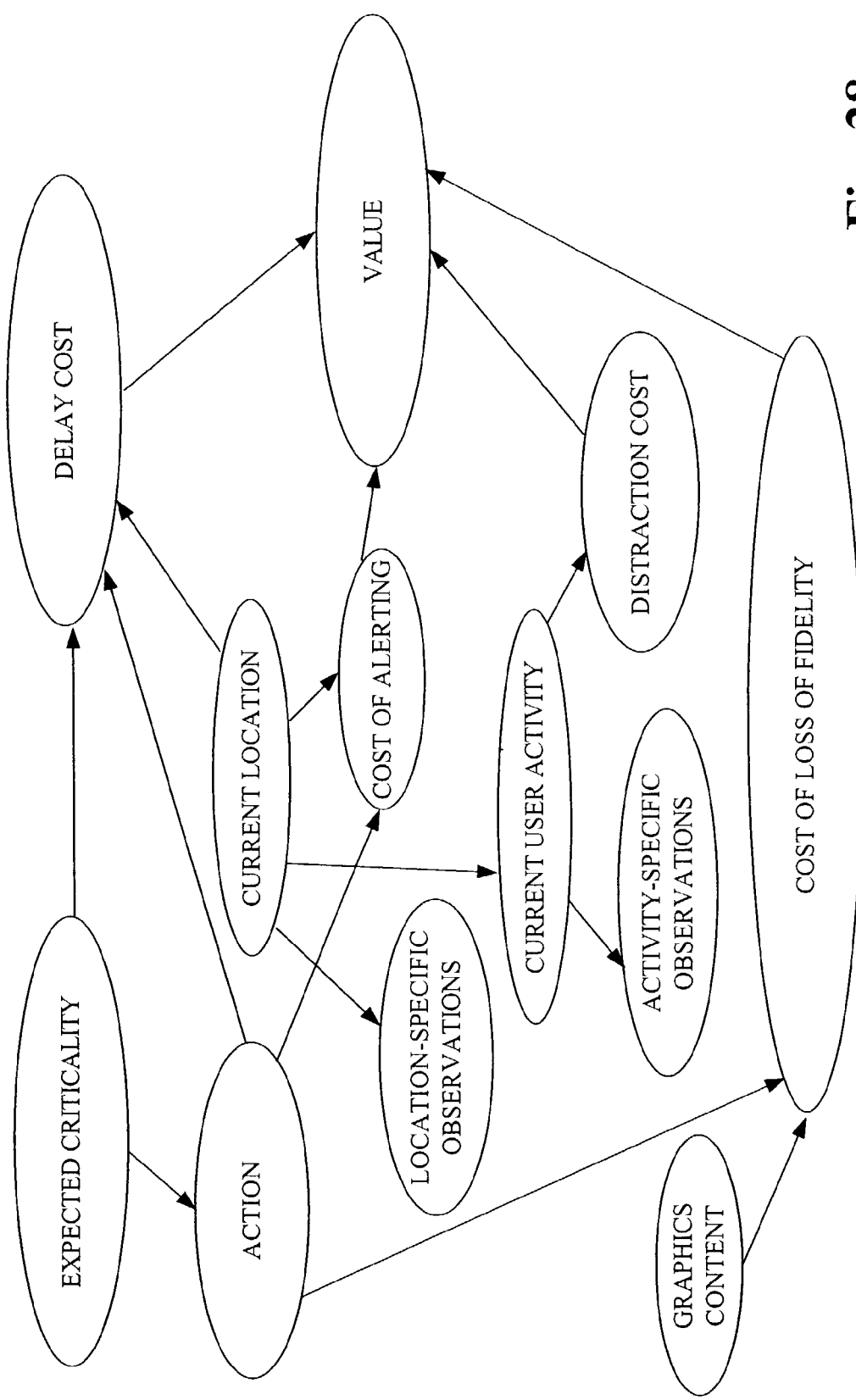
FIG. 28 is a diagram illustrating a more detailed inference-based model for determining alerting costs in view of a fidelity loss in accordance with an aspect of the present invention.

In general, a decision should be made as to when and how to alert users to messages and to provide services based on the inference of expected criticality and user activity. Decisions can be performed by utilizing decision-models, for example. FIGS. 26-28 are influence diagrams illustrating how such decision models can be utilized to make alerting decisions. FIG. 26 displays a decision model for decisions about interrupting a user, considering current activity, expected time criticality of messages, and cost of alerting depending on the communications modality. FIG. 27 also includes variables representing the current location and the influence of that variable on activity and cost of alternate messaging techniques. Furthermore, FIG. 28 is expanded to consider the costs associated with losses in fidelity when a message with significant graphics content is forwarded to a user without the graphical content being present.

Alternatively, decisions as to when and how to alert users can be made by employment of a set of user-specified thresholds and parameters defining policies on alerting. User presence can be inferred based on mouse or keyboard activity, for example. Thus, a user can be enabled to input thresholds on alerting for inferred states of activity and non-activity, for example. Users can also input an amount of idle activity following activity wherein alerting will occur at lower criticalities. If it is determined that the user is not available based on the time that substantially no computer activity is detected, then messages can be stored, and are reported to the user in order of criticality when the user returns to interact with the computer. Furthermore, users can specify routing and paging options as a function of quantities including expected criticality, maximum expected loss, and value of alerting the user.

A notification and/or alerting system may also estimate when the user is expected to return, such that it transmits priorities that are expected to be important before the user is expected to return. This can be achieved by learning user-present and user-away patterns over time. The user can then set suitable policies in terms of when he or she is expected to return to the system to review the priorities without being alerted to them. The expected time to return determination by the system may be automatically conveyed to senders of highly urgent messages, for example. In this manner, message senders receive feedback when the user is expected to return such that he or she can reply to the messages. The sender may also be informed that his or her message has been conveyed to the user's mobile device, and so forth.

Figure 29:
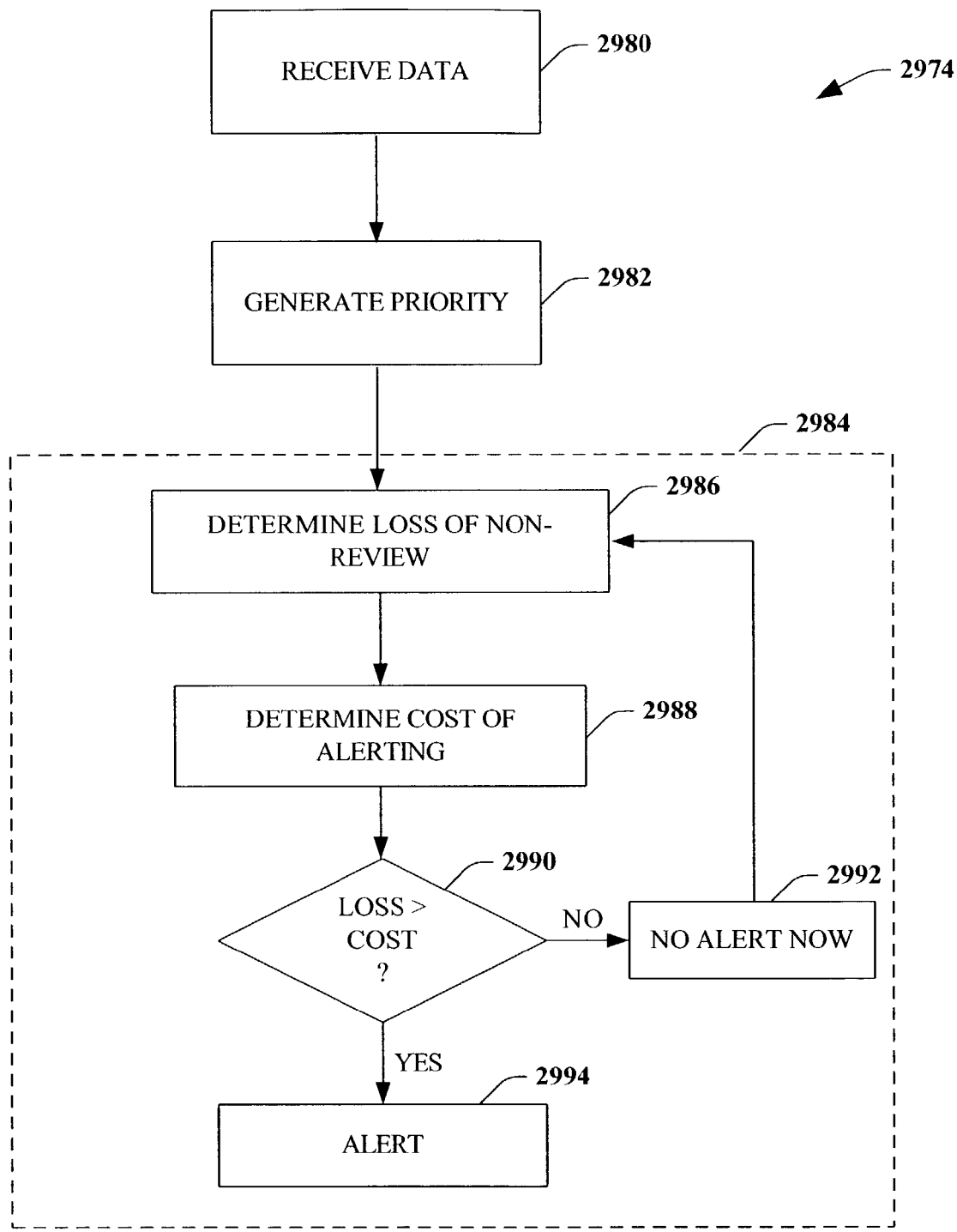
FIG. 29 is a flow chart diagram illustrating a methodology for generating and determining priorities in accordance with an aspect of the present invention.

FIG. 29 illustrates a methodology for generating priorities and performing alerting decisions based on the priorities in accordance the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 29, a flowchart diagram 2974 illustrates a methodology wherein priorities are generated and utilized in accordance with the present invention. At 2980, a data, such as text to have a priority thereof assigned is received. The data can be an e-mail message, or substantially any other type of data or text. At 2982, a priority for the data is generated, based on a classifier, as has been described. Additionally, 2982 can include initial and subsequent training of the classifier, as has been described.

The priority of the data is then output at 2984. As indicated in FIG. 29, this can include processing at 2986, 2988, 2990, 2992, and 2994. At 2986, an expected loss of non-review of the data at a current time t is determined. This determination considers the expected loss of now-review of the text at a future time, based on an assumption that the user will review the text him or herself, without being alerted, as has been described. At 2988, an expected cost of alerting is determined, as has also been described. If the loss is greater than the cost at 2990, then no alert is made at the time t 2992, and the process proceeds back to 2986, at a new current time t. Proceeding back to 2986 may be performed since as time progresses, the expected loss may at some point outweigh the alert cost, such that the calculus at 2990 can change. Upon the expected loss outweighing the alert cost, then an alert to the user or other system is performed at 2994.

The output of the alert to a user or other system is now described. A user can be alerted on an electronic device based on alert criteria, which indicates when the user should be alerted of a prioritized text. The electronic device on which the user is alerted can be a pager, cellular telephone, or other communications modality as described in more detail below. Alerts to a user on an electronic device, such as a pager or a cellular phone, can be based on alert criteria that can be adapted to be sensitive to information about the location, inferred task, and/or focus of attention of the user, for example. Such information can be inferred under uncertainty or can be accessed from online information sources. The information from an online calendar, for example, can be adapted to control criteria employed to make decisions about relaying information to a device, such as a notification sink which is described in more detail below.

Alerts can be performed by routing the prioritized text or other data based on routing criteria. Routing of the text can include forwarding the text, and/or replying to the sender of the text, in the case where the text is e-mail. For example, a sound can be played to alert the user to a prioritized document. Alternatively, an agent or automated assistant can be opened (e.g., interactive display wizard). That is, the agent can appear on a display screen, to notify the user of the prioritized document. Furthermore, the prioritized document can be opened, such as being displayed on the screen. The document can receive focus. This can also include sizing the document based on its priority, such that the higher the priority of the document, the larger the window in which it is displayed, and/or centrally locating the document on the display based on its priority.

Figure 30:
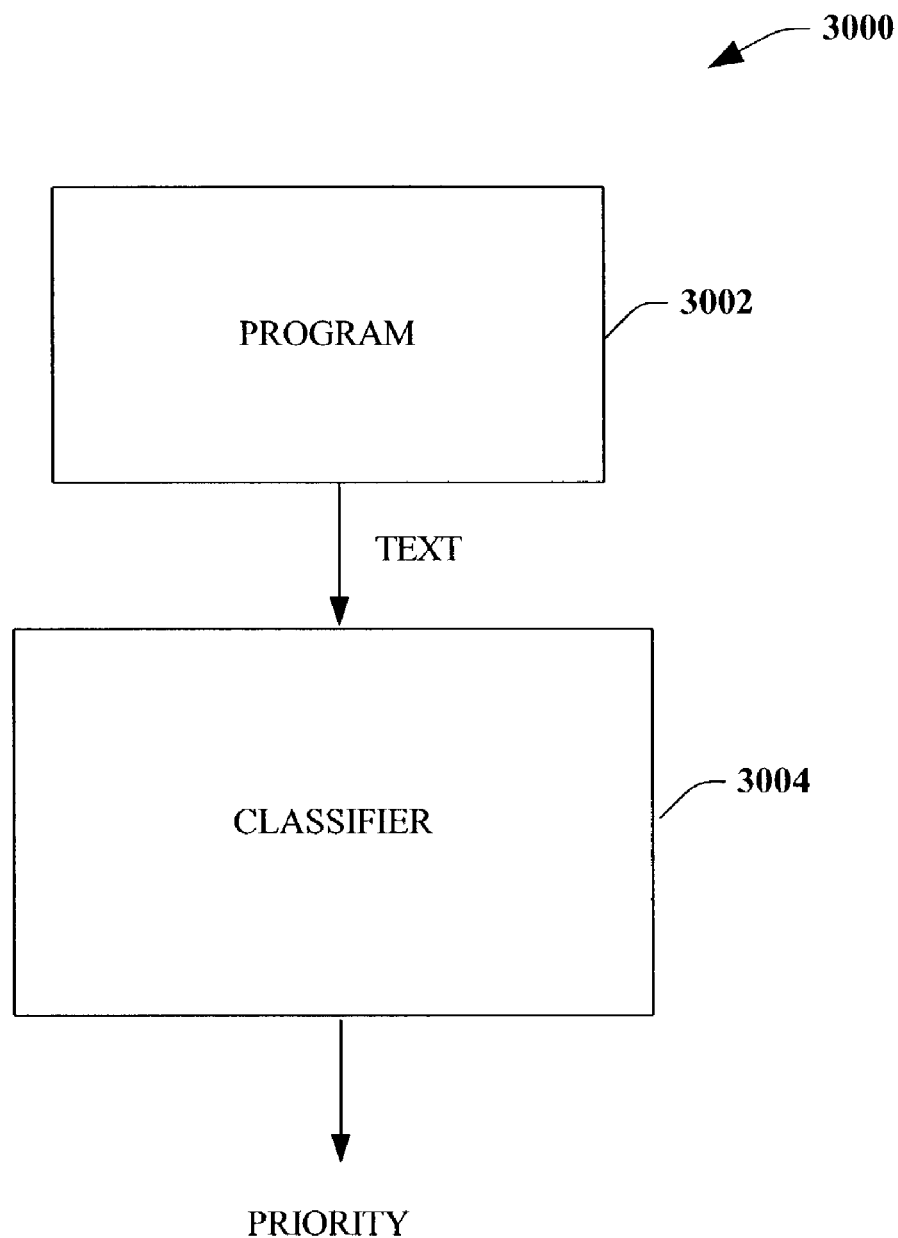
FIG. 30 is a diagram illustrating a text generation program and classifier in accordance with an aspect of the present invention.

Referring now to FIG. 30, a diagram of a text generation and priorities system 3000 in accordance with an aspect of the present invention. The system 3000 includes a program 3002 and a classifier 3004. It is noted that the program 3000 and the classifier 3002 can include a computer program executed by a processor of a computer from a computer-readable medium thereof.

The program 3002 generates a text for input into the classifier 3004. The program includes an electronic mail program that receives e-mail, which then serve as the text. The classifier 3004 generates a priority for the associated message. As described above, the classifier 3004 can be a Bayesian classifier, a Support Vector Machine classifier, or other type of classifier. The priority of the text output by the classifier 3004 can then be utilized in conjunction with a cost-benefit analysis, as has been described, to effectuate further output and/or alerting based thereon.

Figure 31:
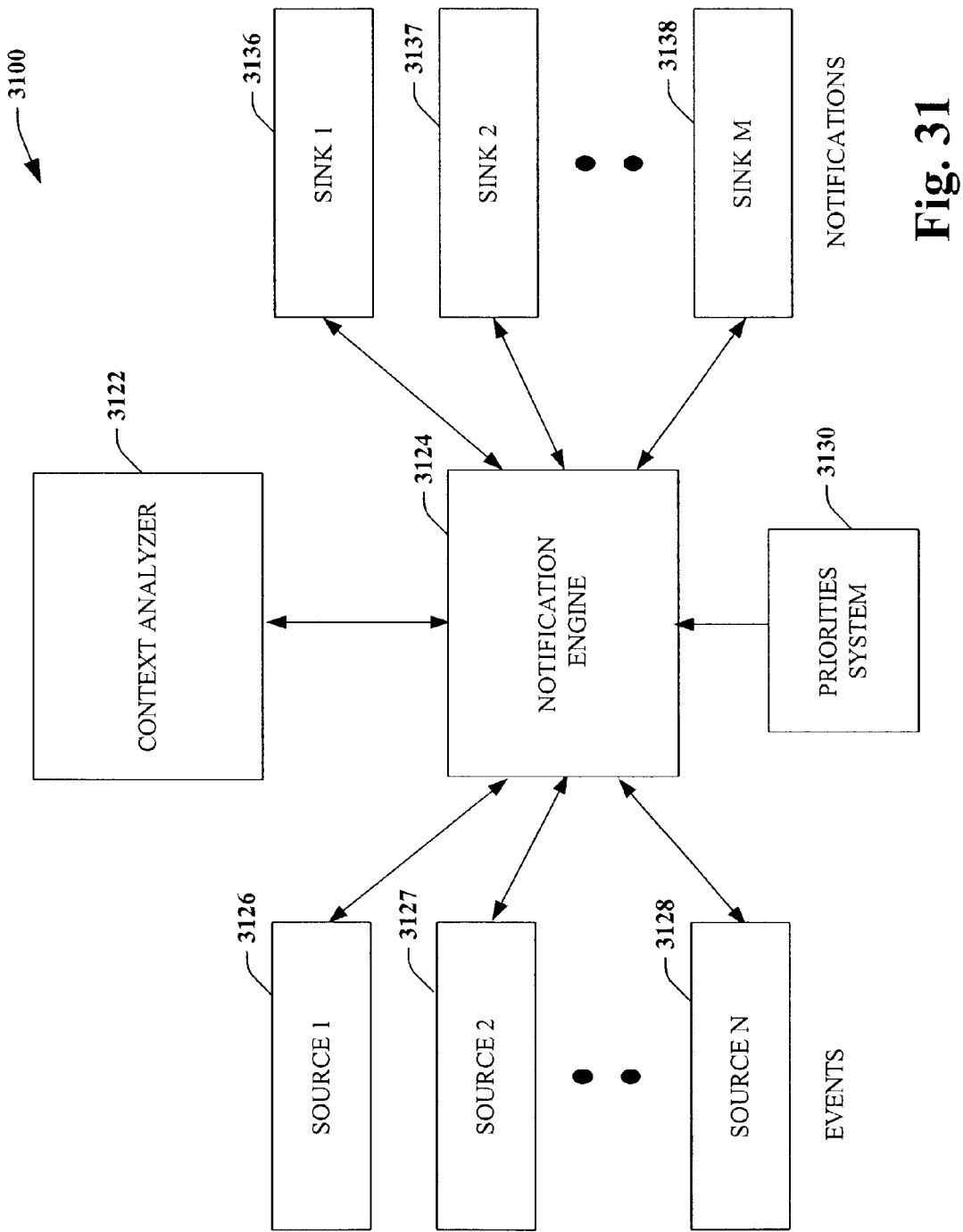
FIG. 31 is a schematic block diagram illustrating systematic cooperation between a notification engine and a context analyzer according to an aspect of the present invention.

Turning now to FIG. 31, a system 3100 illustrates how the notification engine and context analyzer function together according to an aspect of the present invention. The system 3100 includes a context analyzer 3122, a notification engine 3124, one or more notification sources 1 through N, 3126, 3127, 3128, a priorities system 3130, which can operate as a notification source, and one or more notification sinks, 1 through M, 3136, 3137, 3138, wherein N an M are integers, respectively. The sources are also referred to as event publishers, while the sinks are also referred to as event subscribers. There can be any number of sinks and sources. In general, the notification engine 3124 conveys notifications, which are also referred to as events or alerts, from the sources 3126–3128 to the sinks 3136–3138, based in part on parametric information stored in and/or accessed by the context analyzer 3122.

The context analyzer 3122 stores/analyzes information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have access to in different locations. Such parameters may also be functions of observations made autonomously via one or more sensors. For example, one or more profiles (not shown) may be selected or modified based on information about a user's location as can be provided by a global positioning system (GPS) subsystem, on information about the type of device being used and/or the pattern of usage of the device, and the last time a device of a particular type was accessed by the user. Furthermore, as is described in more detail below, automated inference may also be employed, to dynamically infer parameters or states such as location and attention. The profile parameters may be stored as a user profile that can be edited by the user. Beyond relying on sets of predefined profiles or dynamic inference, the notification architecture can enable users to specify in real-time his or her state, such as the user not being available except for important notifications for the next "x" hours, or until a given time, for example.

The parameters can also include default notification preference parameters regarding a user's preference as to being disturbed by notifications of different types in different settings, which can be used as the basis from which to make notification decisions by the notification engine 3124, and upon which a user can initiate changes. The parameters may include default parameters as to how the user wishes to be notified in different situations (e.g., such as by cell phone, by pager). The parameters can include such assessments as the costs of disruption associated with being notified by different modes in different settings. This can include contextual parameters indicating the likelihoods that the user is in different locations, the likelihoods that different devices are available, and the likelihoods of his or her attentional status at a given time, as well as notification parameters indicating how the user desires to be notified at a given time.

Information stored by the context analyzer 3122, according to one aspect of the present invention is inclusive of contextual information determined by the analyzer. The contextual information is determined by the analyzer 3122 by discerning the user's location and attentional status based on one or more contextual information sources (not shown), as is described in more detail in a later section of the description. The context analyzer 3122, for example, may be able to determine with precision the actual location of the user via a global positioning system (GPS) that is a part of a user's car or cell phone. The analyzer may also employ a statistical model to determine the likelihood that the user is in a given state of attention by considering background assessments and/or observations gathered through considering such information as the type of day, the time of day, the data in the user's calendar, and observations about the user's activity. The given state of attention can include whether the user is open to receiving notification, busy and not open to receiving notification, and can include other considerations such as weekdays, weekends, holidays, and/or other occasions/periods.

The sources 3126–3128, 3130 generate notifications intended for the user and/or other entity. For example, the sources 3126–3128 may include communications, such as Internet and network-based communications, and telephony communications, as well as software services. Notification sources are defined generally herein as that which generates events, which can also be referred to as notifications and alerts, intended to alert a user, or a proxy for the user, about information, services, and/or a system or world event. A notification source can also be referred to as an event source.

For example, e-mail may be generated as notifications by the priorities system 3130 such that it is prioritized, wherein an application program or system generating the notification assigns the e-mail with a relative priority corresponding to the likely importance or urgency of the e-mail to the user. The e-mail may also be sent without regard to the relative importance to the user. Internet-related services can include notifications including information that the user has subscribed to, such as headlines of current news every so often, and stock quotes, for example.

Notification sources 3126–3128 can themselves be push-type or pull-type sources. Push-type sources are those that automatically generate and send information without a corresponding request, such as headline news and other Internet-related services that send information automatically after being subscribed to. Pull-type sources are those that send information in response to a request, such as e-mail being received after a mail server is polled. Still other notification sources include the following:

e-mail desktop applications such as calendar systems;
computer systems (e.g., that may alert the user with messages that information about alerts about system activity or problems);
Internet-related services, appointment information, scheduling queries;
changes in documents or numbers of certain kinds of documents in one or more shared folders;
availability of new documents in response to standing or persistent queries for information; and/or,
information sources for information about people and their presence, their change in location, their proximity (e.g., let me know when I am traveling if another coworker or friend is within 10 miles of me"), or their availability (e.g., let me know when Steve is available for a conversation and is near a high-speed link that can support full video teleconferencing").

The notification sinks 3136–3138 are able to provide notifications to the user. For example, such notification sinks 3136–3138 can include computers, such as desktop and/or laptop computers, handheld computers, cell phones, landline phones, pagers, automotive-based computers, as well as other systems/applications as can be appreciated. It is noted that some of the sinks 3136–3138 can convey notifications more richly than other of the sinks. For example, a desktop computer typically has speakers and a relatively large color display coupled thereto, as well as having a higher bandwidth for receiving information when coupled to a local network or to the Internet. Thus, notifications can be conveyed by the desktop computer to the user in a relatively rich manner. Conversely, many cell phones have a smaller display that can be black and white, and receive information at a relatively lower bandwidth, for example. Correspondingly, the information associated with notifications conveyed by cell phones may generally be shorter and geared towards the phone's interface capabilities, for example. Thus, the content of a notification may differ depending on whether it is to be sent to a cell phone or a desktop computer. According to one aspect of the present invention, a notification sink can refer to that which subscribes, via an event subscription service, for example, to events or notifications.

The notification engine 3124 accesses the information stored and/or determined by the context analyzer, and determines which of the notifications received from the sources 3126–3128 to convey to which of the sinks 3136–3138. Furthermore, the notification engine 3124 can determine how the notification is to be conveyed, depending on which of the sinks 3136–3138 has been selected to send the information to. For example, it may be determined that notifications should be summarized before being provided to a selected sinks 3136–3138.

The invention is not limited to how the engine 3124 makes its decisions as to which of the notifications to convey to which of the notification sinks, and in what manner the notifications are conveyed. In accordance with one aspect, a decision-theoretic analysis can be utilized. For example, the notification engine 3124 can be adapted to infer important uncertainties about variables including a user's location, attention, device availability, and amount of time until the user will access the information if there were no alert. The notification engine 3124 can then make notification decisions about whether to alert a user to a notification, and if so, the nature of the summarization and the suitable device or devices to employ for relaying the notification. In general, the notification engine 3124 determines the net expected value of a notification. In doing so, it can consider the following:

the fidelity and transmission reliability of each available notification sink;
the attentional cost of disturbing the user;
the novelty of the information to the user;
the time until the user will review the information on his or her own;
the potentially context-sensitive value of the information; and/or,
the increasing and/or decreasing value over time of the information contained within the notification.

Inferences made about uncertainties thus may be generated as expected likelihoods of values such as the cost of disruption to the user with the use of a particular mode of a particular device given some attentional state of the user, for example. The notification engine 3124 can make decisions as to one or more of the following:
what the user is currently attending to and doing (based on, for example, contextual information);
where the user currently is;
how important the information is;
what is the cost of deferring the notification;
how distracting would a notification be;
what is the likelihood of getting through to the user; and,
what is the fidelity loss associated with the use of a specific mode of a given notification sink.

Therefore, the notification engine 3124 can perform an analysis, such as a decision-theoretic analysis, of pending and active notifications, evaluates context-dependent variables provided by information sinks and sources, and infers selected uncertainties, such as the time until a user is likely to review information and the user's location and current attentional state.

Furthermore, the notification engine 3124 can access information stored in a user profile by the context analyzer 3122 in lieu of or to support a personalized decision-theoretic analysis. For example, the user profile may indicate that at a given time, the user prefers to be notified via a pager, and only if the notification has a predetermined importance level. Such information can be utilized as a baseline from which to start a decision-theoretic analysis, or can be the manner by which the notification engine 3124 determines how and whether to notify the user.

According to one aspect of the present invention, the notification platform architecture 3100 can be configured as a layer that resides over an eventing or messaging infrastructure. However, the invention is not limited to any particular eventing infrastructure. Such eventing and messaging systems and protocols can include:
HyperText Transport Protocol (HTTP), or HTTP extensions as known within the art;
Simple Object Access Protocol (SOAP), as known within the art;
Windows Management Instrumentation (WMI), as known within the art;
Jini, as known within the art; and,
substantially any type of communications protocols, such as those based on packet-switching protocols, for example.

Furthermore, the architecture can be configured as a layer that resides over a flexible distributed computational infrastructure, as can be appreciated by those of ordinary skill within the art. Thus, the notification platform architecture can utilize an underlying infrastructure as a manner by which sources send notifications, alerts and events, and as a manner by which sinks receive notifications, alerts and events, for example. The present invention is not so limited, however.

Figure 32:
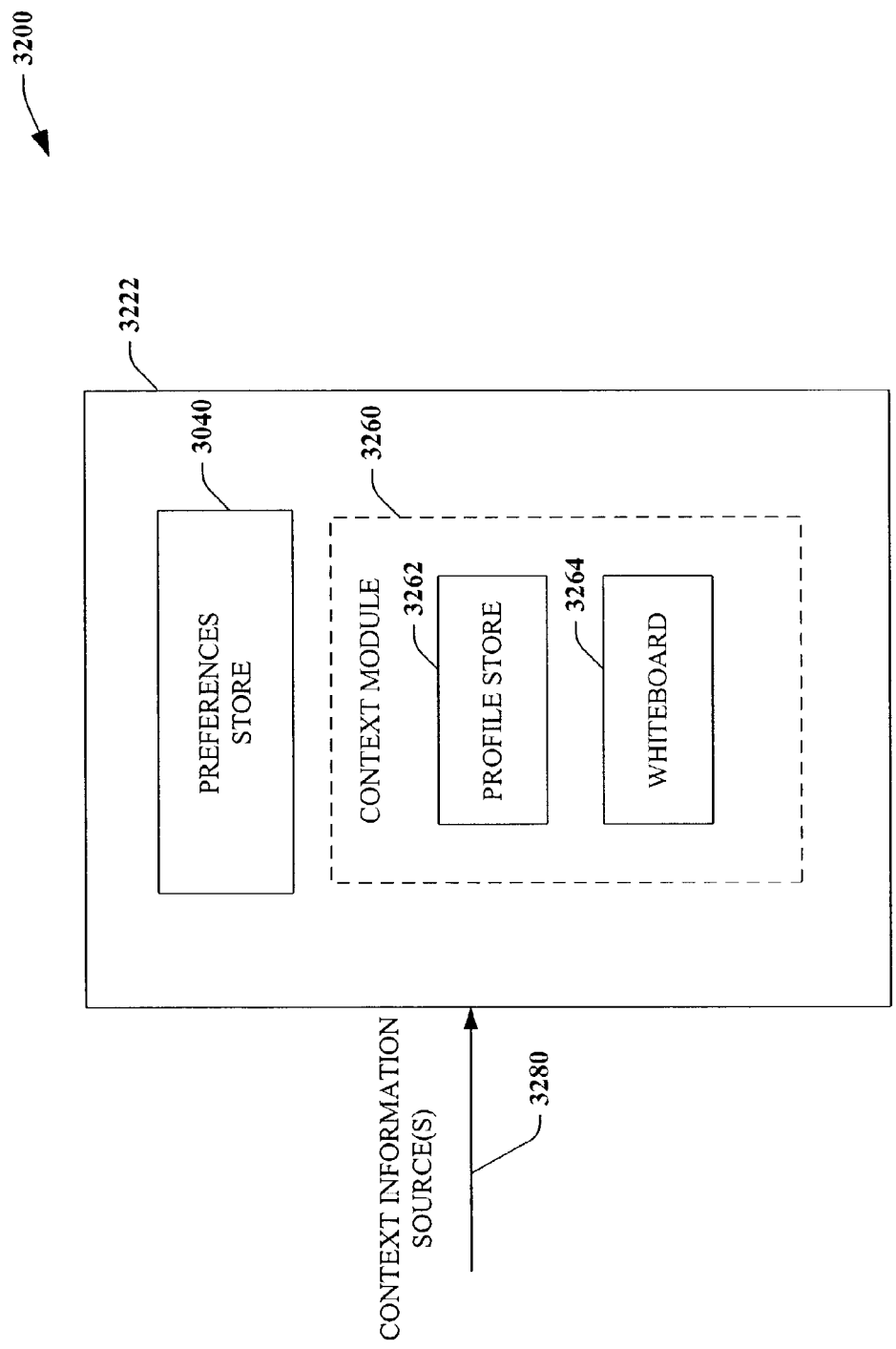
FIG. 32 is a block diagram illustrating a context analyzer in accordance with one aspect of the present invention.

Referring now to FIG. 32, the context analyzer 3122 of the notification architecture described in the previous section of the description is depicted in more detail here in system 3200. The context analyzer 3222 as illustrated in FIG. 32 includes a user notification preferences store 3240, a user context module 3260 that includes a user context profile store 3262, and a whiteboard 3264. The context analyzer 3222 according to one aspect of the invention can be implemented as one or more computer programs executable by a processor of a computer from a machine-readable medium thereof, such as a memory.

The preferences store 3262 stores notification parameters for a user, such as default notification preferences for the user, such as a user profile, which can be edited and modified by the user. The preferences store 3262 can be considered as that which stores information on parameters that influence how a user is to be notified. The user context module 3260 determines a user's current context, based on one or more context information sources 3280 as published to the whiteboard 3264, for example. The user context profile store 3262 stores context parameters for a user, such as the default context settings for the user, which can be edited and modified by the user. That is, the user context module 3260 provides a best guess or estimate about a user's current context information by accessing information from the profile store 3262 and/or updating a prior set of beliefs in the store 3262 with live sensing, via the one or more context sources 3280. The profile store 3262 can be considered as that which stores a priori where a user is, and what the user is doing, for example.

The user context profile store 3262 can be a pre-assessed and/or predefined user profile that captures such information as a deterministic or probabilistic profile. The profile can be of typical locations, activities, device availabilities, and costs and values of different classes of notification as a function of such observations as time of day, type of day, and user interactions with one or more devices. The type of day can include weekdays, weekends and holidays, for example. The user context module 3260 can then actively determine or infer aspects of the user's context or state, such as the user's current or future location and attentional state. Furthermore, actual states of context can be accessed directly from the context information sources 3280 via the whiteboard 3264, and/or, can be inferred from a variety of such observations through inferential methods such as Bayesian reasoning as is described in more detail below.

The context information sources 3280 may provide information to the context module 3260 via the whiteboard 3264 regarding the user's attentional state and location, from which the module 3260 can make a determination as to the user's current context (e.g., the user's current attentional state and location). Furthermore, the invention is not limited to a particular number or type of context sources 3280, nor the type of information inferred or accessed by the user context module 3260. However, the context sources 3280 can include multiple desktop information and events, such as mouse information, keyboard information, application information (e.g., which application is currently receiving the focus of the user), ambient sound and utterance information, text information in the windows on the desktop, for example. The whiteboard 3264 can include a common storage area, to which the context information sources 3280 can publish information, and from which multiple components, including sources and the context module 3260 can access this information. An event, also referred to as a notification or alert, generally can include information about an observation about one or more states of the world. Such states can include the status of system components, the activity of a user, and/or a measurement about the environment. Furthermore, events can be generated by an active polling of a measuring device and/or source of events, by the receipt of information that is sent on a change, and/or per a constant or varying event heartbeat.

Other types of context sources 3280 includes personal-information manager (PIM) information of the user, which generally can provide scheduling information regarding the schedule of the user, for example. The current time of day, as well as the user's location—for example, determined by a global positioning system (GPS), and/or a user's access of a cell phone, PDA, or a laptop that can be locationally determined—are also types of context sources 3280. Furthermore, real-time mobile device usage is a type of context source 3280. For example, a mobile device such as a cell phone may be able to determine if it is currently being accessed by the user, as well as device orientation and tilt (e.g., indicating information regarding device usage as well), and acceleration and speed (e.g., indicating information as to whether the user is moving or not).

Figure 33:
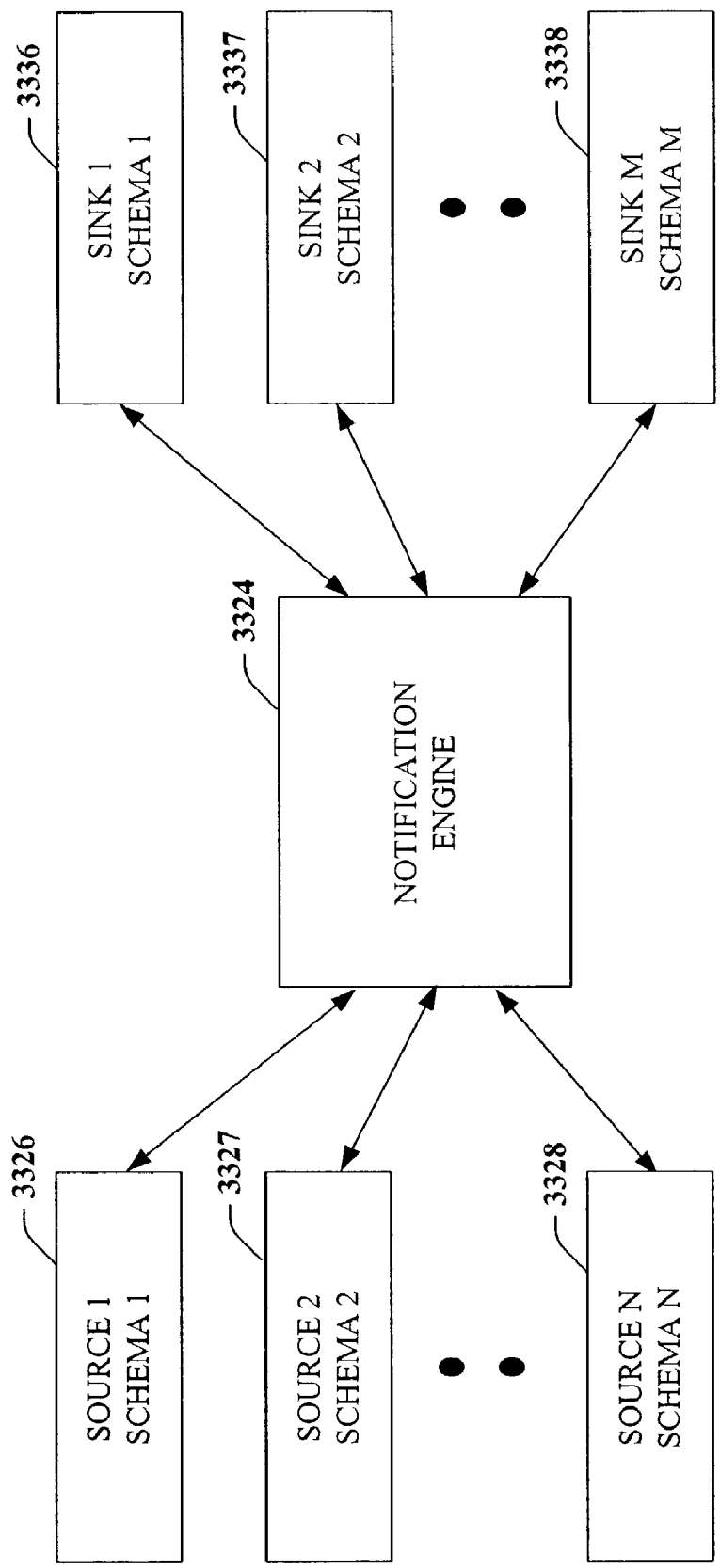
FIG. 33 is a block diagram illustrating notification sources in accordance with an aspect of the present invention.

Referring now to FIG. 33, the notification sources described above are illustrated in more detail. The notification sources 3326–3328, generally generate notifications that are conveyed to the notification engine 3324, which determines when notifications should occur, and, if so, which of the notifications should be conveyed to which of the notification sinks 3336–3338 and in what order.

According to one aspect of the present invention, notification sources 3326–3328 can have one or more of the following parameters within a standard description of attributes and relationships, referred to herein as a notification source schema or source schema. It is noted that schema can be provided for sources, for sinks, and for context-information sources, described above. Such schemas provide declarative information about different components and can enable the sources 3326–3328, the notification engine 3324, the sinks 3336–3338, and the context analyzer 3322 to share semantic information with one another. Thus, different schemas provide information about the nature, urgency, and device signaling modalities associated with notification. That is, schema can be defined generally as a collection of classes and relationships among classes that defines the structure of notifications and events, containing information including event or notification class, source, target, event or notification semantics, ontological content information, observational reliability, and substantially any quality-of-service attributes, for example.

Parameters (not shown) for notification source schema can include one or more of: message class; relevance; importance; time criticality; novelty; content attributes; fidelity tradeoffs, and/or source information summary information. The message class for a notification generated by a notification source indicates the type of communication of the notification, such as e-mail, instant message, numerical financial update, and desktop service, for example. The relevance for a notification generated by notification sources indicates a likelihood that the information contained within the notification is relevant, for one or more specified contexts. For example, the relevance can be provided by a logical flag, indicating whether the source is relevant for a given context or not. The novelty of the notification indicates the likelihood that the user already knows the information contained within the notification. That is, the novelty is whether the information is new to the user, over time (indicating if the user knows the information now, and when, if ever, the user will learn the information in the future without being alerted to it).

Fidelity tradeoffs associated with the notification indicate the loss of value of the information within the notification that can result from different forms of specified allowed truncation and/or summarization, for example. Such truncation and/or summarization may be required for the notification to be conveyed to certain types of notification sinks 3336–3338 that may have bandwidth and/or other limitations preventing the sinks from receiving the full notification as originally generated. Fidelity in general refers to the nature and/or degree of completeness of the original content associated with a notification. For example, a long e-mail message may be truncated, or otherwise summarized to a maximum of 100 characters allowed by a cell phone, incurring a loss of fidelity. Likewise, an original message containing text and graphics content suffers a loss in fidelity when transmitted via a device that only has text capabilities. In addition, a device may only be able to depict a portion of the full resolution available from the source. Fidelity tradeoffs refer to a set of fidelity preferences of a source stated either in terms of orderings (e.g., rendering importance in order of graphics first, then sound) and/or costs functions that indicate how the total value of the content of the notification diminishes with changes in fidelity. For example, a fidelity tradeoff can describe how the full value associated with the transmission of a complete e-mail message changes with increasingly greater amounts of truncation. Content attributes, for example, can include a summary of the nature of the content, representing such information as whether the core message includes text, graphics, and audio components. The content itself is the actual graphics, text, and/or audio that make up the message content of the notification.

Figure 34:
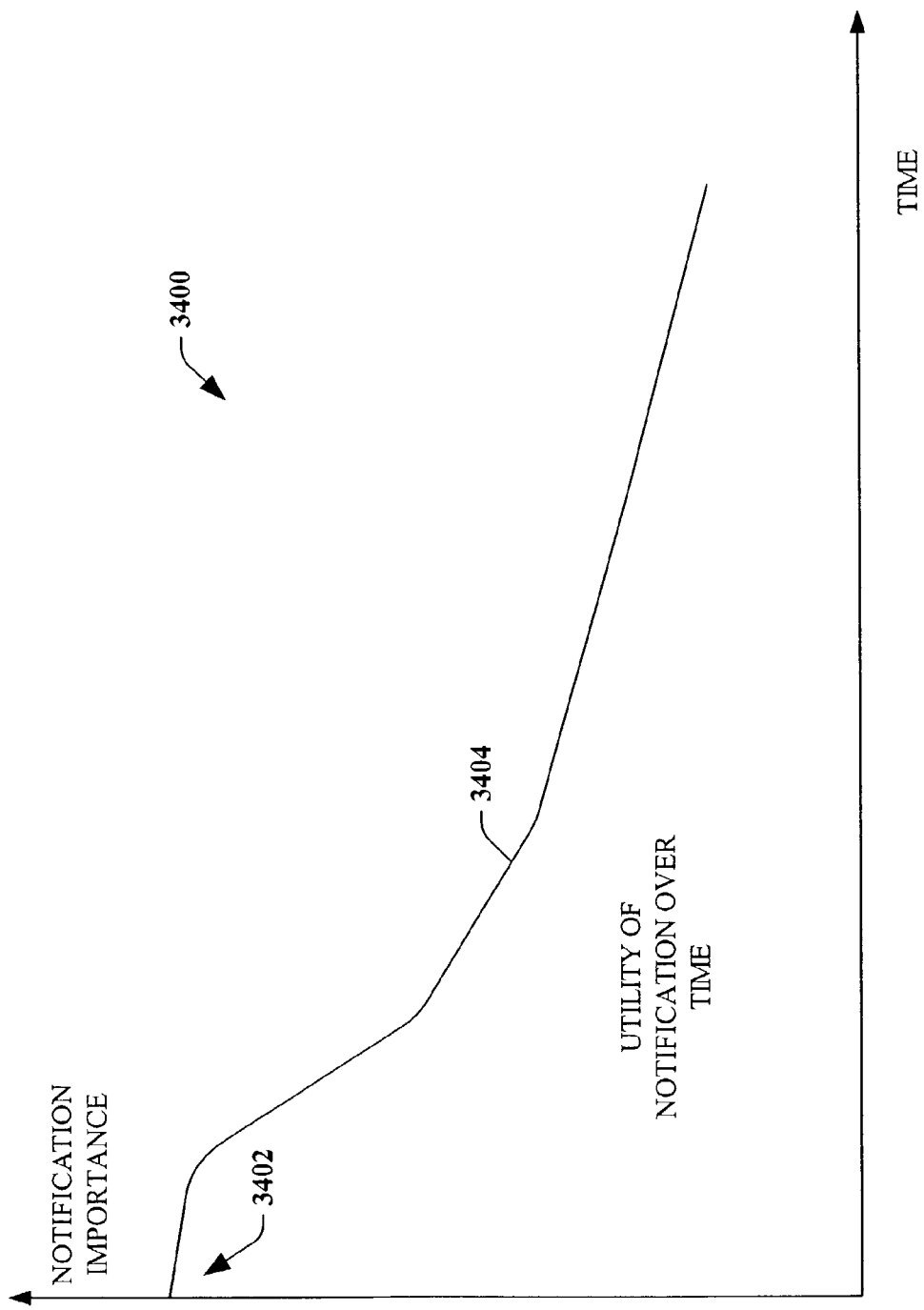
FIG. 34 is a graph depicting the utility of a notification mapped over time.

The importance of a notification refers to the value of the information contained in the notification to the user, assuming the information is relevant in a current context. For example, the importance can be expressed as a dollar value of the information's worth to the user. Time criticality indicates time-dependent change in the value of information contained in a notification—that is, how the value of the information changes over time. In most but not all cases, the value of the information of a notification decays with time. This is illustrated in the diagram of FIG. 34. A graph 3400 depicts the utility of a notification mapped over time. At the point 3402 within the graph, representing the initial time, the importance of the notification is indicated, while the curve 3404 indicates the decay of the utility over time.

Referring back to FIG. 33, default attributes and schema templates for different notification sources or source types may be made available in notification source profiles stored in the user notification preferences store, such as the store 3240 of FIG. 32. Such default templates can be directed to override values provided by notification sources or to provide attributes when they are missing from schema provided by the sources. Source summary information enables a source to post general summaries of the status of information and potential notifications available from a source. For example, source summary information from a messaging source may include information about the total number of unread messages that are at least some priority, the status of attempts by people to communicate with a user, and/or other summary information.

The notification sinks 3336–3338 can be substantially any device or application by which the user or other entity can be notified of information contained in notifications. The choice as to which sink or sinks are to be employed to convey a particular notification is determined by the notification engine 3324.

Notification sinks 3336–3338 may have one or more of the following parameters provided within a schema. These parameters may include a device class; modes of signaling (alerting); and, for the associated mode, fidelity/rendering capabilities, transmission reliability, actual cost of communication, and/or attentional cost of disruption, for example. For devices that are adapted for parameterized control of alerting attributes, the schema for the devices can additionally include a description of the alerting attributes and parameters for controlling the attributes, and functions by which other attributes (e.g., transmission reliability, cost of distribution) change with the different settings of the alerting attributes. The schema for notification sinks provides for the manner by which the notification devices communicate semantic information about their nature and capabilities with the notification engine 3324 and/or other components of the system. Default attributes and schema templates for different device types can be made available in device profiles stored in the user notification preferences store, such as the store 3240 of FIG. 32 as described in the previous section. Such default templates can be directed to override values provided by devices or to provide attributes when they are missing from schema provided by such devices.

Each of the schema parameters is now described in term. The class of the device refers to the type of the device such as a cell phone, a desktop computer, and a laptop computer, for example. The class can also be more general, such as a mobile or a stationery device. The modes of signaling refer to the manner in which a given device can alert the user about a notification. Devices may have one or more notification modes. For example, a cell phone may only vibrate, may only ring with some volume, and/or it can both vibrate and ring. Furthermore, a desktop display for an alerting system can be decomposed into several discrete modes (e.g., a small notification window in the upper right hand of the display vs. a small thumbnail at the top of the screen—with or without an audio herald). Beyond being limited to a set of predefined behaviors, a device can enable modes with alerting attributes that are functions of parameters, as part of a device definition. Such continuous alerting parameters for a mode represent such controls as the volume at which an alert is played at the desktop, rings on a cell phone, and the size of an alerting window, for example.

The transmission reliability for a mode of a notification sink 3336–3338 indicates the likelihood that the user will receive the communicated alert about a notification, which is conveyed to the user via the sink with that mode. As transmission reliability may be dependent on the device availability and context of the user, the transmission reliability of different modes of a device can be conditioned on such contextual attributes as the location and attention of a user. Transmission reliability for one or more unique contextual states, defined by the cross product of such attributes as unique locations and unique attentional states, defined as disjunctions created as abstractions of such attributes (e.g., for any location away from the home, and any time period after 8 am and before noon), can also be specified. For example, depending on where the user currently is, information transmitted to a cell phone may not always reach the user, particularly if the user is in a region with intermittent coverage, or where the user would not tend to have a cell phone in this location (e.g., family holiday). Contexts can also influence transmission reliability because of ambient noise and/or other masking or distracting properties of the context.

The actual cost of communication indicates the actual cost of communicating the information to the user when contained within a notification that is conveyed to the sink. For example, this cost can include the fees associated with a cell phone transmission. The cost of disruption includes the attentional costs associated with the disruption associated with the alert employed by the particular mode of a device, in a particular context. Attentional costs are typically sensitive to the specific focus of attention of the user. The fidelity/rendering capability is a description of the text, graphics, and audio/tactile capabilities of a device, also given a mode. For example, a cell phone's text limit may be 100 characters for any single message, and the phone may have no graphics capabilities.

Figure 35:
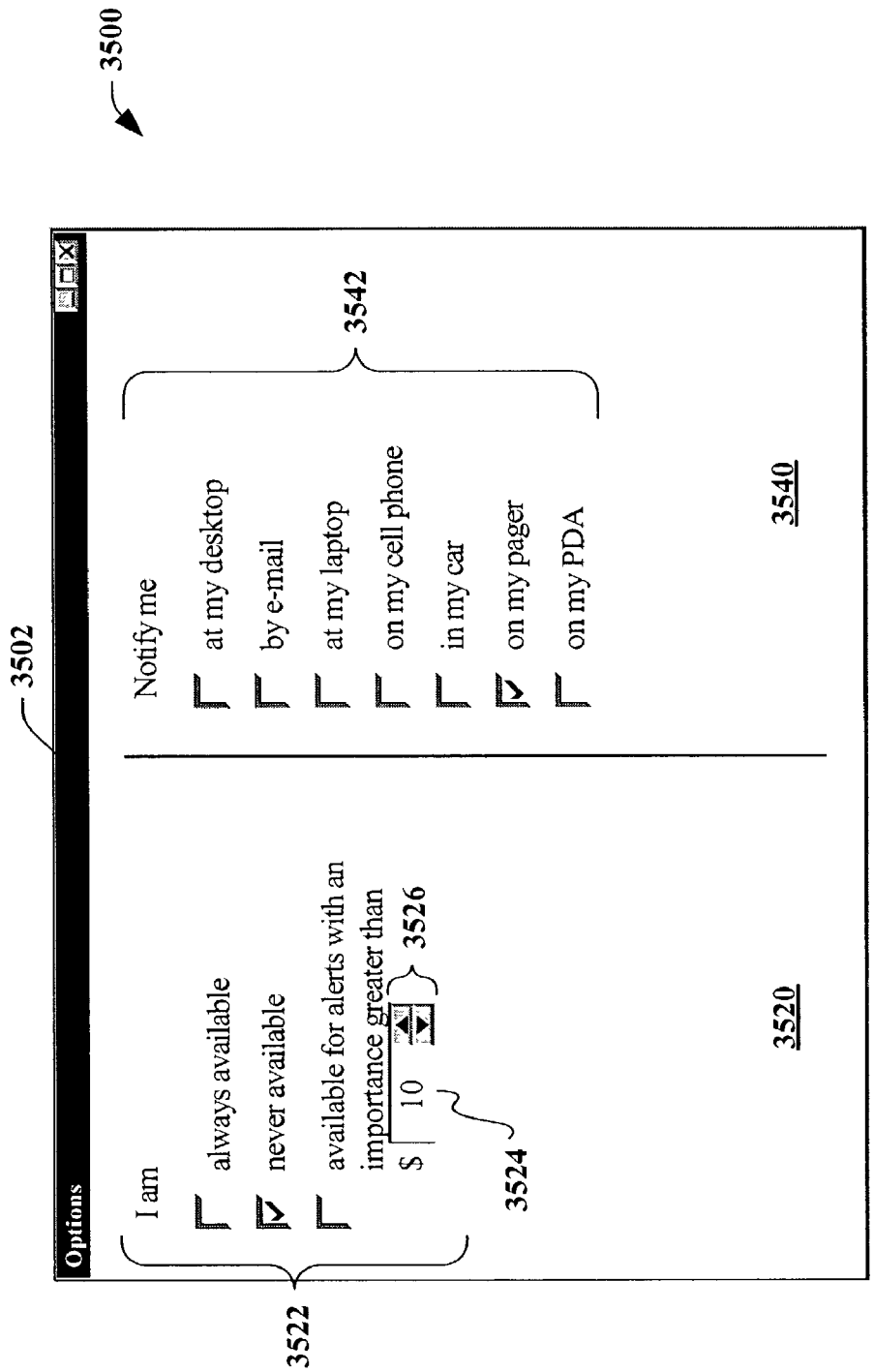
FIG. 35 is an illustration of an exemplary interface in accordance with an aspect of the present invention.

Turning now to FIG. 35, an exemplary interface 3500 illustrates context specifications selectable by a user that can be utilized by the context analyzer 312 (FIG. 3) in determining a user's current context. The determination of user context by direct specification by the user, and/or a user-modifiable profile, is described. The context of the user can include the attentional focus of the user—that is, whether the user is currently amenable to receiving notification alerts—as well as the user's current location. The present invention is not so limited, however.

Direct specification of context by the user enables the user to indicate whether or not he or she is available to receive alerts, and where the user desires to receive them. A default profile (not shown) can be employed to indicate a default attentional state, and a default location wherein the user can receive the alerts. The default profile can be modified by the user as desired.

Referring to FIG. 35, the interface 3500 illustrates how direct specification of context can be implemented, according to an aspect of the present invention. A window 3502, for example, has an attentional focus section 3520 and a location section 3540. In the focus section 3520, the user can check one or more check boxes 3522, for example, indicating whether the user is always available to receive alerts; whether the user is never available to receive alerts; and, whether the user is only available to receive alerts that has an importance level greater than a predetermined threshold. It is to be appreciated that other availability selections can be provided. As depicted in FIG. 35, a threshold can be measured in dollars, but this is for exemplary purposes only, and the invention is not so limited. The user can increase the threshold in the box 3524 by directly entering a new value, or by increasing or decreasing the threshold via arrows 3526.

In the location section 3540, the user can check one or more of the check boxes 3542, to indicate where the user desires to have alerts conveyed. For example, the user can have alerts conveyed at the desktop, by e-mail, at a laptop, on a cell phone, in his or her car, on a pager, or on a personal digital assistant (PDA) device, and so forth. It is to be appreciated that these are examples only, however, and the invention itself is not so limited.

The window 3502, wherein there can be preset defaults for the checkboxes 3522 and the box 3524 of the section 3520 and the checkboxes 3542 of the section 3540, can be considered a default user profile. The profile is user modifiable in that the user can override the default selections with his or her own desired selections. Other types of profiles can also be utilized in accordance with the invention.

Figure 36:
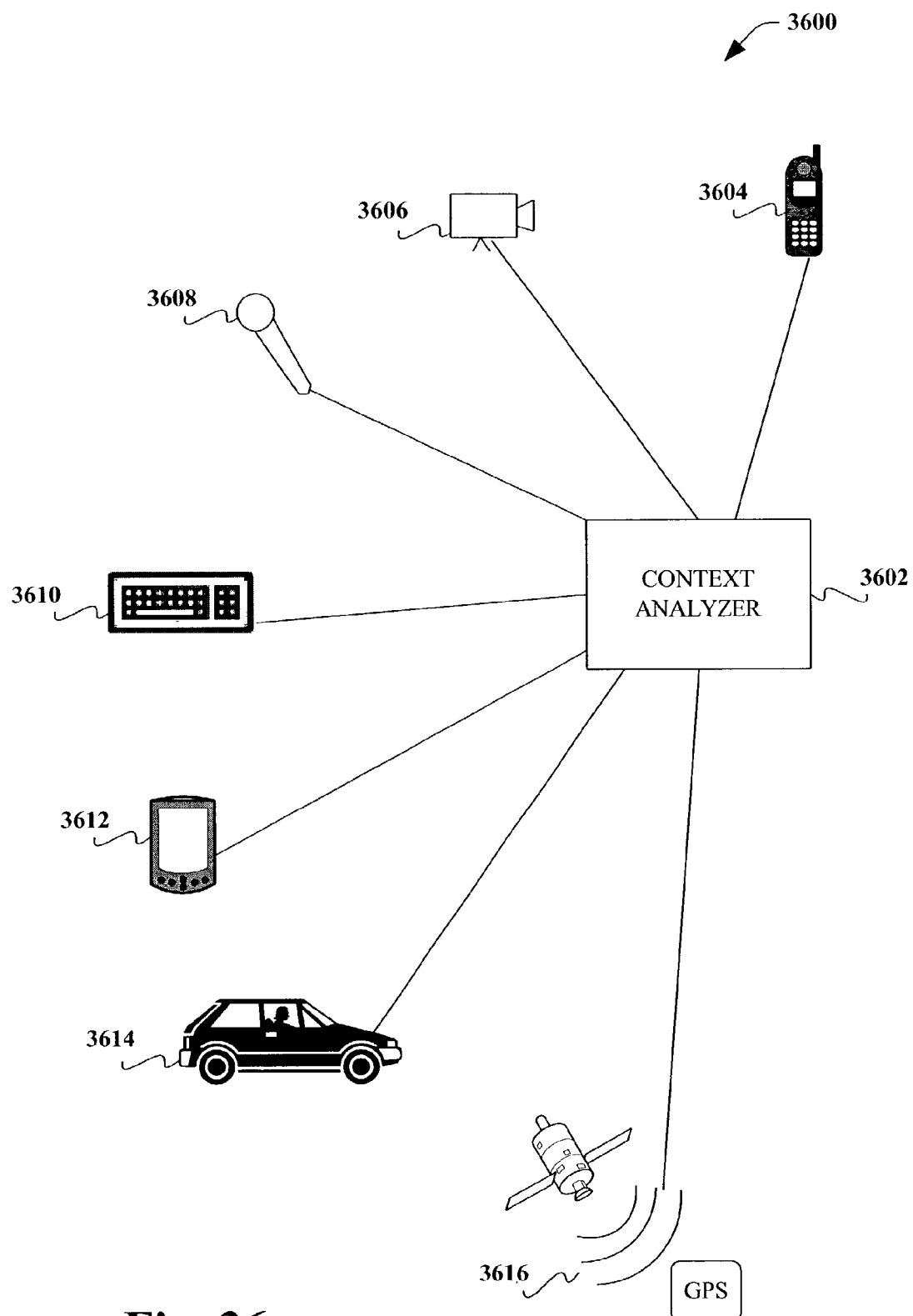
FIG. 36 illustrates methodologies for determining a user context by direct measurement in accordance with an aspect of the present invention.

Referring at this time to FIG. 36, a determination of user context by direct measurement, for example, using one or more sensors, is illustrated in accordance with the present invention. The context of the user can include the user's attentional focus, as well as his or her current location. The invention itself is not so limited, however. Direct measurement of context indicates that sensor(s) can be employed to detect whether the user is currently amenable to receiving alerts, and to detect where the user currently is. According to one aspect of the present invention, an inferential analysis in conjunction with direct measurement can be utilized to determine user context, as is described in a later section of the description.

Referring to FIG. 36, a system 3600 in which direct measurement of user context can be achieved is illustrated. The system 3600 includes a context analyzer 3602, and communicatively coupled thereto a number of sensors 3604–3616, namely, a cell phone 3604, a video camera 3606, a microphone 3608, a keyboard 3610, a PDA 3612, a vehicle 3614, and a GPS 3616, for example. The sensors 3604–3616 depicted in FIG. 36 are for exemplary purposes only, and do not represent a limitation or a restriction on the invention itself. The term sensor as used herein is a general and overly encompassing term, meaning any device or manner by which the context analyzer 3602 can determine what the user's current attentional focus is, and/or what the user's current location is.

For example, if the user has the cell phone 3604 on, this can indicate that the user can receive alerts on the cell phone 3604. However, if the user is currently talking on the cell phone 3604, this can indicate that the user has his or her attentional focus on something else (namely, the current phone call), such that the user should not presently be disturbed with a notification alert. The video camera 3606 can, for example, be in the user's office, to detect whether the user is in his or her office (viz., the user's location), and whether others are also in his or her office, suggesting a meeting with them, such that the user should not be disturbed (viz., the user's focus). Similarly, the microphone 3608 can also be in the user's office, to detect whether the user is talking to someone else, such that the user should not be disturbed, is typing on the keyboard (e.g., via the sounds emanating therefrom), such that the user should also not be presently disturbed. The keyboard 3610 can also be employed to determine if the user is currently typing thereon, such that, for example, if the user is typing very quickly, this may indicate that the user is focused on a computer-related activity, and should not be unduly disturbed (and, also can indicate that the user is in fact in his or her office).

If the PDA device 3612 is being accessed by the user, this can indicate that the user is able to receive alerts at the device 3612—that is, the location at which notifications should be conveyed is wherever the device 3612 is located. The device 3612 can also be utilized to determine the user's current attentional focus. The vehicle 3614 can be utilized to determine whether the user is currently in the vehicle—that is, if the vehicle is currently being operated by the user. Furthermore, the speed of the vehicle can be considered, for example, to determine what the user's focus is. If the speed is greater than a predetermined speed, for instance, then it may be determined that the user is focused on driving, and should not be bothered with notification alerts. The GPS device 3616 can also be employed to ascertain the user's current location, as known within the art.

In the following section of the detailed description, a determination of user context according to user-modifiable rules is described. The context of the user can include the user's attentional focus, as well as his or her current location. The invention is not so limited, however. Determining context via rules indicates that a hierarchical set of if-then rules can be followed to determine the user's location and/or attentional focus.

Figure 37:
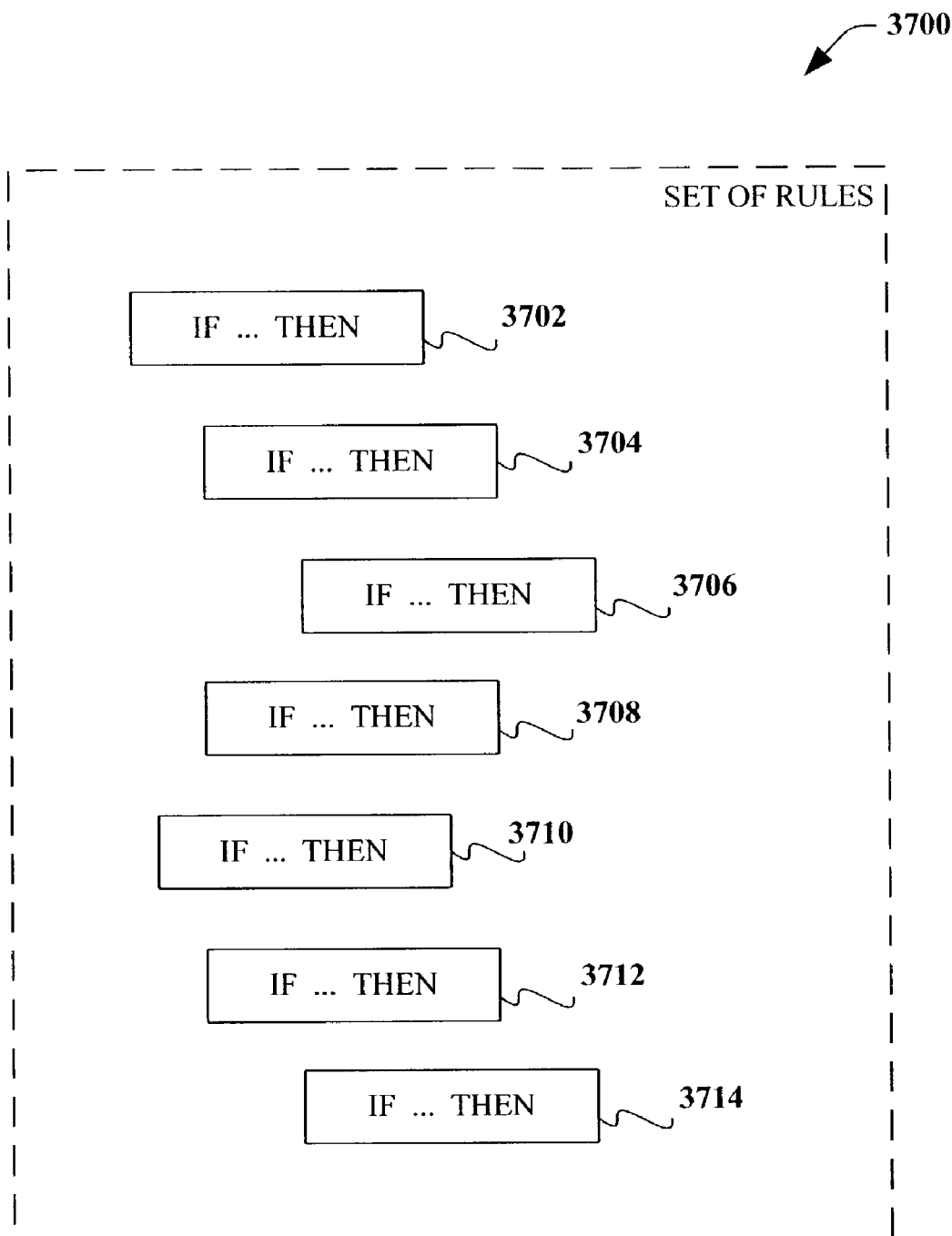
FIG. 37 is a block diagram illustrating an exemplary hierarchical ordered set of rules in accordance with an aspect of the present invention.

Referring to FIG. 37, a diagram illustrates an exemplary hierarchical ordered set of rules 3700. The set of rules 3700 depicts rules 3702, 3704, 3706, 3708, 3710, 3712 and 3714, for example. It is noted that other rules may be similarly configured. As illustrated in FIG. 37, rules 3704 and 3706 are subordinate to 3702, while rule 3706 is subordinate to rule 3704, and rule 3714 is subordinate to rule 3712. The rules are ordered in that rule 3702 is first tested; if found true, then rule 3704 is tested, and if rule 3704 is found true, then rule 3706 is tested, and so forth. If rule 3704 is found false, then rule 3708 is tested. If rule 3702 is found false, then rule 3710 is tested, which if found true, causes testing of rule 3712, which if found true causes testing of rule 3714. The rules are desirably user creatable and/or modifiable. Otherwise-type rules can also be included in the set of rules 3700 (e.g., where if an if-then rule is found false, then the otherwise rule is controlling).

Thus, a set of rules can be constructed by the user such that the user's context is determined. For example, with respect to location, the set of rules can be such that a first rule tests whether the current day is a weekday. If it is, then a second rule subordinate to the first rule tests whether the current time is between 9 a.m. and 5 p.m. If it is, then the second rule indicates that the user is located in his or her office, otherwise the user is at home. If the first rule is found to be false—that is, the current day is a weekend and not a weekday—then an otherwise rule may state that the user is at home. It is noted that this example is not meant to be a restrictive or limiting example on the invention itself, wherein one or more other rules may also be similarly configured.

In the following section of the description, a determination of user context by inferential analysis, such as by employing a statistical and/or Bayesian model, is described. It is noted that context determination via inferential analysis can rely in some aspects on other determinations, such as direct measurement via sensor(s), as has been described. Inferential analysis as used herein refers to using an inference process(es) on a number of input variables, to yield an output variable(s), namely, the current context of the user. The analysis can include in one aspect utilization of a statistical model and/or a Bayesian model.

Figure 38:
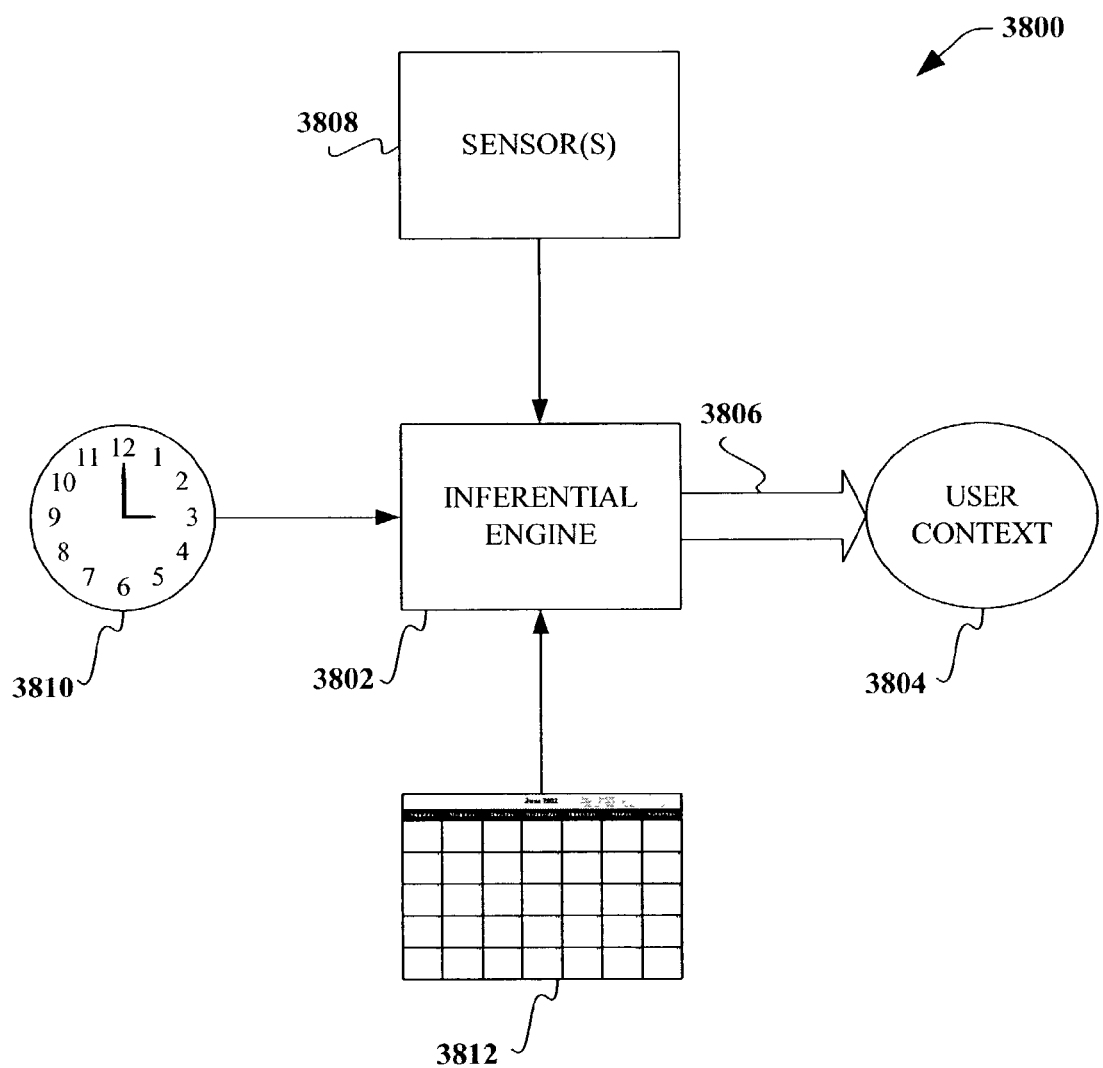
FIG. 38 is a schematic block diagram of a system illustrating inferential analysis being performed by an inferential engine to determine a user's context, according to an aspect of the present invention.

Referring to FIG. 38, a diagram of a system 3800 is illustrated in which inferential analysis is performed by an inferential engine 3802 to determine a user's context 3804, according to an aspect of the present invention. The engine 3802 is in one aspect a computer program executed by a processor of a computer from a computer-readable medium thereof, such as a memory. The user context 3804 can be considered the output variable of the engine 3802 The engine 3802 can process one or more input variables to make a context decision. Such input variables can include one or more sensor(s) 3808, such as the sensor(s) that have been described in conjunction with a direct measurement approach for context determination in a previous section of the description, as well as the current time and day, as represented by a clock 3810, and a calendar 3812, as may be accessed in a user's scheduling or personal-information manager (PIM) computer program, and/or on the user's PDA device, for example. Other input variables can also be considered besides those illustrated in FIG. 38. The variables of FIG. 38 are not meant to be a limitation or a restriction on the invention itself.

Figure 39:
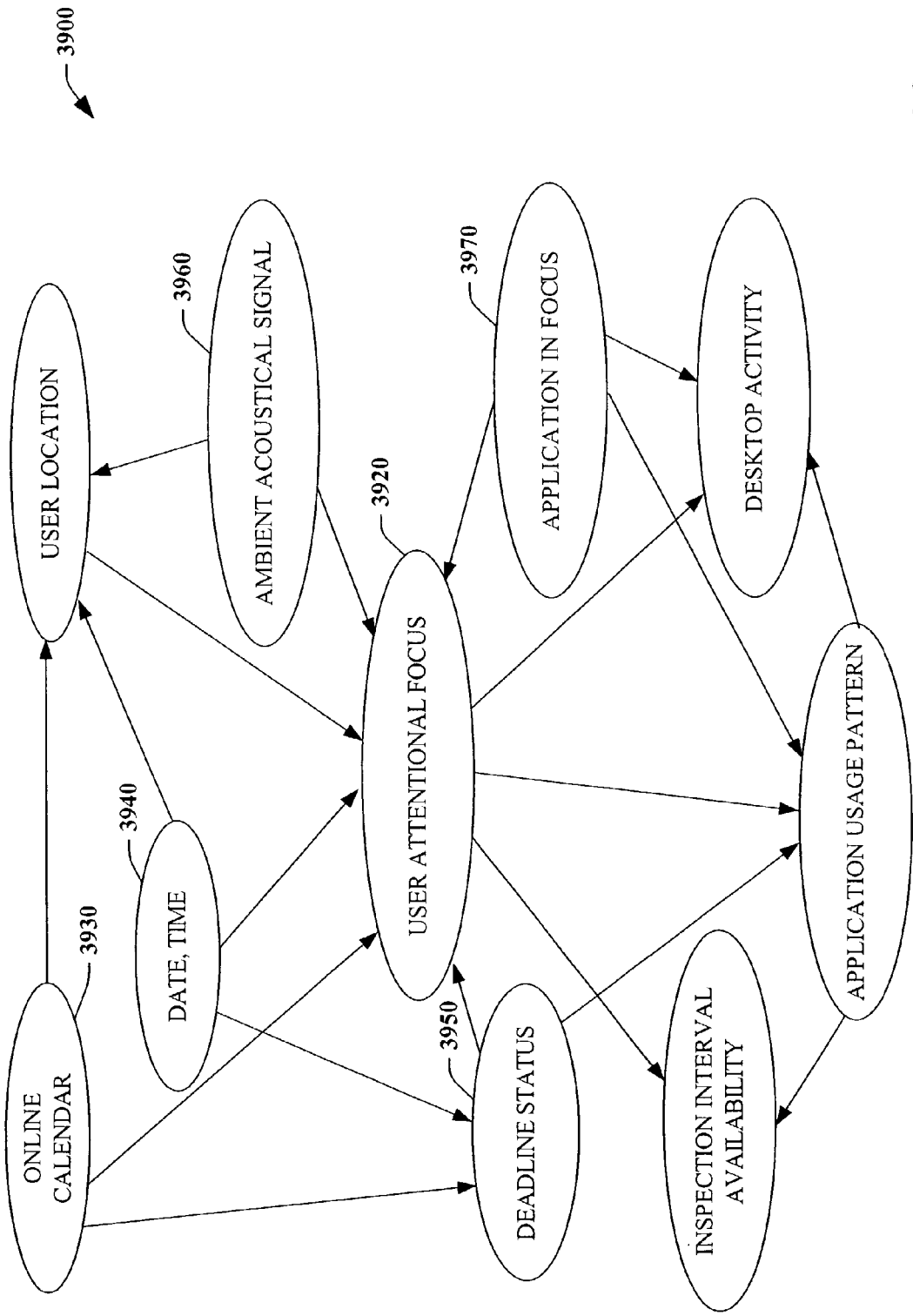
FIG. 39 illustrates an exemplary Bayesian network for inferring a user's focus of attention for a single time period in accordance with an aspect of the present invention.
Figure 40:
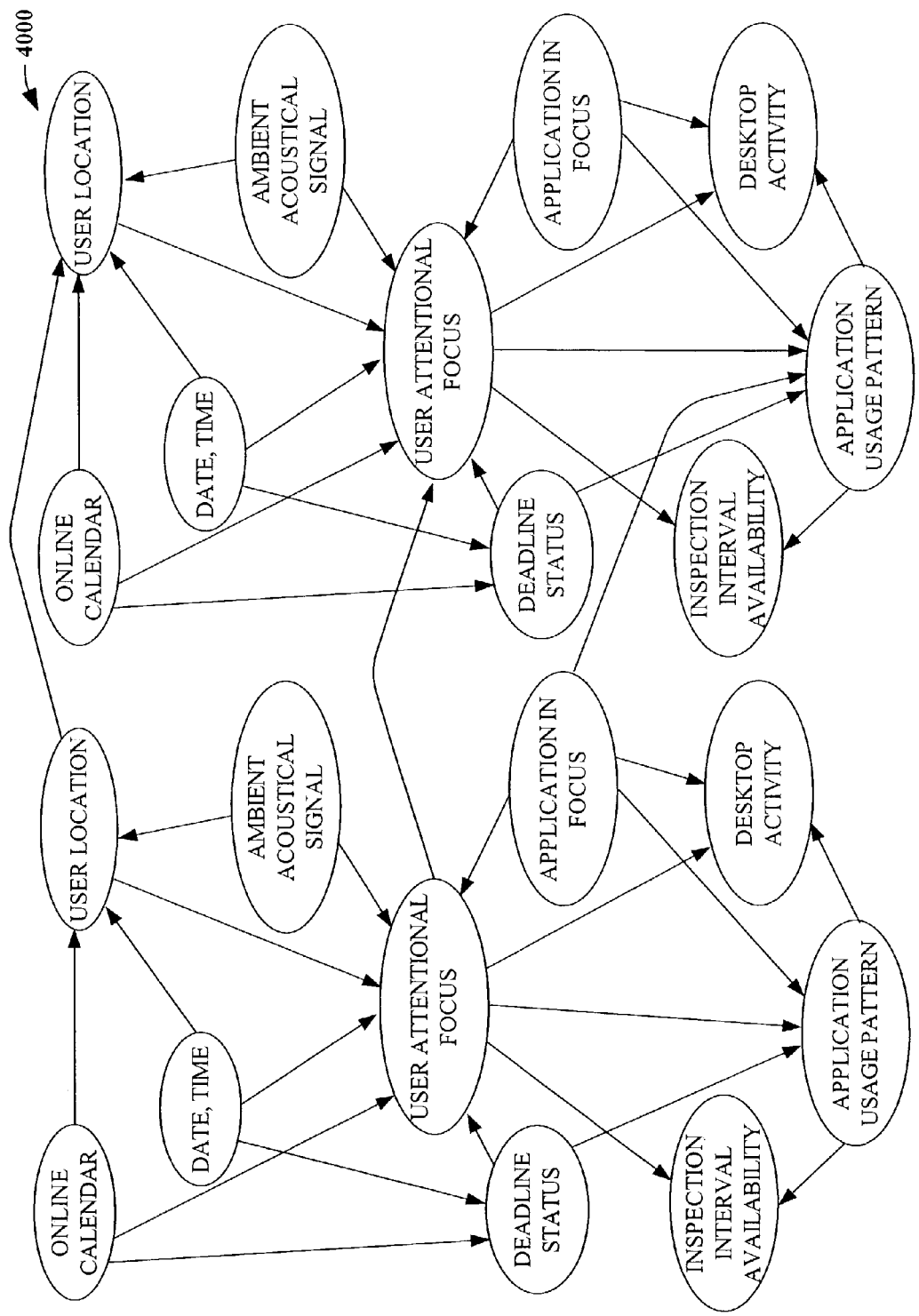
FIG. 40 illustrates a Bayesian model of a user's attentional focus among context variables at different periods of time in accordance with an aspect of the present invention.

Referring now to FIGS. 39 and 40, an exemplary inferential model, such as provided by a statistical and/or Bayesian model that can be executed by the inferential engine described above is illustrated in accordance with the present invention. In general, a computer system can be somewhat uncertain about details of a user's state. Thus, probabilistic models can be constructed that can make inferences about a user's attention or other state under uncertainty. Bayesian models can infer a probability distribution over a user's focus of attention. Such states of attention can be formulated as a set of prototypical situations or more abstract representations of a set of distinct classes of cognitive challenges being addressed by a user. Alternatively, models can be formulated that make inferences about a continuous measure of attentional focus, and/or models that directly infer a probability distribution over the cost of interruption for different types of notifications.

Bayesian networks may be employed that can infer the probability of alternate activity contexts or states based on a set of observations about a user's activity and location. As an example, FIG. 39 displays a Bayesian network 3900 for inferring a user's focus of attention for a single time period. States of a variable, Focus of Attention 3920, refer to desktop and non-desktop contexts. Exemplary attentional contexts considered in the model include situation awareness, catching up, nonspecific background tasks, focused content generation or review, light content generation or review, browsing documents, meeting in office, meeting out of office, listening to presentation, private time, family time, personal focus, casual conversation and travel, for example. The Bayesian network 3900 indicates that a user's current attention and location are influenced by the user's scheduled appointments 3930, the time of day 3940, and the proximity of deadlines 3950. The probability distribution over a user's attention is also in influenced by summaries of the status of ambient acoustical signals 3960 monitored in a user's office, for example. Segments of the ambient acoustical signal 3960 over time provide clues/inputs about the presence of activity and conversation. Status and configuration of software applications and the ongoing stream of user activity generated by a user interacting with a computer also provide sources of evidence about a user's attention.

As portrayed in the network 3900, a software application currently at top-level focus 3970 in an operating system or other environment influences the nature of the user's focus and task, and the status of a user's attention and the application at focus together influence computer-centric activities. Such activity includes the stream of user activity built from sequences of mouse and keyboard actions and higher-level patterns of application usage over broader time horizons. Such patterns include e-mail-centric and Word-processor centric, and referring to prototypical classes of activity involving the way multiple applications are interleaved.

FIG. 40 illustrates a Bayesian model 4000 of a user's attentional focus among context variables at different periods of time. A set of Markov temporal dependencies is illustrated by the model 4000, wherein past states of context variables are considered in present determinations of the user's state. In real-time, such Bayesian models 4000 consider information provided by an online calendar, for example, and a stream of observations about room acoustics and user activity as reported by an event sensing system (not shown), and continues to provide inferential results about the probability distribution of a user's attention.

Figure 41:
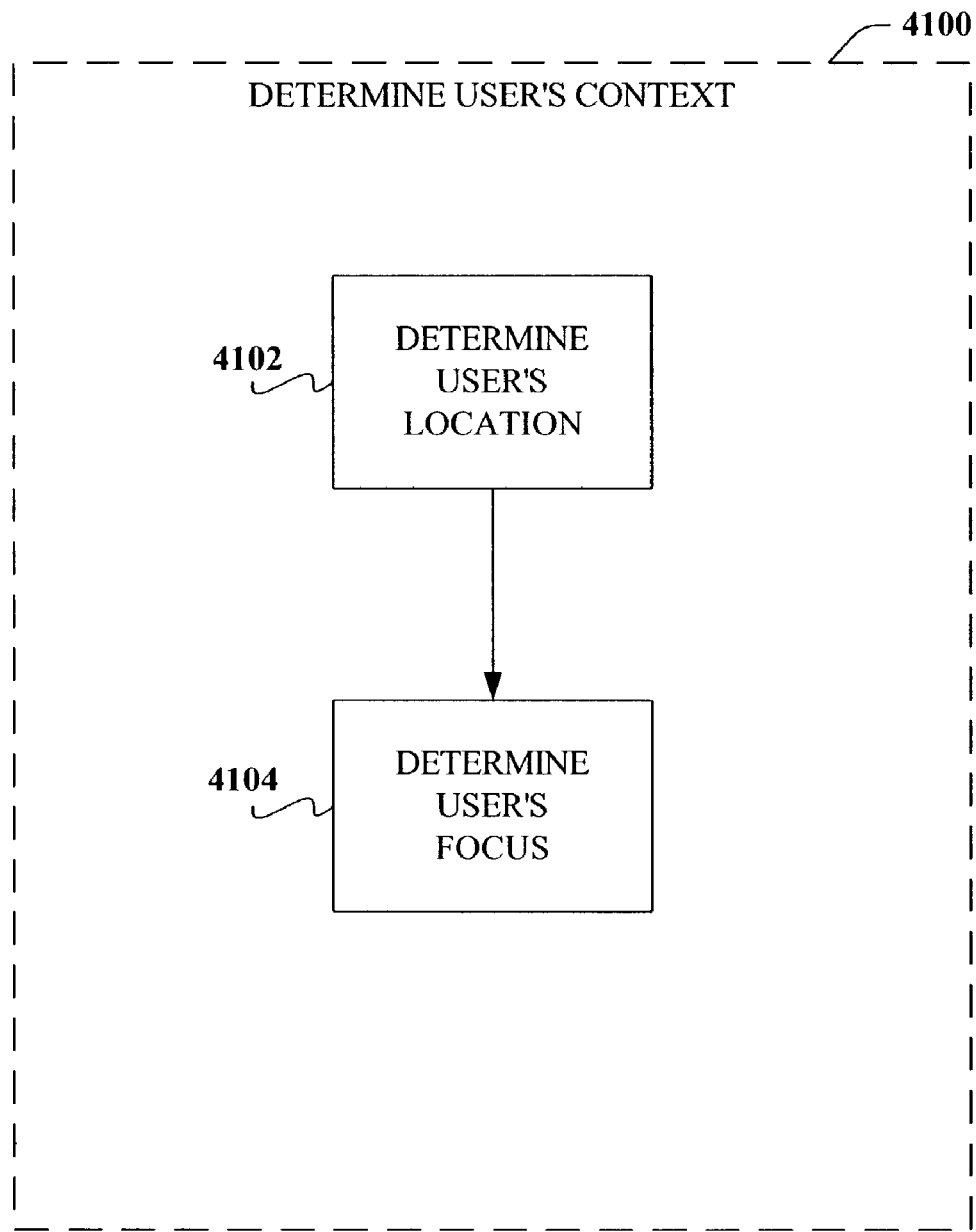
FIG. 41 is a flowchart diagram illustrating how a user's context is determined in accordance with the present invention.
Figure 42:
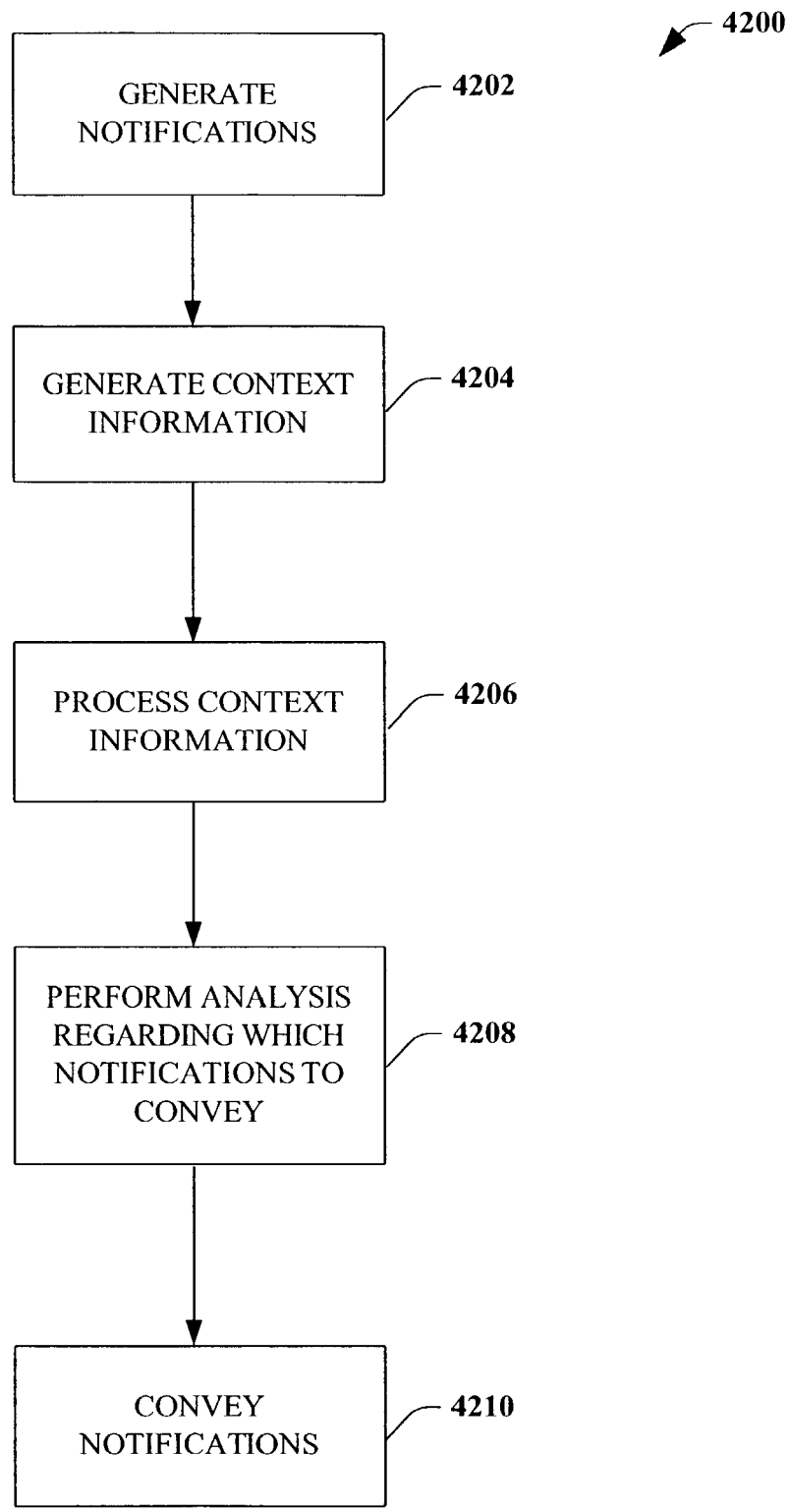
FIG. 42 is a flowchart diagram illustrating a decision process for a notification engine in accordance with an aspect of the present invention.

FIGS. 41 and 42 illustrate methodologies for providing portions of a notification architecture such as a context analyzer and a notification engine in accordance the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 41, a flowchart diagram 4100 illustrates determining a user's context in accordance with the present invention. The process includes determining the user's location in 4102, and the user's focus in 4104. These acts can be accomplished by one or more of the approaches described previously. For example, a profile can be employed; a user can specify his or her context; direct measurement of context can be utilized; a set of rules can be followed; an inferential analysis, such as via a Bayesian or a statistical model, can also be performed. It is to be appreciated that other analysis can be employed to determine a user's context. For example, there can be an integrated video camera source that notes if someone is front of the computer and whether or not he or she is looking at the computer. It is noted, however, that the system can operate with or without a camera. For all of the sources, the system can operate with substantially any input source available, not requiring any particular source to inference about context. Furthermore, in other aspects, there can be integrated accelerometers, microphones, and proximity detectors on small PDA's that give a sense of a user's location and attention.

Referring now to FIG. 42, a flowchart diagram 4200 illustrates a decision process for a notification engine in accordance with an aspect of the present invention. At 4202, one or more notification sources generate notifications, which are received by a notification engine. At 4204, a context analyzer generates/determines context information regarding the user, which in 4206 is received by the notification engine. That is, according to one aspect of the present invention, at 4204, the context analyzer accesses a user contextual information profile that indicates the user's current attentional status and location, and/or assesses real-time information regarding the user's current attentional status and location from one or more contextual information sources, as has been described in the previous sections of the description.

At 4208, the notification engine determines which of the notifications to convey to which of the notification sinks, based in part on the context information received from the context analyzer. The notification engine also makes determinations based on information regarding notification parameters of the user as stored by the context analyzer. That is, according to one aspect, in 4208, the engine performs a decision-theoretic analysis as to whether a user should be alerted for a given notification, and how the user should be notified. As will be described in more detail below, decision-theoretic and/or heuristic analysis, determinations and policies may be employed at 4208. Notification parameters regarding the user can be utilized to personalize the analysis by filling in missing values or by overwriting parameters provided in the schema of sources or sinks. Notification preferences can also provide policies (e.g., heuristic) that are employed in lieu of the decision-theoretic analysis. Based on this determination, the notification engine conveys the notifications to the distributor at 4210.

Figure 43:
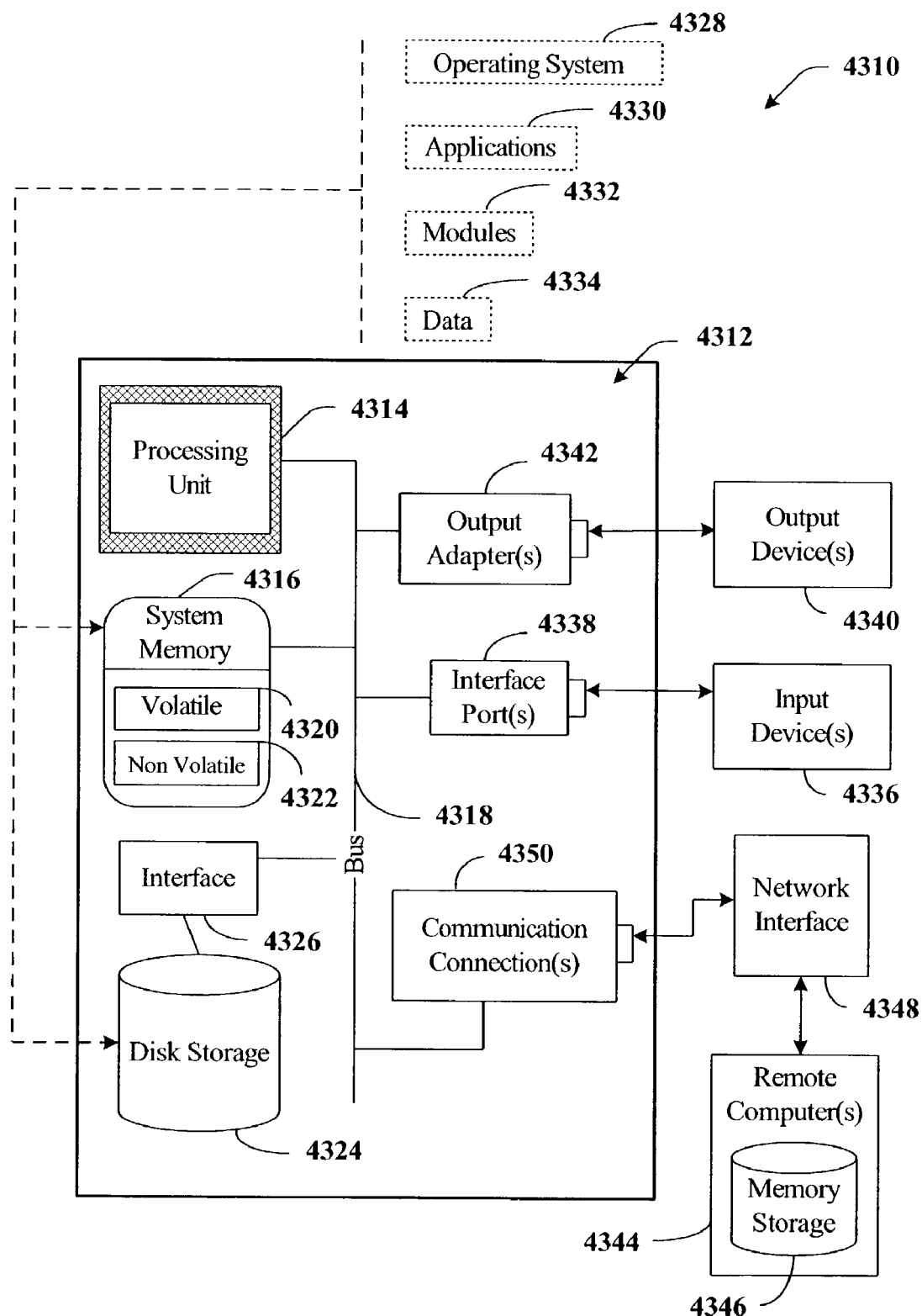
FIG. 43 is a schematic block diagram illustrating a suitable operating environment in accordance with an aspect of the present invention.
Figure 44:
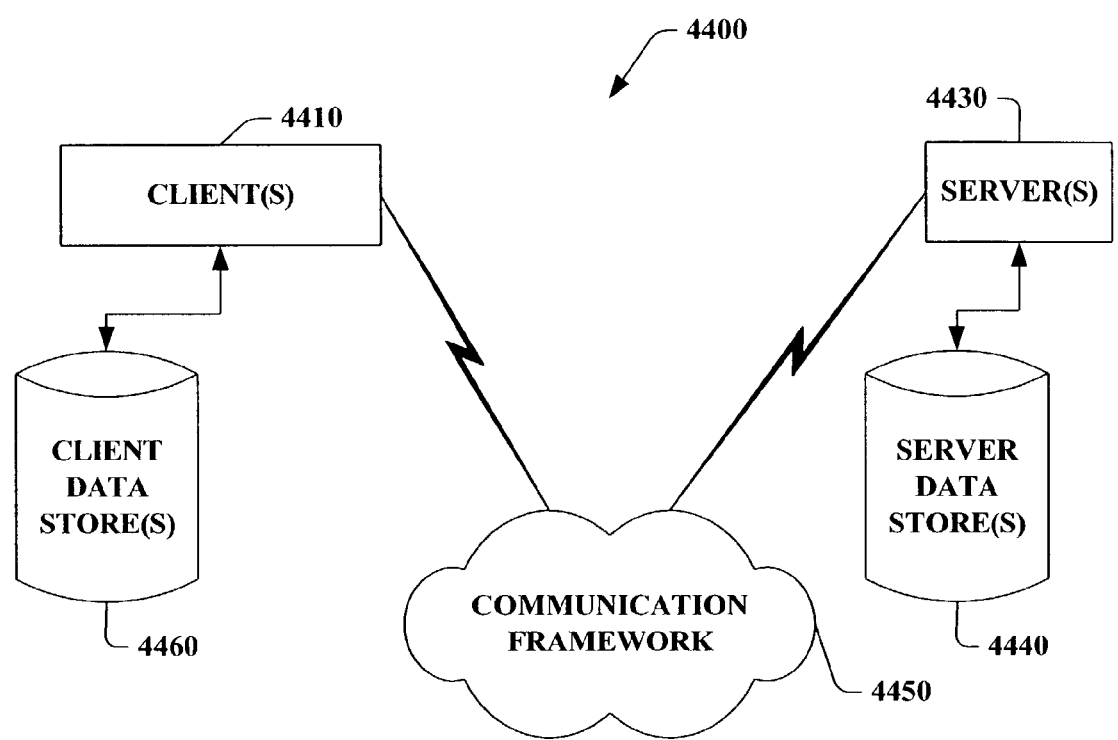
FIG. 44 is a schematic block diagram of a sample-computing environment with which the present invention can interact.

In order to provide a context for the various aspects of the invention, FIGS. 43 and 44 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practices on stand alone computers. In a distributed computing environment, program modules may be locate in both local and remote memory storage devices.

With reference to FIG. 43, an exemplary environment 4310 for implementing various aspects of the invention includes a computer 4312. The computer 4312 includes a processing unit 4314, a system memory 4316, and a system bus 4318. The system bus 4318 couples system components including, but not limited to, the system memory 4316 to the processing unit 4314. The processing unit 4314 can be any of various available processors. Dual microprocessors and other multiprocessor architectures also can be employed as the processing unit 4314.

The system bus 4318 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 4316 includes volatile memory 4320 and nonvolatile memory 4322. The basic input/output system (BIOS), containing the basic routines to transfer information between elements within the computer 4312, such as during start-up, is stored in nonvolatile memory 4322. By way of illustration, and not limitation, nonvolatile memory 4322 can include read only memory (ROM), programmable ROM (PROM), electrically programmable ROM (EPROM), electrically erasable ROM (EEPROM), or flash memory. Volatile memory 4320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 4312 also includes removable/non-removable, volatile/non-volatile computer storage media. FIG. 43 illustrates, for example a disk storage 4324. Disk storage 4324 includes, but is not limited to, devices like a magnetic disk drive, floppy disk drive, tape drive, Jaz drive, Zip drive, LS-100 drive, flash memory card, or memory stick. In addition, disk storage 4324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 4324 to the system bus 4318, a removable or non-removable interface is typically used such as interface 4326.

It is to be appreciated that FIG. 43 describes software that acts as an intermediary between users and the basic computer resources described in suitable operating environment 4310. Such software includes an operating system 4328. Operating system 4328, which can be stored on disk storage 4324, acts to control and allocate resources of the computer system 4312. System applications 4330 take advantage of the management of resources by operating system 4328 through program modules 4332 and program data 4334 stored either in system memory 4316 or on disk storage 4324. It is to be appreciated that the present invention can be implemented with various operating systems or combinations of operating systems.

A user enters commands or information into the computer 4312 through input device(s) 4336. Input devices 4336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These, and other input devices connect to the processing unit 4314 through the system bus 4318 via interface port(s) 4338. Interface port(s) 4338 include, for example, a serial port, a parallel port, a game port, and a universal serial bus (USB).

Output device(s) 4340 use some of the same type of ports as input device(s) 4336. Thus, for example, a USB port may be used to provide input to computer 4312, and to output information from computer 4312 to an output device 4340. Output adapter 4342 is provided to illustrate that there are some output devices 4340 like monitors, speakers, and printers, among other output devices 4340, that require special adapters. The output adapters 4342 include, by way of illustration and not limitation, video and sound cards that provide a means of connection between the output device 4340 and the system bus 4318. It should be noted that other devices and/or systems of devices provide both input and output capabilities such as remote computer(s) 4344.

Computer 4312 can operate in a networked environment using logical connections to one or more remote computers, such as remote computer(s) 4344. The remote computer(s) 4344 can be a personal computer, a server, a router, a network PC, a workstation, a microprocessor based appliance, a peer device or other common network node and the like, and typically includes many or all of the elements described relative to computer 4312. For purposes of brevity, only a memory storage device 4346 is illustrated with remote computer(s) 4344. Remote computer(s) 4344 is logically connected to computer 4312 through a network interface 4348 and then physically connected via communication connection 4350. Network interface 4348 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 4350 refers to the hardware/software employed to connect the network interface 4348 to the bus 4318. While communication connection 4350 is shown for illustrative clarity inside computer 4312, it can also be external to computer 4312. The hardware/software necessary for connection to the network interface 4348 includes, for exemplary purposes only, internal and external technologies such as, modems including regular telephone grade modems, cable modems and DSL modems, ISDN adapters, and Ethernet cards.

FIG. 44 is a schematic block diagram of a sample-computing environment 4400 with which the present invention can interact. The system 4400 includes one or more client(s) 4410. The client(s) 4410 can be hardware and/or software (e.g., threads, processes, computing devices). The system 4400 also includes one or more server(s) 4430. The server(s) 4430 can also be hardware and/or software (e.g., threads, processes, computing devices). The servers 4430 can house threads to perform transformations by employing the present invention, for example. One possible communication between a client 4410 and a server 4430 may be in the form of a data packet adapted to be transmitted between two or more computer processes. The system 4400 includes a communication framework 4450 that can be employed to facilitate communications between the client(s) 4410 and the server(s) 4430. The client(s) 4410 are operably connected to one or more client data store(s) 4460 that can be employed to store information local to the client(s) 4410. Similarly, the server(s) 4430 are operably connected to one or more server data store(s) 4440 that can be employed to store information local to the servers 4430.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A subscription modeling system, comprising:
    a query processor that receives subscription query and subscriber information and transforms the query and subscriber information into data, the query processor employs subscription templates based at least in part upon common structures associated with subsets of queries, and subscribers propagate parameters to customize a respective template;
    an index component that propagates at least one database with the transformed data;
    a matching component that associates the transformed data with event data to generate a database of notification data, wherein the notification data is delivered to subscribers; and
    a programming model that builds subscription applications, the subscription applications utilize an SQL server to do subscription and event matching, the SQL server performs a data join operation in connection with generation of the notification data.

2. The system of claim 1, the matching component employing a set of match rules to associate the transformed data.

3. The system of claim 1, the query processor parsing the information and abstracting at least portions of the parsed information into data fields.

4. The system of claim 3, the data fields being propagated with subscriber or event specific data.

5. The system of claim 1, the matching component comprising an inference engine that facilitates inferring how data should be joined pursuant to subscriber preferences.

6. A computer implemented application definition file (ADF) for employment in connection with subscription services, comprising the following computer executable component:

a set of schemas that describe subscriptions and subscribers; and a subscription logic component that defines how subscriptions are evaluated, the subscription logic component is parameterized so that individual subscriptions personalize the subscription logic component, subscription templates are employed based at least in part upon common structures associated with subsets of subscriptions and subscribers propagate parameters to customize a respective template;

wherein once the subscription logic component is personalized, notifications are delivered based on the individual subscriptions.

7. The ADF of claim 6 further comprising event definitions that specify structure of at least one of: event data, event providers that collect data, and structure event chronicles used by a notification subscription application.

8. The ADF of claim 6 further comprising notification definitions that specify structure of at least one of: structure of raw notification data, formatting for messages that will be sent to subscribers, and delivery protocols used to send the messages.

9. The ADF of claim 6 further comprising subscription schema that defines structure of subscription parameters and when subscriptions are to be evaluated.

10. The ADF of claim 9, the subscription schema defining structure of subscription parameters.

11. The ADF of claim 6 further comprising execution settings that facilitate an application developer to enhance behavior and performance of an application when executed by notification services.

12. A method that facilitates providing notifications of information to recipients comprising:

storing subscription queries as data;

employing subscription templates based at least in part upon common structures associated with subsets of queries;

propagating parameters to customize a respective template;

storing event information as data;

upon a notification event occurring performing a join operation on the subscription query data and the event data to produce a first set of notification data;

propagating a notification database with the first set of notification data;

generating a second set of notification data based at least in part on the first set of notification data, wherein the second set of notification data is delivered to subscribers; and building subscription applications, the subscription applications utilizing an SQL server to perform the join operation on the subscription query data and the event data.

13. The method of claim 12, further comprising formatting the first and second sets of notification data and delivering the formatted notification data.

14. The method of claim 13, the formatted notification data being delivered via a delivery channel, the delivery channel being an intermediary between a notification services application and a delivery service.

15. The method of claim 13, the formatted notification data being delivered via a digest delivery protocol.

16. The method of claim 12 further comprising employing match rules to effect the join operation.

17. The method of claim 12, the first and second sets of notification data being delivered via a multicasting protocol.

18. A computer implemented subscription modeling methodology, comprising the following computer executable acts:

providing an interface for an application developer to create an application definition file (ADF) in connection with modeling a subscription application;

defining metadata nodes via an application developer;

writing a subscription management application, the application is written via the application developer to allow users to subscribe to a subscription service and receive notifications storing subscription queries as data;

employing subscription templates based at least in part upon common structures associated with subsets of queries; and propagating parameters to customize a respective template.

19. The method of claim 18, further comprising specifying one or more event classes in the application definition file, the event class(es) corresponding to particular event types accepted by the application.

20. The method of claim 18, further comprising specifying one or more notification classes in the application definition file, the notification class(es) corresponding to one particular kind of notification generated by the application.

21. The method of claim 18, further comprising specifying one or more subscription classes in the application definition file, the subscription class(es) corresponding to one particular kind of subscription accepted by the application.

22. The method of claim 21, wherein specifying the subscription class(es) includes writing rules, which are Transact-SQL statements that either generate notifications, or update chronicle tables.

23. The method of claim 22, the rules being invoked when an event provider submits a new batch of events on a scheduled basis.

24. The method of claim 18, the subscription management application accepts and validates information about a subscriber, target devices that the subscriber is using for notification delivery, and subscriptions that specify information that the subscriber would like to receive.

25. The method of claim 18, further comprising defining an event provider that monitors an external entity and generates an event upon an action occurring.

26. A computer readable medium having stored thereon a data structure comprising:

a first set of data fields containing data representing subscription information, wherein subscription templates are utilized based at least in part upon common structures associated with subsets of queries to parameterize the data and subscribers propagate parameters to customize a respective template;

a second set of data fields containing data representing subscriber information;

a third set of data fields containing data representing event information; and a fourth set of data fields containing notification data derived from performing a join operation on subsets of the first, second and third sets of data fields, wherein an SQL server performs the join operation on subsets of the first, second and third sets of data fields.

* * * * *